United States Patent
Yamasaki et al.

(10) Patent No.: US 6,410,676 B1
(45) Date of Patent: Jun. 25, 2002

(54) METHOD FOR PRODUCING POLYOXYALKYLENE POLYOL AND DERIVATIVES THEREOF

(75) Inventors: Satoshi Yamasaki; Yasunori Hara; Tamotsu Kunihiro; Fumio Yamazaki; Mikio Matsufuji; Ariko Nishikawa; Shinsuke Matsumoto; Tsukuru Izukawa, all of Aichi; Masahiro Isobe, Kanagawa; Kazuhiko Ohkubo, Kanagawa; Kaoru Ueno, Kanagawa, all of (JP)

(73) Assignee: Mitsui chemicals, Inc. (JP)

( * ) Notice: Subject to any disclaimer, the term of this patent is extended or adjusted under 35 U.S.C. 154(b) by 0 days.

(21) Appl. No.: 09/555,338

(22) PCT Filed: Oct. 19, 1999

(86) PCT No.: PCT/JP99/05743

§ 371 (c)(1),
(2), (4) Date: May 30, 2000

(87) PCT Pub. No.: WO00/23500

PCT Pub. Date: Apr. 27, 2000

(30) Foreign Application Priority Data

Oct. 20, 1998 (JP) .......................... 10-297777
Oct. 23, 1998 (JP) .......................... 10-301872
Nov. 12, 1998 (JP) .......................... 10-321224
Nov. 16, 1998 (JP) .......................... 10-324599
Aug. 4, 1999 (JP) .......................... 11-220628

(51) Int. Cl.$^7$ .............................. C08G 18/48
(52) U.S. Cl. ................ 528/76; 528/408; 568/618; 568/621; 525/404; 524/762
(58) Field of Search .................. 528/408, 76; 568/618, 568/621; 525/404; 524/762

(56) References Cited

U.S. PATENT DOCUMENTS 3,829,505 A  8/1974  Herold et al.
4,472,560 A  9/1984  Kuyper et al.
5,952,457 A * 9/1999  Kouno et al.

FOREIGN PATENT DOCUMENTS

| CN | 1226251 A | 8/1999 |
| DE | 19718196 A | 5/1998 |
| EP | 763555 | 4/1970 |
| JP | 7278289 | 10/1995 |
| JP | 10158388 | 6/1998 |
| JP | 111553 | 1/1999 |
| WO | WO98/04568 | 2/1998 |
| WO | WO98/542241 | 12/1998 |

OTHER PUBLICATIONS

Beate Esswein et al, "Anionic polymerization of oxirane in the presence of the polyiminophosphazene base t–Bu–P$_4$", Macromol. Rapid Commun. 17, p. 143, 1996.

Beate Esswein et al, "Use of polyiminophosphazene bases for ring–opening polymerizations", Macromol. Symp. 107, p. 331, 1996.

Frederic C. Schilling et al, "Carbon–13 NMR Determination of Poly(propylene oxide) Microstructure", Macromolecules 19, p. 1337, 1986.

Reinhard Schwesinger et al, "How strong and how hindered can uncharged phosphazene bases be?", Agnew Chem., Int., Ed. Engl., 32, pp. 1361–1363, 1993.

* cited by examiner

Primary Examiner—Robert Dawson
Assistant Examiner—Kuo Liang Peng
(74) Attorney, Agent, or Firm—Burns, Doane, Swecker & Mathis

(57) ABSTRACT

The object is to provide a method for producing a polyoxyalkylene polyol and a method for producing a derivative thereof wherein the remaining catalyst compound is efficiently removed from a crude polyoxyalkylene polyol by a simple manner, and a method for producing a polyoxyalkylene polyol wherein a crude polyoxyalkylene polyol is produced by addition polymerization of an epoxide compound to an active hydrogen compound using as a catalyst a compound having a P═N bond, then, the crude polyoxyalkylene polyol is allowed to contact with a solid acid having a specific surface area of 450 to 1200 m$^2$/g and an average pore diameter of 40 to 100 Å to control the catalyst-remaining amount in the polyoxyalkylene polyol to 150 ppm or less, and a method for producing a derivative of the-above-described polyol are provided.

27 Claims, No Drawings

METHOD FOR PRODUCING POLYOXYALKYLENE POLYOL AND DERIVATIVES THEREOF

TECHNICAL FIELD

The present invention relates to a method for producing a polyoxyalkylene polyol, and a method for producing derivatives thereof such as a polymer-dispersed polyol, isocyanate group-ended prepolymer, polyurethane and the like, by applying the above-described production method. More particularly, the present invention relates to a method for producing a polyoxyalkylene polyol in which a crude polyoxyalkylene polyol obtained by addition polymerization of an epoxide compound to an active hydrogen compound in the presence of a catalyst composed of a compound having a P=N bond is allowed to contact with a solid acid having specific form, and a method for producing derivatives thereof such as a polymer-dispersed polyol, isocyanate group-ended prepolymer, flexible polyurethane foam, polyurethane resin and the like, by applying the above-described production method.

BACKGROUND ART

Usually, a polyoxyalkylene polyol is produced at industrial scale by addition polymerization of an alkylene oxide to an active hydrogen compound in the presence of a potassium hydroxide (hereinafter, referred to as KOH) catalyst. That is, a KOH catalyst and an active hydrogen compound are dehydrated by heating under reduced pressure to prepare a polymerization initiator (potassium salt of an active hydrogen compound), then, the polymerization initiator is reacted with an alkylene oxide being supplied continuously until desired molecular weight is obtained under conditions of a reaction temperature of 105 to 150° C. and a maximum reaction pressure of 490 to 588 kPa to give a crude polyoxyalkylene polyol. Then, potassium in the crude polyoxyalkylene polyol is neutralized with an acid such as an inorganic acid and the like, dehydrated a and dried to precipitate a potassium salt which is subjected to a purification process such as filtration and the like, giving a polyoxyalkylene polyol.

However, it is known that, in the case of addition polymerization of propylene oxide which is most widely used as an alkylene oxide, a monool having an unsaturated group at the molecular end is by-produced together with an increase in the molecular weight of a polyoxyalkylene polyol.

Usually, the molecular weight of a monool corresponds to the total unsaturation degree (hereinafter, referred to as C=C) of a polyoxyalkylene polyol. Since this monool has a lower molecular weight as compared with that of a polyoxyalkylene polyol produced in the main reaction, the monool enlarges significantly the molecular weight distribution of the polyoxyalkylene polyol and reduces the average functionality. Therefore, a polyurethane resin obtained by using a polyoxyalkylene polyol having high monool content gives undesirable results such as an increase in hysteresis, a decrease in hardness, a lowering of curing property, an increase in compression set and the like irrespective of a physical state of the resin, that is, foam or elastomer.

Therefore, there have been conducted various studies to inhibit formation of the by-product monool and to improve productivity of the polyoxyalkylene polyol. For example, U.S. Pat. No. 3,829,505 and U.S. Pat. No. 4,472,560 suggest a method in which a double metal cyanide complex (hereinafter, referred to as DMC) is used as a catalyst for propylene oxide addition polymerization. DMC manifests excellent property as a polymerization catalyst of propylene oxide. However, when DMC is used as a catalyst and ethylene oxide is addition-polymerized as an alkylene oxide, it is necessary to once deactivate DMC by reaction with an oxidizer such as a gas containing oxygen, a peroxide, sulfuric acid and the like, to separate catalyst residue from a polyol, and further to conduct addition polymerization of ethylene oxide using an alkaline metal hydroxide such as KOH, an alkaline metal alkoxide and the like (U.S. Pat. No. 5,235,114), leading to complicated operations.

Japanese Laid-Open Patent Publication (JP-A) No. Hei-7-278289 discloses a polyoxyalkylene polyol having a hydroxyl value (hereinafter, abbreviated as OHV) of 10 to 35 mg KOH/g, a monool maximum content of 15 mol %, and further, a head-to-tail (hereinafter, simply expressed as H—T) bond minimum selectivity due to propylene oxide addition polymerization of 96% obtained by using cesium hydroxide and the like as a catalyst. This polyoxyalkylene polyol is a polyoxyalkylene polyol which has low viscosity even if the monool content is reduced and gives a flexible polyurethane foam having an excellent mechanical quality, and excellent properties. However, it requires a fairly long reaction time to produce, for example, a polyoxyalkylene polyol of high molecular weight having an OHV of 15 mg KOH/g and a low monool content of 15 mol % or less using cesium hydroxide as a catalyst, therefore, when productivity of the polyol is taken into consideration, this catalyst is not necessarily satisfactory.

On the other hand, as a catalyst for producing a polyoxyalkylene polyol containing no metal, phosphazene compounds have been suggested (EP 0763555, Macromol. Rapid Commun., Vol. 17, pp. 143 to 148, 1996 and Macromol. Symp., Vol. 107, pp. 331 to 340, 1996). When these phosphazene compounds are used as a catalyst for producing a polyoxyalkylene polyol, advantages wherein that productivity of the polyoxyalkylene polyol increases steeply in addition to low by-production ratio of a monool exist.

The present inventors have suggested a polyoxyalkylene polyol in which C=C content is low, H—T bond selectivity is high and the molecular weight distribution of a polyol which is a main reaction component is sharp using as a catalyst a novel phosphazenium compound, and a method for producing this polyoxyalkylene polyol in a patent application relating to International Publication WO 98/54241 (EP 0916686A1). When a phosphazenium compound is used as a catalyst for producing a polyoxyalkylene polyol, even if production of a polyol is conducted using propylene oxide as a monomer, there are advantages in that the by-production ratio of a monool is low and the productivity of a polyoxyalkylene polyol increases steeply.

On the other hand, phosphine oxide compounds are publicly a known in addition to phosphazene compounds and phosphazenium compounds (Journal of General Chemistry of the USSR, Vol. 55, p. 1453 (1985)). In this literature, a method for producing a phosphine oxide compound, and a reaction example using methyl iodide are described. However, there is no disclosure regarding use of a phosphine oxide compound as a catalyst for producing a polyol.

The present inventors have suggested a method for purifying a crude polyoxyalkylene polyol produced by using a phosphazenium compound as a catalyst in the above-described patent application relating to International Publication WO 98/54241 (EP 0916686A1) (methods e to h on page 11, line 21 to page 12, line 17). The method e in this purification method is an excellent method for purifying a polyol which can control the catalyst-remaining amount to 150 ppm or less by synergism of an acid, water and adsorbent in specific amounts. The method f is a method in which an organic solvent inactive with a polyol is used together in specific amounts in the method e. In both of the methods e and f, an adsorbent in specific amounts is used. However, in these methods, a remaining catalyst is removed using an adsorbent after neutralization treatment with an acid as pre-treatment, and the process is slightly longer.

In both of the methods g and h which are other methods using no adsorbent, water or an organic solvent in large amounts is used. Therefore, after the purification treatment, there is required a process for removing water or an organic solvent from a polyoxyalkylene polyol. Depending on the molecular structure of a polyoxyalkylene polyol, the yield of a polyol may sometimes decrease since a part of the polyol is dissolved in water due to contact operation with a large amount of water. Any of these methods include a longer process, and is not necessarily satisfactory.

As described above, compounds having a P=N bond such as a phosphazene compound, phosphazenium compound and the like, are extremely useful as a catalyst for producing a polyoxyalkylene polyol having excellent properties such as low C=C content, high H—T bond selectivity and sharp molecular weight distribution of a polyol which is a main reaction component. Therefore, there is desired a method for purifying in a simpler process a polyoxyalkylene polyol produced by using the above-described compound as a catalyst.

In view of the above-described problems, the object of the present invention is to provide a method for producing a polyoxyalkylene polyol which can remove a remaining catalyst compound efficiently by a simple manner from a crude polyoxyalkylene polyol, and a method for producing derivatives thereof.

DISCLOSURE OF THE INVENTION

The present inventors have intensively investigated solving the above-described problems, and as a result, found that a polyoxyalkylene polyol having a low catalyst-remaining amount is obtained by producing a crude polyoxyalkylene polyol by addition polymerization of an epoxide compound to an active hydrogen compound using as a catalyst a compound having a P=N bond, and further, purifying the resulting crude polyoxyalkylene polyol using a solid acid (adsorbent) having specific form, and completed the present invention.

Namely, the first aspect of the present invention is a method for producing a polyoxyalkylene polyol wherein a crude polyoxyalkylene polyol is produced by addition polymerization of an epoxide compound to an active hydrogen compound using as a catalyst a compound having a P=N bond, then, the crude polyoxyalkylene polyol is allowed to contact with a solid acid having a specific surface area of 450 to 1200 m²/g and an average pore diameter of 40 to 100 Å to control the catalyst-remaining amount in the polyoxyalkylene polyol to 150 ppm or less.

Preferable embodiments of the first invention include the above-described method for producing a polyoxyalkylene polyol in which 0.1 to 10% by weight of water is allowed to coexist based on the crude polyoxyalkylene polyol when the crude polyoxyalkylene polyol is allowed to contact with a solid acid, and the above-described method for producing a polyoxyalkylene polyol in which after the crude in polyoxyalkylene polyol is allowed to contact with a solid acid, the solid acid is separated from the polyoxyalkylene polyol, then, at least one acid selected from inorganic acids and organic acids is added in an amount of 1 to 25 ppm based on the polyoxyalkylene polyol. The temperature when the crude polyoxyalkylene polyol is allowed to contact with a solid acid is preferably from 50 to 150° C. Further, the catalyst-remaining amount in the purified polyoxyalkylene polyol is preferably controlled to 90 ppm or less.

As the solid acid in the above-described first invention, composite metal oxides are listed which are prepared from different oxides including silicon oxide, boron oxide, titanium oxide, aluminum oxide, zirconium oxide, magnesium oxide, calcium oxide and zinc oxide. Specifically, at least one composite metal oxide is listed selected from aluminum silicate, magnesium silicate, zirconium silicate, titanium silicate, calcium silicate, zinc silicate, aluminum borate, magnesium borate, zirconium borate, titanium borate, aluminum zirconate and magnesium zirconate. Among them, aluminum silicate, magnesium silicate and mixtures thereof are a preferable.

As the compound having a P=N bond, at least one compound is listed selected from phosphazenium compounds, phosphine oxide compounds and phosphazene compounds.

As the phosphazenium compound, compounds represented by the chemical formula (1)

[CF1]

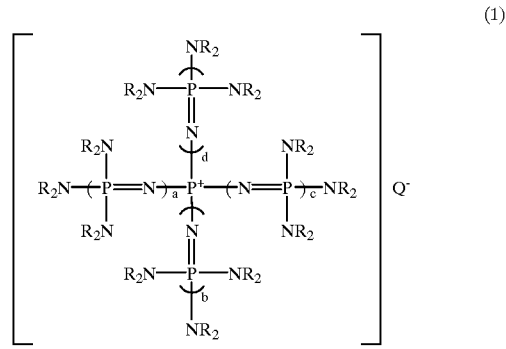

(1)

[wherein, a, b, c and d each represents a positive integer from 0 to 3, however, a, b, c and d are not simultaneously 0. Rs are the same or different and represent a hydrocarbon group having 1 to 10 carbon atoms, and in some cases, two Rs on the same nitrogen atom may bond to each other to form a ring structure. Q⁻ represents a hydroxy anion, alkoxy anion, aryloxy anion or carboxy anion.] are listed.

As the phosphine oxide compound, compounds represented by the chemical formula (2)

[CF2]

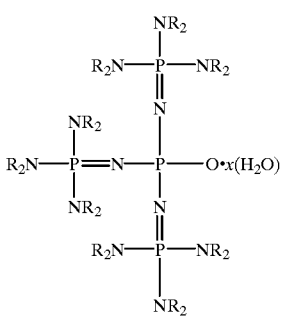

(2)

[wherein, Rs are the same or different and represent a hydrocarbon group having 1 to 10 carbon atoms, and x represents the amount of water contained in terms of molar ratio and is from 0 to 5.] are listed.

As the phosphazene compound, compounds represented by the chemical formula (3)
[CF3]

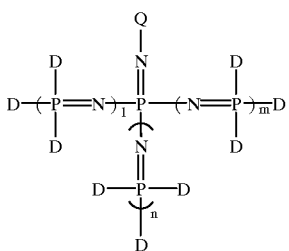

(3)

[wherein, 1, m and n each represents a positive integer from 0 to 3. Ds are the same or different and represent a hydrocarbon group having 1 to 20 carbon atoms, alkoxy group, phenoxy group, thiophenol residual group, mono-substituted amino group, di-substituted amino group, or a 5 to 6-membered cyclic amino group. Q represents a hydrocarbon group having 1 to 20 carbon atoms. Further, two Ds on the same phosphorus atom or different two phosphorus atoms may bond to each other and D and Q may bond to each other to form ring structures, respectively.] are listed.

As the above-described method for producing a crude polyoxyalkylene polyol, there is a method in which an epoxide compound is addition-polymerized to an active hydrogen compound in the presence of $1 \times 10^{-4}$ to $5 \times 10^{-1}$ mol of a catalyst based on 1 mol of the active hydrogen compound under conditions of a reaction temperature of 15 to 130° C. and a maximum reaction pressure of 882 kPa or less.

Regarding properties of a polyoxyalkylene polyol produced by the method of the present invention, a hydroxyl value is from 2 to 200 mg KOH/g, a total unsaturation degree is 0.07 meq./g or less, and a head-to-tail bond selectivity of an oxypropylene group in a polyoxyalkylene polyol by propylene oxide addition polymerization is 95 mol % or more. In addition to these properties, it is preferable that the content of an oxypropylene group is at least 50% by weight. Further, it is preferable that a hydroxyl value is from 9 to 120 mg KOH/g, a total unsaturation degree is 0.05 meq./g or less, a head-to-tail bond selectivity is 96 mol % or more, and the remaining amount of a catalyst composed of a compound having a P=N bond is 90 ppm or less.

The second invention is a method for producing a polymer-dispersed polyol wherein polymer particles are dispersed in a polyoxyalkylene polyol, in which the polyoxyalkylene polyol is produced by the above-described production method, then, 5 to 86 parts by weight of an ethylenically-unsaturated monomer is polymerized in 100 parts by weight of the polyoxyalkylene polyol at a temperature from 40 to 200© in the presence of a radical polymerization initiator to control the concentration of polymer particles to 5 to 60% by weight. The ethylenically-unsaturated monomer is preferably at least one monomer selected from acrylonitrile, styrene, acrylamide and methyl methacrylate.

The third invention is a method for producing an isocyanate group-ended prepolymer wherein a polyoxyalkylene polyol and a polyisocyanate are reacted, in which the polyoxyalkylene polyol is produced by the above-described production method, then, the polyisocyanate is reacted with the resulting polyoxyalkylene polyol at a temperature from 50 to 120© so as to obtain an isocyanate index of 1.3 to 10, to obtain an isocyanate group-ended prepolymer having an isocyanate group content (NCO %) of 0.3 to 30% by weight and a head-to-tail bond selectivity of a main chain in the prepolymer of 95 mol % or more. It is preferable that the content of a free isocyanate compound in the resulting prepolymer is 1% by weight or less.

The fourth invention is a method for producing an isocyanate group-ended prepolymer wherein a polymer-dispersed polyol and a polyisocyanate are reacted, in which the polymer-dispersed polyol is produced by the above-described production method, then, the polyisocyanate is reacted with the resulting polymer-dispersed polyol at a temperature from 50 to 120© so as to obtain an isocyanate index of 1.3 to 10, to obtain an isocyanate group-ended prepolymer having an isocyanate group content (NCO %) of 0.3 to 30% by weight.

The fifth invention is a method for producing a polyurethane resin, in which an isocyanate group-ended prepolymer is produced by the above-described method, then, the resulting isocyanate group-ended prepolymer and a chain extender are reacted at a temperature from 60 to 140° C. so as to obtain an isocyanate index of 0.6 to 1.5.

The sixth invention is a method for producing a polyurethane resin, in which a polyoxyalkylene polymer is produced by the above-described method, then, the resulting polyoxyalkylene polymer and an isocyanate group-ended prepolymer are reacted at a temperature from 10 to 50° C. so as to obtain an isocyanate index of 0.8 to 1.3.

The seventh invention is a method for producing a flexible polyurethane foam wherein a polyol containing a polyoxyalkylene polyol and a polyisocyanate are reacted in the presence of water, a catalyst and surfactant, in which the polyoxyalkylene polyol is produced by the above-described method, then, the polyol containing the resulting polyoxyalkylene polyol in an amount of at least 30% by weight in the polyol is used.

The eighth invention is a method for producing a flexible polyurethane foam wherein a polyol containing a polymer-dispersed polyol and a polyisocyanate are reacted in the presence of water, a catalyst and surfactant, in which the polymer-dispersed polyol is produced by the above-described method, then, the polyol containing the resulting polymer-dispersed polyol in an amount of at least 10% by weight in the polyol is used.

The characteristic of the present invention resides in a procedure in that a crude polyoxyalkylene polyol is produced using as a catalyst a compound having a P=N bond, and a remaining catalyst is removed by allowing the resulting crude polyoxyalkylene polyol to contact with a solid acid having a specific form to control the catalyst-remaining amount in the crude polyoxyalkylene polyol to 150 ppm or less.

The purification method using a solid acid of the present invention manifests lower product loss in the purification a process since neutralization treatment with an acid and the an like are not required and consequently the process can be simplified as compared with a conventional purification method using a solid acid (adsorbent). Also, due to a lower remaining amount of a catalyst, there is an advantage in that storage stability of an isocyanate group-ended prepolymer which is a derivative of a polyoxyalkylene polyol is improved. Further, properties of a polyurethane obtained by the prepolymer are also excellent.

According to the present invention, a polyoxyalkylene polyol of high purity can be produced easily by a simple method requiring no complicated process. Further, by applying the method for producing a polyoxyalkylene polyol of the present invention, there can be easily produced a polymer-dispersed polyol, isocyanate group-ended prepolymer, flexible polyurethane foam and polyurethane resin which are derivatives thereof.

The catalyst-remaining amount can be efficiently controlled to 150 ppm or less, by producing a crude polyoxyalkylene polyol using as a catalyst a compound having a P=N bond, especially, a compound represented by any of the above-described chemical formulae (1) through (3), and purifying the resulting crude polyoxyalkylene polyol with a solid acid a having specific form. Therefore, a polyoxyalkylene polyol of high quality having low impurity content can be produced. By controlling the catalyst-remaining amount in a polyol to 150 ppm or less, the storage stability of an isocyanate group-ended prepolymer obtained by reacting a polyol with a polyisocyanate compound increases. Further, a polyoxyalkylene polyol obtained by the present invention has low viscosity and has low monool content due to increased H—T bond selectivity.

A composite metal cyanide complex catalyst is known to act in producing a polyoxyalkylene polyol having low C=C content. However, this catalyst cannot be used in conducting addition-polymerization of ethylene oxide. Therefore, in addition-polymerization of ethylene oxide, changing to another catalyst is necessary and a complicated reaction operation is required. On the other hand, a catalyst composed of a compound having a P=N bond used in the present invention required no complicated reaction operation as described above. When a phosphine oxide compound (PZO) is used as a catalyst among compounds having a P=N bond, if the water content in an active hydrogen compound and catalyst is 600 ppm or less in a process for preparing a polymerization initiator for a polyoxyalkylene polyol, dehydration operation, de-salting operation and the like are not necessary. Therefore, the productivity of a polyoxyalkylene polyol increases.

A polymer-dispersed polyol produced by the method of the present invention is obtained by using as a dispersion medium a polyoxyalkylene polyol having a low catalyst-remaining amount and low monool content and having high H—T bond selectivity. Therefore, it has low viscosity. Consequently, even if the polymer particle concentration is raised, there can be produced a polymer-dispersed polyol having low viscosity and having excellent dispersion stability of a particle as compared with a conventional product.

An isocyanate group-ended prepolymer produced by the method of the present invention is obtained by using a polyoxyalkylene polyol having a low catalyst-remaining amount and low monool content and having high H—T bond selectivity, therefore, it manifests excellent abilities in mechanical property, and its exhibiting property and exterior form even in a wide range of polyurethane uses. In addition, the isocyanate group-ended prepolymer is also excellent in storage stability.

Further, a flexible polyurethane foam produced by the method of the present invention provides excellent durability in compression set, wet thermal compression set, repeated compression testing and the like, in addition to excellent molding property.

Therefore, the methods for producing a polyoxyalkylene polyol and a derivative thereof of the present invention are extremely useful methods for producing raw materials in polyurethane fields such as paints, adhesives, floor materials, sealing materials, shoe soles, elastomers and the like, surfactants, lubricants, hydraulic fluids, and sanitary products, and the like.

BEST MODE FOR CARRYING OUT THE INVENTION

The present invention will be described in detail below.
<Production Method of Polyoxyalkylene Polyol>
A method for producing a polyoxyalkylene polyol of the present invention will be first described.

In the method for producing a polyoxyalkylene polyol of the present invention, a crude polyoxyalkylene polyol is produced by addition polymerization of an epoxide compound to an active hydrogen compound using as a catalyst a compound having a P=N bond, then, the resulting crude polyoxyalkylene polyol is purified by contact with a solid acid having a specific form.

As the compound having a P=N bond used as a catalyst for producing a crude polyoxyalkylene polyol, there are listed phosphazenium compounds, phosphine oxide compounds and phosphazene compounds.

As the phosphazenium compound, compounds represented by the above-described chemical formula (1) or compounds represented by the chemical formula (4)

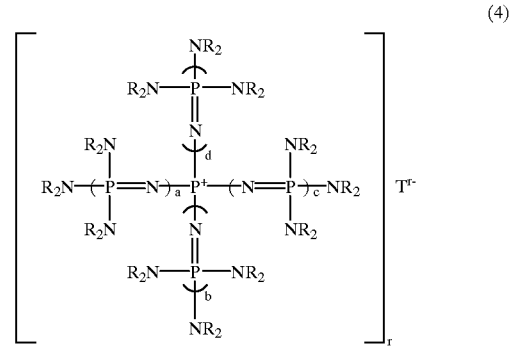

(4)

[wherein, a, b, c and d each represents a positive integer from 0 to 3, however, a, b, c and d are not simultaneously 0. Rs are the same or different and represent a hydrocarbon group having 1 to 10 carbon atoms, and in some cases, two Rs on the same nitrogen atom may bond to each other to form a ring structure. r is an integer from 1 to 3 and represents the number of phosphazenium cations, and $T^{r-}$ represents an inorganic anion having a valency of r.] are listed.

Among these compounds, it is preferable that the compound is represented by the chemical formula (1) are preferable.

Each of a, b, c and d in a phosphazenium cation represented by the chemical formula (1) or the chemical formula (4) in the present invention is a positive integer from 0 to 3. Herein, they are not simultaneously 0. An integer from 0 to 2 is preferable. Preferably they are represented by combination (2,1,1,1), (1,1,1,1), (0,1,1,1), (0,0,1,1) or (0,0,0,1) irrespective of order of a, b, c and d. More preferably they are represented by combination (1,1,1,1), (0,1,1,1), (0,0,1,1) or (0,0,0,1).

Rs in a phosphazenium cation represented by the chemical formula (1) or the chemical formula (4) in the present invention are the same or different and represent a hydrocarbon atom having 1 to 10 carbon atoms. Specifically, this R is selected from aliphatic or aromatic hydrocarbon groups such as, for example, methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, 1,1-dimethyl-3,3-dimethylbutyl (tert-octyl), nonyl, decyl, phenyl, 4-toluyl, benzyl, 1-phenylethyl, 2-phenylethyl and the like. Of them, aliphatic hydrocarbons having 1 to 10 carbon atoms such as methyl, ethyl, n-propyl, isopropyl, tert-butyl, tert-pentyl, tert-octyl and the like are preferable. A methyl group or ethyl group is more preferable.

When two Rs on the same nitrogen atom in a phosphazenium cation bond to form a ring structure, the divalent hydrocarbon group on the nitrogen atom is a divalent hydrocarbon group having a main chain composed of 4 to 6 carbon atoms (the ring is a 5 to 7-membered ring containing the nitrogen atom). Preferably, examples are tetramethylene, pentamethylene, hexamethylene and the like. Also, compounds obtained by substitution with an alkyl group such as methyl, ethyl and the like on the main chain are examples. Tetramethylene or the pentamethylene group is more preferable. All or a part of possible nitrogen atoms in a phosphazenium cation may form such ring structures.

$T^{r-}$ in the chemical formula (4) represents an inorganic anion having a valency of r. r is an integer from 1 through 3. Examples of such an inorganic anion include boric acid, tetrafluoric acid, hydrocyanic acid, thiocyanic acid; hydrohalogenic acid such as hydrofluoric acid, hydrochloric acid, hydrobromic acid or the like; nitric acid, sulfuric acid, phosphoric acid, phosphorus acid, hexafluorophosphoric acid, carbonic acid, hexafluoroantimonic acid, hexafluorothalliumic acid, perchloric acid and the like. As the inorganic anion, there are also $HSO_4^-$ and $HCO_3^-$. These inorganic anions can be exchanged mutually by an ion exchange reaction. Among these inorganic anions, anions of inorganic acids such as boric acid, tetrafluoroboric acid, hydrohalogenic acid, phosphoric acid, hexafluorophosphoric acid, perchloric acid and the like are more preferable. Chrorine anion is preferable still.

When a phosphazenium compound represented by the chemical formula (4) is used as a catalyst, it is necessary to previously prepare a salt of an alkaline metal or alkaline earth metal of an active hydrogen compound. The preparation method of this salt may be a conventionally known method. As the salt of an alkaline metal or alkaline earth metal of an active hydrogen compound to be allowed to coexist with a compound represented by the formula (4) is a salt in which an active hydrogen in an active hydrogen compound is dissociated as a hydrogen ion and is substituted by an alkaline metal or alkaline earth metal ion.

Examples of preferable embodiments of a compound represented by the chemical formula (1) include tetrakis[tris(dimethylamino)phosphoranylideneamino]phospho nium hydroxide, tetrakis[tris(dimethylamino)phosphoranylideneamino]phospho nium methoxide, tetrakis[(tris(dimethylamino)phosphoranylideneamino]phospho nium ethoxide, tetrakis[tri(pyrrolidine-1-yl)phosphoranylideneamino]phosphoniumtert-butoxide, and the like.

As the phosphine oxide compound, compounds represented by the above-described chemical formula (2) are listed. Rs in a phosphine oxide compound represented by the chemical formula (2) are the same or different and represent a hydrocarbon atom having 1 through 10 carbon atoms. This R is selected from aliphatic or aromatic hydrocarbon groups such as, for example, methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, 1,1-dimethyl-3,3-dimethylbutyl (under the name of tert-octyl), nonyl, decyl, phenyl, 4-toluyl, benzyl, 1-phenylethyl, 2-phenylethyl and the like. Further, R may be in the form of a pyrrolidino group or pyperidino group. Of them, the same or different aliphatic hydrocarbon groups having 1 through 8 carbon atoms such as methyl, ethyl, n-propyl, isopropyl, tert-butyl, tert-pentyl, 1-dimethyl -3,3-dimethylbutyl and the like are preferable. A methyl group or ethyl group is more preferable.

A phosphine oxide compound represented by the chemical formula (2) can be synthesized by a method described in the Journal of General Chemistry of the USSR, Vol. 55, p. 1453 (1985) or by an analogous method. Usually, a phosphine oxide compound represented by the chemical formula (2) has a hygroscopic property, and tends to become a water-containing material or a hydrate. x showing the amount of a water molecule contained in a phosphine oxide compound is represented in terms of molar ratio based on this phosphine oxide compound, and x is from 0 through 5 and preferably from 0 through 2.

Preferable embodiments of a phosphine oxide compound include tris[tris(dimethylamino)phosphoranylideneamino] phosphine oxide or tris[tris(diethylamino)phosphoranylideneamino]phosphine oxide and the like.

As the phosphazene compound, compounds shown in Japanese Laid-Open Patent Publication (JP-A) No. Hei-10-36499 of a patent application by the present applicant are listed. Specifically, compounds represented by the above-described chemical formula (3) are listed.

Examples of Q in the chemical formula (3), namely a hydrocarbon group having 1 through 20 carbon atoms include alkyl groups such as methyl, ethyl, propyl, isopropyl, n-butyl, isobutyl, sec-butyl, tert-butyl, pentyl, neopentyl, hexyl, heptyl, octyl, tert-octyl, nonyl, decyl and the like; alkyl groups having an unsaturated bond or aromatic group such as allyl, 2-methylallyl, benzyl, phenetyl, o-anisyl, 1-phenylethyl, diphenylmethyl, triphenylmethyl, cinnamyl and the like; alicyclic groups such as cyclopentyl, cyclohexyl, 4-methylcyclohexyl, 3-propylcyclohexyl, 4-phenylcyclohexyl, cycloheptyl, 1-cyclohexenyl and the like; alkenyl groups such as vinyl, styryl, propenyl, isopropenyl, 2-methyl-1-propenyl, 1,3-butadienyl and the like; alkynyl groups such as ethynyl, 2-propynyl and the like; and aromatic groups such as phenyl, o-tolyl, m-tolyl, p-tolyl, 2,3-xylyl, 2,4-xylyl, 3,4-xylyl, mesityl, o-cumenyl, m-cumenyl, p-cumenyl, 1-naphthyl, 2-naphthyl, p-methoxyphenyl and the like.

Examples of D in the chemical formula (3), namely a hydrocarbon group having 1 through 20 carbon atoms include alkyl groups such as methyl, ethyl, propyl, isopropyl, n-butyl, isobutyl, sec-butyl, tert-butyl, pentyl, ncopentyl, hexyl, heptyl, octyl, tert-octyl, nonyl, decyl and the like; alkyl groups having an unsaturated bond or aromatic group such as allyl, 2-methylallyl, benzyl, phenetyl, o-anisyl, 1-phenyletliyl, diphenylmethiyl, triphenylmethyl, cinnamyl and the like; alicyclic groups such as cyclopentyl, cyclohexyl, 4-methylcyclohexyl, 3-propylcyclohexyl, 4-phenylcyclohexyl, cycloheptyl, 1-cyclohexenyl and the like; alkenyl groups such as vinyl, styryl, propenyl, isopropenyl, 2-methyl-1-propenyl, 1,3-butadienyl and the like; alkynyl groups such as ethynyl, 2-propynyl and the like; and aromatic groups such as phenyl, o-tolyl, m-tolyl, p-tolyl, 2,3-xylyl, 2,4-xylyl, 3,4-xylyl, mesityl, o-cumenyl, m-cumenyl, p-cumenyl, 1-naphthyl, 2-naphthyl, p-niethoxyphenyl and the like.

The alkoxy group represented by D is an alkoxy group having 1 through 20 carbon atoms such as, for example, methoxy, ethoxy, propoxy, isopropoxy, butoxy, pentyloxy, allyloxy, cyclohexyloxy, benzyloxy and the like, the phenoxy group represented by D is a phenoxy group having 6 through 20 carbon atoms such as, for example, phenoxy, 4-methylphenoxy, 3-propylphenoxy, 1-naphthyloxy and the like, the thiol residue represented by D is a thiol residue having 1 through 20 carbon atoms such as, for example, methylthio, ethylthio, propylthio, isopropylthio, butylthio, isobutylthio, tert-butylthio, pentylthio, hexylthio, heptylthio, octylthio, tert-octylthio, nonylthio, decylthio and the like.

The thiophenol residue represented by D is a thiophenol residue having 6 through 20 carbon atoms such as, for example, phenylthio, o-toluylthio, m-toluylthio, p-toluylthio, 2,3-xylylthio, 2,4-xylylthio, 3,4-xylylthio, 4-ethylphenylthio, 2-naphthylthio and the like; and the mono-substituted amino group represented by D is a mono-substituted amino group having 1 through 20 carbon atoms such as, for example, methylamino, ethylamino, propylamino, isopropylamino, butylamino, isobutylamino, tert-butylamino, pentylamino, hexylamino, heptylamino, octylamino, tert-octylamino, nonylamino, decylamino, 1-ethylpropylamino, 1-ethylbutylamino, anilino, o-toluylamino, m-toluylamino, p-toluylamino, 2,3-xylynoamino, 2,4-xylynoamino, 3,4-xylynoamino and the like.

The di-substituted amino group represented by D is an amino group di-substituted with the same or different hydrocarbon groups having 1 through 20 carbon atoms such as, for example, diniethylamino, diethylamino, methylethylamino, dipropylamino, metilylpropylamino, diisopropylamino, dibutylamino, methylbutylamino, diisobutylamino, di-sec-butylamino, dipentylamino, dihexylamino, ethylhexylamino, dilheptylamino, dioctylamino, di-tert-octylamino, ethyl-tert-octylamino, dinonylamino, didecylamino, diphenylamino, methylphenylamino, ethylphenylamino, di-o-toluylamino, di-2,3-xylylamino, phenyltoluylamino and the like, and there arc listed 5 to 6-membered cyclic amino groups such as 1-pyrrolidinyl, 3-methyl-1-pyrrolidinyl, 1-pyrrolyl, 3-ethyl-1-pyrrolyl, 1-indolyl, 1-piperidyl, 3-metlhyl-1-piperidyl, 1-piperazinyl, 4-methyl-1-piperazinyl, 1-imidazolydinyl, 4-morpholinyl and the like.

When two Ds on the same phosphorus atom or on two different phosphorus atoms bond to form a possible whole or partial ring structure, the divalent group (D—D) on a phosphorus atom is a saturated or unsaturated aliphatic divalent hydrocarbon group such as ethylene, vinylene, propylene, 1,2-cyclohexanylene, 1,2-phenylene, trimethylene, propenylene, tetramethylene, 2,2'-biphenylene, 1-butenylene, 2-butenylene, pentamethylene and the like.

Further, there are listed divalent groups in which any one or two selected from the group consisting of an oxygen atom, sulfur atom and hydrogen atom or a nitrogen atom to which an aliphatic or aromatic hydrocarbon group such as a methyl group, ethyl group, butyl group, cyclohexyl group, benzyl group, phenyl group and the like is bonded are inserted into one or both of the bonds between the both ends of the divalent group and a phosphorus atom.

Specific examples of the divalent group include methyleneoxy, ethylene-2-oxy, trimethylene-3-oxy, methylenedioxy, ethylenedioxy, trimethylene-1,3-dioxy, cyclohexane-1,2-dioxy, benzene-1,2-dioxy, methylenethio, ethylene-2-thio, trimethylene-3-thio, tetramethylene-4-thio, methylenedithio, ethylenedithio, trimethylene-1,3-dithio, iminomethylene, 2-iminoethylene, 3-iminotrimethylene, 4-iminotetramethylene, N-ethyliminomethylene, N-cyclohexyl-2-iminoethylene, N-methyl-3-iminotrimethylene, N-benzyl-4-iminotetramethylene, diiminomethylene, 1,2-diiminoethylene, 1,2-diiminovinylene, 1,3-diiminotrimethylene, N,N'-dimethyldiiminomethylene, N,N'-diphenyl-1,2-diiminoethylene, N,N'-dimethyl-1,2-diiminoethylene, N-methyl-N'-ethyl-1,3-diiminotrimethylene, N,N'-diethyl-1,4-diiminotetramethylene, N-methyl-1,3-diiminotrimethylene and the like.

When D and Q bond to each other to form a possible whole or partial ring structure, the divalent group (D—Q) connecting a nitrogen atom and a phosphorus atom is the same saturated or unsaturated aliphatic divalent hydrocarbon group as the divalent group on a phosphorus atom described above, and there are listed divalent groups in which any one selected from the group consisting of an oxygen atom, sulfur atom and hydrogen atom or a nitrogen atom to which an aliphatic or aromatic hydrocarbon group such as a methyl group, ethyl group, butyl group, cyclohexyl group, benzyl group, phenyl group and the like is bonded is inserted into a bond between the divalent hydrocarbon group and a phosphorus atom.

Specific examples of the divalent group include methyleneoxy, ethylene-2-oxy, methylenethio, ethylene-2-thio, iminomethylene, 2-iminoethylene, N-methyliminomethylene, N-ethyl-2-iminotriethylene, N-methyl-3-iminotrimethylene, N-phenyl-2-iminoethylene and the like.

Regarding specific examples of a phosphazene compound having a structure represented by the chemical formula (3), examples thereof when Ds are the same or different alkyl groups include 1-tert-butyl-2,2,2-trimethylphosphazene, 1-(1,1,3,3-tetramethylbutyl)-2,2,4,4,4-pentaisopropyl-$2\lambda^5$,$4\lambda^5$-catenadi(phosphazene) and the like.

Examples thereof when D is an alkyl group having an unsaturated bond or an aromatic group include 1-tert-butyl-2,2,2-triallylphosphazene, 1-cyclohexyl-2,2,4,4,4-pentaallyl-$2\lambda^5$,$4\lambda^5$-catenadi(phosphazene), 1-ethyl-2,4,4,4-tribenzyl-2-tribenzylphosphoranylideneamino-$2\lambda^5$,$4\lambda^5$-catenadi(phosphazene), and the like.

Examples thereof when D is an alicyclic group include 1-methyl-2,2,2-tricyclopcntylphosphazene, 1-propyl-2,2,4,4,4-cyclohexyl-$2\lambda^5$,$4\lambda^5$-catenadi(phosphazene), and the like. Examples thereof when D is an alkenyl group include 1-butyl-2,2,2-trivinylphosphazene, 1-tert-butyl-2,2,4,4,4-pentastyryl-$2\lambda^5$,$4\lambda^5$-catenadi(phospihazene), and the like. Examples thereof when D is an alkynyl group include 1-tert-butyl-2,2,2-tri(2-phenylethynyl)phosphiazene, and the like, and examples thereof when D is an aromatic group include 1-isopropyl-2,4,4,4-tetraphenyl-2-triphenylphosphoranylideneamino-$2\lambda^5$,$4\lambda^5$-catenadi(phosphazene), and the like.

Examples thereof when D is an alkoxy group include 1-tert-butyl-2,2,2-trimethoxyphosphazene, 1-(1,1,3,3-tetramethylbutyl)-2,2,4,4,4-pentaisopropoxy-2$\lambda^5$,4$\lambda^5$-catenadi(phosphazene) or 1-phenyl-2,2,4,4,4-pentabenzyloxy-2$\lambda^5$,4$\lambda^5$-catenadi(phosphazene), and the like. Examples thereof when D is a phenoxy group include 1-methyl-2,2,2-triphenoxyphosphazene, 1-tert-butyl-2,2,4,4,4-penta(1-naphthyloxy)-2$\lambda^5$,4$\lambda^5$-catenadi(phosphazene), and the like.

Examples thereof when D is a di-substituted amino group include 1-tert-butyl-2,2,2-tris(dimethylamino)phosphazene, 1-(1,1,3,3-tetramethylbutyl)-2,2,2-tris(dimethylamino)phosphazene, 1-ethyl-2,2,4,4,4-pentakis(dimethylamino)-2$\lambda^5$,4$\lambda^5$-catenadi(phosphazene), 1-tert-butyl-2,4,4,4-tetrakis(dimethylamino)-2-tris(dimethylamino)phosphoranylideneamino-2$\lambda^5$,4$\lambda^5$-catenadi(phosphazene), 1-tert-butyl-2,4,4,4-tetrakis(diisopropylamino)-2-tris(diisopropylamino)phosphoranylideneamino-2$\lambda^5$,4$\lambda^5$-catenadi(phosphazene), 1-tert-butyl-2,4,4,4-tetrakis(di-n-butylamino)-2-tris(di-n-butylamino)phosphoranylideneamino-2$\lambda^5$,4$\lambda^5$-catenadi(phosphazene), 1-tert-butyl-4,4,4-tris(dimethylamino)-2,2-bis[tris(dimethylamino)phosphoranylideneamino]-2$\lambda^5$,4$\lambda^5$-catenadi(phosphazene), 1-(1,1,3,3-tetramethylbutyl)-4,4,4-tris(dimethylamino)-2,2-bis[tris(dimethylamino)phosphoranylideneamino]-2$\lambda^5$,4$\lambda^5$-catenadi(phosphazene), 1-(1,1,3,3-tetramethylbutyl)-4,4,4-tris(methylethylamino)-2,2-bis[tris(methylethylamino)phosphoranylideneamino]-2$\lambda^5$,4$\lambda^5$-catenadi(phosphazene), 1-tert-butyl-4,4,4-tris(diethylamino)-2,2-bis[tris(diethylamino)phosphoranylideneamino]-2$\lambda^5$,4$\lambda^5$-catenadi(phosphazene), 1-tert-butyl-4,4,4-tris(diisopropylamino)-2,2-bis[tris(diisopropylamino)phosphoranylideneamino]-2$\lambda^5$,4$\lambda^5$-catenadi(phosphazene), 1-tert-butyl-4,4,4-tris(di-n-butylamino)-2,2-bis[tris(di-n-butylarnino)phosphoranylideneamino]-2$\lambda^5$,4$\lambda^5$,6$\lambda^5$-catenadi(phosphazene), 1-tert-butyl-4,4,6,6,6-pentakis(dimethylamino)-2,2-bis[tris(dimethylamino)phosphoranylideneamino)]-2$\lambda^5$,4$\lambda^5$,6$\lambda^5$-catenatri(phosphazene), 1-tert-butyl-4,4,6,6,6-pentakis(dimethylamino)-2,2-bis[tris(diethylamino)phosphoranylideneamino]-2$\lambda^5$,4$\lambda^5$,6$\lambda^5$-catenatri(phosphazene), 1-tert-butyl-4,4,6,6,6-pentakis(diisopropylamino)-2,2-bis[(tris(diisopropylamino)phosphoranylideneamino]-2$\lambda^5$,4$\lambda^5$,6$\lambda^5$-catenatri(phosphazene), 1-tert-butyl-4,4,6,6,6-pentakis(di-n-butylamino)-2,2-bis[tris(di-n-butylamino)phosphoranylideneamino]-2$\lambda^5$,4$\lambda^5$,6$\lambda^5$-catenatri(phosphazene), 1-tert-butyl-4,4,6,6,6-pentakis(dimethylamino)-2-[2,2,2-tris(dimethylamino)phosphazene-1-yl]-2-[2,2,4,4,4-pentakis(dimethylamino)-2$\lambda^5$,4$\lambda^5$-catenadi(phosphazene)-1-yl]-2$\lambda^5$,4$\lambda^5$,6$\lambda^5$-catenatri(phosphazene), 1-phenyl-2,2-bis(dimethylamino)-4,4-dimethoxy-4-phenylamino-2$\lambda^5$,4$\lambda^5$-catenadi(phosphazene), and the like.

Further, when Ds on the same phosphorus atom or two different phosphorus atoms bond to each other to form a ring structure, examples thereof include 2-(tert-butylimino)-2-dimethylamino-1,3-dimethyl-1,3-diaza-2$\lambda^5$-phosphinane, and the like.

Examples of preferable embodiments of a phosphazene compound include 1-tert-butyl-2,2,2-tris(dimethylamino)phosphazene, 1-(1,1,3,3-tetrametliylbutyl)-2,2,2-tris(dimethylamino)phospliazene, 1-ethyl-2,2,4,4,4-pntakis(dimethylamino)-2$\lambda^5$,4$\lambda^5$-catenadi(phosphazene), 1 1-tert-butyl-4,4,4-tris(dimethylamino)-2,2-bis-2$\lambda^5$,4$\lambda^5$-catenadi(phosphazen), 1-(1,1,3,3-tetramethylbutyl)-4,4,4-tris(diniethylaniino)-2,2-bis-2$\lambda^5$,4$\lambda^5$-catenadi(phosphazen e), 1-tert-butyl-2,2,2-tri(1-pyrrolidinyl)phosphazene, 7-ethyl-5,11-dimethyl-1,5,7,11-tetraaza-6$\lambda^5$-phosphaspiroundeca-1(6)-ene, and the like. Of the compounds having a P=N bond as described above in detail, phosphazenium compound, phosphine oxide compound and mixtures thereof are preferable in view of industrial applicability of the catalyst.

As the active hydrogen compound used in the present invention, alcohols, phenol compounds, polyamines, alkanolamines, thioalcohols and the like are listed. Examples thereof include water, divalent alcohols such as ethylene glycol, diethylene glycol, triethylene glycol, propylene glycol, dipropylene glycol, tripropylene glycol, 1,5-pentanediol, neopentyl glycol, 2-methyl-1,5-pentanediol, 2-ethyl-1,4-butanediol, 1,4-dimethylolcyclohexane, 1,3-propanediol, 1,4-cyclohexanediol, 1,3-butanediol, 1,4-butanediol, 1,6-hexanediol, 1,4-cyclohexanediol and the like, alkanolamines such as monoethanolamine, diethanolamine, triethanolamine and the like, polyhydric alcohols such as glycerine, diglycerine, trimethylolpropane, trimethylolethane, trimethylolbutane, ditrimethylolpropane, pentaerythritol, dipentaerythritol, tripentaerythritol and the like, saccharides such as glucose, sorbitol, dextrose, fructose, saccharose, methylglucoside and the like, or derivatives thereof, fatty amines such as ethylenediamine, di(2-aminoethyl)amine, hexamethylenediamine and the like, aromatic amines such as toluylenediamine, diphenylmethanediamine and the like, phenol compounds such as bisphenol A, bisphenol F, bisphenol S, novolak, resol, resorcine and the like, as well as other compounds.

Further, there are listed divalent thioalcohols such as ethylenethioglycol, propylenethioglycol, trimethylenethioglycol, butanedithiol and the like, and alkylenethioglycols such as diethylenethioglycol, triethylenethioglycol and the like. These active hydrogen compounds can also be used in combination of two or more.

Further, there can also be used compounds obtained by addition-polymerization of an epoxide compound to these active hydrogen compounds by a conventionally known method.

Of these compounds, most preferable are divalent alcohols, compounds having an average molecular weight of up to 2000 obtained by addition-polymerization of an alkylene oxide to divalent alcohols, trivalent alcohols, and compounds having an average molecular weight of up to 2000 obtained by addition-polymerization of an alkylene oxide to trivalent alcohols. Compounds having an average molecular weight of over 2000 after addition of an epoxide compound to divalent alcohols or trivalent alcohols are not preferable due to increased amounts of by-produced monools.

As the epoxide compound to be addition-polymerized to the above-described active hydrogen compound, propylene oxide, ethylene oxide, 1,2-butylene oxide, 2,3-butylene oxide, styrene oxide, cyclohexene oxide, epichlorohydrin, epibromohydrin, methyl glycidyl ether, allyl glycidyl ether and the like are listed. These may be used in combination of two or more. Of them, preferable are propylene oxide, ethylene oxide, 1,2-butylene oxide, 2,3-butylene oxide and styrene oxide. More preferable are propylene oxide and ethylene oxide. It is preferable that propylene oxide occupies at least 50% by weight of the total amount of epoxide compounds. This proportion is more preferably at least 60t by weight, and preferably still at least 70% by weight. By using an epoxide compound containing such proportion of propylene oxide, the amount of an oxypropylene group in a polyoxyalkylene polyol can be controlled to at least 50% by weight. The suitable content of an oxypropylene group is at least 60% by weight, preferably still, at least 70% by weight. When the content of an oxypropylene group is 50% by weight or more, the viscosity of a polyoxyalkylene polyol decreases and the flexibility of an urethane resin obtained from this polyol is improved.

The amount used of the above-described compound having a P=N bond which is a catalyst is from $1\times10^{-4}$ to $5\times10^{-1}$ mol based on 1 of an active hydrogen compound. It is preferably from $5\times10^{-4}$ to $1\times10^{-1}$ mol, more preferably from $1\times10^{-3}$ to $1\times10^{-2}$ mol. When the molecular weight of a polyoxyalkylene polyol is increased, the concentration of a compound having a P=N bond in an active hydrogen compound is preferably increased in the above-described range. When the amount of a compound having a P=N bond is less than $1\times10^{-4}$ mol based on 1 mol of an active hydrogen compound, the polymerization speed of an epoxide compound decreases and the production time of a polyoxyalkylene polyol is elongated. Conversely, when over $5\times10^{-1}$ mol, the cost of a catalyst composed of a compound having a P=N bond occupying in the production cost of a polyoxyalkylene polyol increases.

The temperature at which an epoxide compound is addition-polymerized to an active hydrogen compound is from 15 to 30° C. It is in the range preferably from 40 to 120° C., preferably still from 50 to 110° C. When the addition-polymerization of an epoxide compound is conducted at a lower temperature in the above-described range, it is preferable to raise the concentration of a compound having a P=N bond in an active hydrogen compound in the above-described range. When the addition-polymerization temperature of an epoxide compound is lower than 15° C., the polymerization speed of an epoxide compound lowers leading to elongation of the production time of a polyoxyalkylene polyol. On the other hand, when the addition-polymerization temperature is over 130° C., the total unsaturation degree (C=C) increased over 0.07 meq./g, though it is dependent on the hydroxyl value (OHV) of a polyoxyalkylene polyol.

The maximum pressure in the addition-polymerization reaction of an epoxide compound is 882 kPa or lower. Usually, the addition-polymerization of an epoxide compound is conducted in a pressure proof reaction apparatus. The reaction of an epoxide compound may be initiated from a reduced pressure condition or from an atmospheric pressure condition. When initiated from an atmospheric pressure condition, it is desirably conducted in the presence of an inactive gas such as nitrogen, helium and the like. When the maximum reaction pressure of an epoxide compound is over 882 kPa, the amount of by-produced monools increases. The maximum reaction pressure is preferably 686 kPa or lower, and preferably still at 490 kPa or lower. When propylene oxide is used as the epoxide compound, the maximum reaction pressure is preferably 490 kPa or less.

For feeding an epoxide compound to the polymerization system, a method in which a part of an epoxide compound in a required amount is fed in one portion, and the remaining part is continuously fed, a method in which all of an epoxide compound is continuously fed, and the like are used. In the method in which a part of an epoxide compound in a required amount is fed in one portion, it is preferable that the reaction temperature in the early period of a polymerization reaction of an epoxide compound is at a lower side in the above-described temperature range and after charging of an epoxide compound, the reaction temperature is raised gradually.

As the polymerization method in which propylene oxide and ethylene oxide are used together as epoxide compounds, there are (1) an ethylene oxide cap reaction in which after polymerization of propylene oxide, ethylene oxide is block-copolymerized, (2) a random reaction in which propylene oxide and ethylene oxide are random-copolymerized, and (3) a triblock copolymerization reaction in which after polymerization of propylene oxide, ethylene oxide is polymerized, then, propylene oxide is polymerized. Of these methods, preferable are the ethylene oxide cap method and triblock copolymerization method.

The maximum pressure of an addition-polymerization apparatus is influenced by the charging speed of an epoxide compound, polymerization temperature, amount of a catalyst and the like. The charging speed of an epoxide compound is preferably controlled so that the maximum pressure of an addition-polymerization apparatus does not exceed 882 kPa. When charging of an epoxide compound is completed, the inner pressure of an addition-polymerization apparatus decreases gradually. It is preferable to continue the addition-polymerization reaction until change in the inner pressure is not recognized. When based on the hydroxyl value (OHV) of a polyoxyalkylene polyol, it is preferable to continue the addition-polymerization until OHV becomes 2 through 200 mg KOH/g.

In conducting the addition-polymerization reaction of an epoxide compound, a solvent can also be used if necessary. Examples of the solvent include aliphatic hydrocarbons such as pentane, hexane, heptane and the like, ethers such as diethyl ether, tetrahydrofuran, dioxane and the like, aprotic polar solvents such as dimethylsulfoxide, N,N-dimethylformainide and the like, as well as other compounds. When a solvent is used, it is desirable that the solvent is recovered after production and is recycled so that the production cost of a polyoxyalkylene polyol does not increase.

In the method for producing a polyoxyalkylene polyol using a phosphine oxide compound as a catalyst of the present invention, when water content of an active hydrogen compound (excepting water) and a phosphine oxide compound is low, operation such as heat and pressure-reduced dehydration treatment, de-saltingreaction or the like-maynotbe conducted in a process for preparing a polymerization initiator for a polyoxyalkylene polyol. Usually, in the most widely flourishing method using a KOH catalyst, it is required that before addition-polymerization of an epoxide compound to an active hydrogen compound, KOH and the active hydrogen compound are charged into a reaction apparatus, and heat and pressure-reduced dehydration treatment is conducted under conditions of a temperature of 100 to 120° C. and a pressure of 1.33 kPa or less for 3 to 8 hours, to prepare a polymerization initiator (potassium salt of active hydrogen compound). Further, in the method using a phosphazenium compound catalyst in which an inorganic compound described in Japanese Laid-Open Patent Publication (JP-A) No. Hei-10-77289 or International Publication WO 98/54241 (EP 0916686A1) is a counter anion, de-salting reaction with the above-described potassium salt of an active hydrogen compound should be conducted to prepare a polymerization initiator. The water content in the case wherein heat and pressure-reduced dehydration treatment may not be conducted is preferably 600 ppm or less, preferably still 400 ppm or less, and most preferably 300 ppm or less based on the total amount of the active hydrogen compound and phosphine oxide compound.

Next, a method for purifying a crude polyoxyalkylene polyol produced as described above will be described. The main object of the purification resides in removal of a compound having a P=N bond remaining in the crude polyoxyalkylene polyol. The present inventors have found that by allowing a crude polyoxyalkylene polyol to contact with a solid acid having a particular specific surface area and average pore diameter, the remaining catalyst can be removed efficiently and the remaining amount of the catalyst can be controlled to not more than a particular value. Particularly, a solid acid having a specific surface area of 450 to 1200 m²/g and an average pore diameter of 40 to 100 Å is useful.

In view of the ability for removing a compound having a P=N bond (hereinafter, referred to as catalyst), the specific surface area of a solid acid is an important factor. The specific surface area of a solid acid is preferably from 500 to 1100 m²/g, preferably still, from 550 to 1000 m²/g. When the specific surface area is less than 450 m²/g, the ability for removing a catalyst in a crude polyoxyalkylene polyol lowers. On the other hand, in view of efficiency in recovering a crude polyoxyalkylene polyol from a mixed solution of the crude polyoxyalkylene polyol and solid acid, the upper limit of a specific surface area is 1200 m²/g.

The average pore diameter is preferably from 50 to 100 Å, preferably still, from 55 to 95 Å. A solid acid having an average pore diameter of less than 40 Å, for example, zeolite or the like, has lower ability for removing a catalyst. On the other hand, in view of the molecular diameter of a catalyst, specific surface area of a solid acid, and the like, the upper limit of the average pore diameter of the solid acid is 100 Å. Further, for improving the ability for removing a catalyst, it is preferable to use a solid acid having a specific surface area and an average pore diameter within the above-described ranges and a diameter in the range from 10 through 60 Å.

As the solid acid having the above-described form, clay minerals such as acid clay, montmorillonite and the like, composite metal oxides such as aluminum silicate, magnesium silicate and the like, metal sulfate salt or phosphate salt and the like, solidified acids such as silica gel-phosphoric acid, and the like, and cation exchange resins are listed. For the object of the present invention, a composite metal oxide having the above-described specific surface area and average pore diameter is preferable. As such a composite metal oxide, there are listed composite metal oxides prepared using different oxides such as silicon oxide, boron oxide, titanium oxide, aluminum oxide, zirconium oxide, magnesium oxide, calcium oxide, zinc oxide and the like. Specifically, aluminum silicate, magnesium silicate, zirconium silicate, titanium silicate, calcium silicate, zinc silicate, aluminum borate, magnesium borate, zirconium borate, titanium borate, aluminum zirconate, magnesium zirconate, and the like. In addition to these composite metal oxides, a single metal oxide substance such as silica gel and the like can be used providing the form described above is satisfied.

Solid acids particularly preferably used include aluminum silicate, magnesium silicate and mixtures thereof. It is preferable that these are synthetic products not natural products. As commercially available products of a solid acid having such properties, KW-600 BUP—S, KW-700 PEL, KW-700 SEL (trade name) and the like manufactured by Kyowa Chemical Industry K.K. are listed. Of them, KW-700 PEL and KW-700 SEL are preferable, and KW-700 SEL is most preferable.

As the synthetic aluminum silicate, those having a silicon dioxide content of 55 to 75% by weight and an aluminum oxide content of 5 to 25% by weight are preferable. As a chemical composition thereof, $Al_2O_3 \cdot nSiO_2 \cdot mH_2O$ is exemplified (n and m are the numbers of coordination of silicon dioxide and water to aluminum oxide, respectively). That in which water is coordinated is preferable. As a synthetic magnesium silicate, those having a silicon dioxide content of 55 to 70% by weight and a magnesium oxide content of 5 to 20% by weight are preferable. As chemical composition thereof, $MgO \cdot xSiO_2 \cdot yH_2O$ is exemplified (x and y are the numbers of coordination of silicon dioxide and water to magnesium oxide, respectively). That in which water is coordinated is particularly preferable.

The temperature at which a crude polyoxyalkylene polyol is allowed to contact with a solid acid may be a temperature near room temperature. However, when shortening of the treatment time and improvement in ability for removing a catalyst are taken into consideration, the contact temperature is preferably in the range from 50 to 150° C. It is more preferably from 60 to 140° C., and preferably still from 70 to 130° C. When the molecular weight of a polyoxyalkylene polyol is larger, contact at a temperature of 50° C. or more is preferable due to increased viscosity. When over 150° C., a crude polyoxyalkylene polyol tends to be colored.

As the method for allowing a crude polyoxyalkylene polyol to contact with a solid acid, two methods, a batch-wise method and a continuous method are listed. The batch-wise method is, for example, a method in which a solid acid is added to a crude polyoxyalkylene polyol charged into a reaction apparatus, and they are mixed by stirring. For the purpose of preventing coloring and degradation of a polyoxyalkylene polyol, it is preferable to conduct mixing by stirring in the presence of an inert gas. The amount used of a solid acid is from 0.01 to 2% by weight based on a crude polyoxyalkylene polyol. It is preferably from 0.05 to 1.5% by weight, and preferably still from 0.1 to 1% by weight. The contact time is preferably from 1 to 6 hours under the above-described temperature condition though it depends on the scale. The continuous method is a method in which a crude polyoxyalkylene polyol is passed though a column charged with a solid acid. The superficial velocity is preferably from about 0.1 to 3 (1/hr) though it depends on the scale. After contact with a solid acid, a polyoxyalkylene polyol is recovered by an ordinary method such as filtration, centrifugal separation and the like.

For further improving ability of a solid acid to adsorb a catalyst, it is preferable that, when a crude polyoxyalkylene polyol is allowed to contact with a solid acid, water in an amount of 0.1 to 10% by weight is allowed to coexist with the crude polyoxyalkylene polyol. This amount is more preferably from 1 to 8% by weight, and preferably still from 2 to 7% by weight. For coexistence of a solid acid with water, these may be advantageously added into a polyol. The order for addition of these is not restricted. The temperature when water is added to a crude polyoxyalkylene polyol is preferably from 50 to 150° C. In the case of addition of water, a crude polyoxyalkylene polyol and a solid acid are mixed by stirring, for example, at a temperature of 90° C. for 5 hours, then, pressure-reduced dehydration operation is conducted, for example, under conditions of a temperature of 110° C. and a pressure of 1.33 kPa, to remove water.

For preventing degradation of a polyoxyalkylene polyol, an antioxidant is preferably added to the polyoxyalkylene polyol. The antioxidant may be used alone or in combination with two or more. Examples of the antioxidant include tert-butylhydroxytoluene (BHT), pentaerythrityl-tetrakis-3-(3,5-di-tert-butyl-4-hydroxyphenyl)propionate, octadecyl-3-(3,5-di-tert-butyl-4-hydroxyphenyl)-propionate, 7 ethylhexylphosphite, 4,4'-bis-α,α'-dimethylbenzyldiphenylamine, 2-tert-butyl-4-ethylphenyl, 2,6-di-tert-butyl-4-ethylphenol and the like. The amount added of an antioxidant is from 100 to 2000 ppm based on a polyoxyalkylene polyol.

Further, when a purified polyoxyalkylene polyol and a polyisocyanate compound are reacted to produce an isocyanate group-ended prepolymer, an acid can also be added to the polyoxyalkylene polyol obtained by the above-described method for the purpose of improving storage stability of the prepolymer. As the acid, inorganic acids and organic acids are listed. Examples of inorganic acid include phosphoric acid, phosphorous acid, hypophosphorous acid, pyrophosphoric acid, and aqueous solutions thereof. Examples of the organic acid include formic acid, oxalic acid, succinic acid, acetic acid, maleic acid, benzoic acid, p-toluenesulfonic acid, and aqueous solutions thereof. Phosphoric acid and maleic acid are preferable, and it is recommendable to use them in the form of a solution. The amount added of an acid is from 1 to 25 ppm based on a polyoxyalkylene polyol. It is preferably from 1 to 20 ppm, and preferably still from 1 to 15 ppm. An acid is preferably used in the above-described addition amount range and simultaneously in the range wherein pH of a polyoxyalkylene polyol is not lower than 5 and the acid value is not over 8 mg KOH/g.

Further, the concentration of a peroxide in a polyoxyalkylene polyol obtained by the above-described operation is preferably 0.28 mmol/kg or less. It is preferably still 0.2 mmol/kg or less, most preferably 0.15 mmol/kg or less. If the concentration of a peroxide is over 0.28 mmol/kg, when a tin-based catalyst is used in reaction with a polyisocyanate compound, the activity of the tin-based catalyst lowers because of the peroxide and therefore, molding property and mechanical property of a polyurethane decrease.

A purified polyoxyalkylene polyol obtained as described above has the following properties, namely, (1) OHV in the range from 2 to 200 mg KOH/g, (2) total unsaturation degree (hereinafter, referred to as C=C) in the range of 0.07 meq./g or less, (3) a head-to-tail bond selectivity (hereinafter, referred to as H—T selectivity) of an oxypropylene group of 95 mol % or more, and (4) a catalyst-remaining amount of 150 ppm or less (hereinafter, these are called four conditions of a polyoxyalkylene polyol of the present invention).

OHV of a polyoxyalkylene polyol is preferably from 9 to 120 mg KOH/g, and preferably still from 11 to 60 mg KOH/g. When addition-polymerization of an epoxide compound, particularly propylene oxide is conducted until OHV becomes under 2 mg KOH/g, the reaction time of a polyoxyalkylene polyol becomes too long. When OHV is over 200 mg KOH/g, the molecular weight of a polyoxyalkylene polyol decreases and the flexibility of the resulting polyurethane lowers.

C=C in a polyoxyalkylene polyol is mainly an index of the amount of a monool having an unsaturated group at the molecular end produced by a sub-reaction of propylene oxide. C=C is not more than 0.07 meq./g. An amount greater than this is not preferable since the mechanical property of a polyurethane resin of a flexible polyurethane foam, elastomer, sealing material and the like lowers. From the standpoint of such a condition, C=C is preferably 0.05 meq./g or less, and preferably still 0.03 meq./g or less. Depending on the usage of a polyurethane resin, C=C of a polyoxyalkylene polyol is preferably 0. However, 0 is not necessarily preferable industrially, since then reaction conditions such as reaction temperature, pressure and the like should be extremely loose leading to too long a reaction time. Under such conditions, the lower limit of C=C is preferably about 0.001 meq./g.

When the H—T bond selectivity based on an oxypropylene group by propylene oxide addition polymerization decreases under 95% in a polyoxyalkylene polyol having such a low C=C, there occur problems in that the viscosity of the polyoxyalkylene polyol increases, molding property of a flexible polyurethane foam deteriorates due to poor compatibility with an auxiliary agent such as a silicone surfactant and the like, as well as other disadvantages. Due to an increase in viscosity in raising the molecular weight of a polyoxyalkylene polyol, the viscosity of a prepolymer obtained by reaction with a polyisocyanate compound also increases and therefore, workability lowers. From the standpoint of such a condition, the H—T bond selectivity is 95 mol % or more, and preferably still 96% or more.

The remaining amount of the catalyst in a polyoxyalkylene polyol is 150 ppm or less. When the catalyst-remaining amount is over 150 ppm, an isocyanate group-ended prepolymer obtained by reacting a polyoxyalkylene polyol with a polyisocyanate compound manifests change in viscosity by time. The catalyst-remaining amount is preferably 90 ppm or less, and preferably still 50 ppm or less. It is recommendable that the lower limit of the catalyst-remaining amount is as low as possible. Usually, the lower limit can be lowered to about 1 ppm according to the above-described purification method.

<Production Method of Polymer-dispersed Polyol>

Herein, a method for producing a polymer-dispersed polyol of the present invention will be described.

As methods for producing a polymer-dispersed polyol, there are listed a method (hereinafter, referred to as Method I) in which an ethylenically-unsaturated monomer is polymerized by continuous operation or batch-wise operation in a polyoxyalkylene polyol to disperse a polymer particle in the polyol, and a method (hereinafter, referred to as Method II) in which a polymer solution previously polymerized in a solvent and the like is added to a polyoxyalkylene polyol, then, the solvent is removed, to disperse a polymer particle in the polyol. In view of the productivity of a polymer-dispersed polyol, Method I, in particular the continuous operation thereof is preferable. Method I will be first described.

The polyoxyalkylene polyol used in producing a polymer-dispersed polyol in the present invention is a polyoxyalkylene polyol satisfying the above-described four conditions (1) through (4). OHV in a polyoxyalkylene polyol is preferably in the range from 10 to 150 mg KOH/g. Preferably still, it is in the range from 15 to 100 mg KOH/g. The etlhylenically-unsaturated monomer for forming a polymer particle is a compound having at least one ethylenically-unsaturated group which can be polymerized.

Examples of such an etlylenically-unsaturated monomer include cyano group-containing monomers such as acrylonitrile, methacrylonitrile and the like; methacrylate-type monomers such as methyl acrylate, butyl acrylate, stcaryl acrylate, hydroxyethyl acrylate, dimethylaminoethyl acrylate, dimethylaminopropyl methacrylatc and the like; carboxyl group-containing monomers such as acrylic acid, methacrylic acid, itaconic acid, maleic acid, fumaric acid and the like; acid anhydride group-containing monomers such as maleic anhydride, itaconic anhydride and the like; hydrocarbon-based monomers such as butadiene, isoprene, 1,4-pentadiene and the like; aromatic hydrocarbon-based monomers such as styrene, (-methylstyrene, phenylstyrene, chlorostyrene and the like; halogen-containing monomers such as vinyl chloride, vinylidene chloride and the like; vinyl ethers such as vinyl ethyl ether, vinyl butyl ether and the like; vinyl ketones such as vinyl ethyl ketone and the like; vinyl esters such as vinyl acetate and the like; acrylarnides such as acrylamide, N,N-dimethylacrylamide, N-isopropylacrylamide, N,N-dimethylaminopropylacrylamide, metliylenebisacrylamide and the like; and methacrylamides such as N,N-dimethylmethacryloylamide and the like. These may be used alone or in combinations of two or more.

Of them, preferable are ethylenically-unsaturated monomers containing at least one compound selected from acrylonitrile, styrene, acrylamide and methyl methacrylate.

The dispersion concentration of a polymer particle depends on the amount used of an ethylenically unsaturated monomer and the conversion thereof. The conversion of an ethylenically-unsaturated monomer is 70% by weight or more though it depends on the production condition of a polymer-dispersed polyol. It is preferably 80% by weight or more. The amount used of an ethylenically-unsaturated monomer is determined in view of conversion thereof. Specifically, it is from 5 to 86 parts by weight based on 100 parts by weight of the above-described polyoxyalkylene polyol which is a dispersing medium. It is preferably from to 8 to 70 parts by weight, and preferably still from 9 to 52 parts by weight. Thus, a polymer-dispersed polyol is obtained in which the concentration of a dispersed polymer particle is from 5 to 60% by weight based on the total amount of a polyoxyalkylene polyol which is a dispersion medium and the polymer particle. It is preferably from 10 to 50% by weight, and preferably still from 12 to 45% by weight. When the concentration of the polymer particle is less than 5% by weight, no sufficient improving effect is obtained by use of the polymer-dispersed polyol such as hardness of a polyurethane, ventilation property of a polyurethane foam, and the like. When the concentration of the polymer particle is over 60% by weight, an increase in viscosity of the resulting polymer-dispersed polyol is remarkable, and dispersion stability also deteriorates.

The average particle size of a polymer particle to be dispersed in a polyoxyalkylene polyol is preferably from 0.01 to 10 $\mu$m. It is preferably still from 0.05 to 7 $\mu$m, most preferably from 0.08 to 5 $\mu$m. When the average particle size is less than 0.01 $\mu$m, the viscosity of a polymer-dispersed polyol increases. On the other hand, when the average particle size is more than 10 $\mu$m, the dispersion stability of a polymer deteriorates.

In polymerization of an ethylenically unsaturated monomer, a radical polymerization initiator is used. Specifically, there are listed azo compounds such as 2,2'-azobis(4-methoxy-2,4-dimethylvaleronitrile), 2,2'-azobis(2-methylbutylnitrile), 2,2'-azobis(isobutyronitrile) and the like, peroxide such as benzoyl peroxide, t-butyl peroxide, di-t-butyl peroxide and the like, peroxy disulfide and the like. The amount used of a polymerization initiator is usually from 0.1 to 10% by weight based on an ethylenically unsaturated monomer. It is preferably from 0.5 to 5% by weight.

It is preferable to use a chain transfer agent together with a radical polymerization initiator. Examples of the chain transfer agent include alcohols such as methanol, ethanol, propanol, isopropanol, pentanol and the like; mercaptans; halogenated hydrocarbons; aliphatic amines such as triethylamnine, tripropylamine, tributylamine, N,N-diethylethanolamine and the like; morpholines such as N-methylmorpholine, N-ethylmorpholine and the like; sodium methallylsulfonate, sodium allylsulfonate, toluene, xylene, acetonitrile, hexane, heptane, dioxane, ethylene glycol dimethyl ether, N,N-dimethylformaldehyde and the like. Among these, triethylamine and a mixture of triethylamine and isopropanol are preferable. The amount used of a chain transfer agent is preferably from 0.01 to 10% by weight based on the total weight of a polyoxyalkylene polyol and an etliylenically unsaturated monomer. It is preferably still from 0.05 to 5% by weight.

Further, for the purpose of dispersing a polymer particle, polymerization can also be conducted in the presence of a dispersion stabilizer. As this dispersion stabilizer, there are listed a polyester polyol containing a carbon-carbon unsaturated bond, modified polyols having an acryl group, methacryl group, allyl group and the like on the molecular end, and the like, as described in Japanese Patent Publication (JP-B) No. Sho-49-46556. Also, a polyoxyalkylene polyol having high molecular weight and a polyester polyol having substantially no carbon-carbon unsaturated bond can be used as a dispersion stabilizer.

An ethylenically unsaturated monomer, polymerization initiator, and if necessary, a chain transfer agent, dispersion stabilizer and the like are added to the above-described polyoxyalkylene polyol, and polymerization reaction is conducted. The polymerization temperature of an ethylenically unsaturated monomer is determined according to the kind of a radical polymerization initiator used. Usually, it is polymerized at a temperature not less than the decomposition temperature of the initiator. It is preferably from 40 to 200° C., and preferably still from 90 to 150° C. The polymerization reaction can also be conducted under increased pressure and atmospheric pressure. While the polymerization reaction can also be conducted without solvents, it can also be conducted in the presence of at least one solvent selected from water and organic solvents. Examples of the organic solvent include toluene, xylene, acetonitrile, hexane, heptane, dioxane, ethylene glycol dimethyl ether, N,N-dimethylformamide, methanol, ethanol, butanol, isopropanol and the like.

After completion of the polymerization reaction, the resulting polymer-dispersed polyol can be used without treatment as a raw material of a polyurethane. However, this polyol is preferably used after removal by distillation under reduced pressure of an unreacted ethylenically unsaturated monomer, a decomposition product of a polymerization initiator, a chain transfer agent, a solvent and the like. The condition for the pressure-reduced distillation-off operation is not particularly restricted, and it is usually conducted using an apparatus such as a forced thin film evaporation apparatus and the like under conditions of a temperature of 70 to 150° C. and a pressure of 1.33 kPa or less.

Herein, a method in which a polymer solution previously polymerized in a solvent and the like is added to a polyoxyalkylene polyol, then, the solvent is removed, to disperse a polymer particle in the polyol (Method II) will be described. An ethylenically unsaturated monomer, polymerization initiator and the like for forming a polymer particle, with compounds as described above are used. The polymerization temperature is usually from 40 to 200° C. though this depends on chemical and physical properties of the polymerization initiator and ethylenically unsaturated monomer used. It is preferably in the range from 90 to 150° C. As the solvent to be used for polymerization, at least one solvent is selected from the above-described organic solvents and water, though this depends on the chemical and physical properties of the polymerization initiator and ethylenically unsaturated monomer used. The amounts used of the polymerization initiator and ethylenically unsaturated monomer are not particularly restricted, and usually from 0.01 to 10% by weight and 3 to 60% by weight, respectively, based on the solvent. In polymerization of monomers, the chain transfer agent as described above may be advantageously used.

After a polymer particle is formed in a solvent, the resulting polymer solution and the above-described polyoxyalkylene polyol are mixed. The mixing condition is not particularly restricted, and the mixing is usually conducted at a temperature from 15 to 150° C. It is preferably in the range from 20 to 120° C. The mixing is conducted for about 0.5 to 5 hours by stirring. Then, removal operation of a solvent is conducted. A heat pressure-reducing operation is carried out usually under conditions of a temperature from 70 to 150° C. and a pressure of 1.33 kPa or less for about 1 to 6 hours to remove a solvent, though the conditions depend on chemical and physical properties of a solvent and polymer used. In this procedure, a pressure-reducing operation can also be conducted while passing an inert gas through a polyoxyalkylene polyol for quick removal of a solvent.

The average particle size of a polymer contained in polymer-dispersed polyol exerts influence on the dispersion stability and the viscosity of the polymer-dispersed polyol. From such standpoints, the average particle size of a polymer is suitably from 0.01 to 10 μm. Such a particle size can be obtained by suitably controlling kinds and amounts used of the above-described chain transfer agent, dispersion stabilizer, solvent and the like, weight composition of an ethylenically unsaturated monomer, and the like, in addition to properties of a polyoxyalkylene polyol which is a dispersion medium.

<Production Method of Isocyanate Group-ended Prepolymer (1)>

A method for producing an isocyanate group-ended prepolymer using as a raw material a polyoxyalkylene polyol will be described. The isocyanate group-ended prepolymer is produced by reacting a polyol with a polyisocyanate compound. The polyol used in the present invention is a polyoxyalkylene polyol satisfying the above-described four conditions (1) through (4) or the above-described polymer-dispersed polyol derived from this polyoxyalkylene polyol.

First, a method using a polyoxyalkylene polyol as the polyol will be described. This polyol is a polyoxyalkylene polyol satisfying the above-described four conditions (1) through (4). Of them, those having a catalyst-remaining amount of 50 ppm or less are preferable. Further, CPR (Controlled Polymerization Rate: index showing the amount of basic substances in polyol) of a polyoxyalkylene polyol is preferably 3 or less. It is preferably still 1 or less, most preferably 0. When the CPR is over 3, the storage stability of an isocyanate group-ended prepolymer lowers.

The catalyst-remaining amount in an isocyanate group-ended prepolymer is preferably 120 ppm or less. It is preferablystill 70 ppm or less, most preferably 20 ppm or less. The catalyst-remaining amount in an isocyanate group-ended prepolymer is attained by controlling the catalyst-remaining amount in a polyoxyalkylene polyol to 150 ppm or less. When the catalyst-remaining amount in an isocyanate group-ended prepolymer is over 120 ppm, change in the viscosity of the prepolymer by time increases. The lower limit of the catalyst-remaining amount may advantageously be as low as possible. Usually, according the above-described method for purifying a polyoxyalkylene polyol, a catalyst can be removed to give a remaining amount of about 1 ppm, the catalyst-remaining amount in an isocyanate group-ended prepolymer can be reduced to about 1 ppm.

As the polyisocyanate compound used in the present invention, aromatic, aliphatic and alicyclic compounds and the like having two or more isocyanate groups in one molecule can be used. Examples of the aromatic isocyanate include 2,4-tolylene diisocyanate, 2,6-tolylene diisocyanate, isomer mixtures of these polyisocyanates in an 80:20 ratio by weight (TDI-80/20) and an 63:35 ratio by weight (TDI-65/35), 4,4'-diphenylmethane diisocyanate, 2,4'-diphenylmethane diisocyanate, 2,2'-diphenylmethane diisocyanate, any isomer mixtures of diphenylmethane diisocyanates, toluylene diisocyanate, xylylene diisocyanate, α,α,α',α'-tetramethylxylylene diisocyanate, p-phenylene diisocyanate, naphthalene diisocyanate and the like, and compounds obtained by hydrogenation of these polyisocyanates.

Examples of the aliphatic isocyanate include ethylene diisocyanate, 1,4-butane diisocyanate, 1,6-hexane diisocyanate, tetramethylene diisocyanate, hexamethylene diisocyanate, dodecamethylene diisocyanate, 2,2,4-trimethylhexane diisocyanate, lysine diisocyanate and the like. Examples of the alicyclic isocyanate include isophorone diisocyanate, norbornene diisocyanate, dicyclohexyl methane diisocyanate, cyclohexylene diisocyanate, methylcyclohexylene diisocyanate and the like.

Further, modified isocyanates such as carbodiimide modified substances, buret modified substances, isocyanurate modified substances and the like of the above-described polyisocyanate can also be used. There can be also used isocyanate compounds obtained by modification of a polyisocyanate and modified polyisocyanate with the above-described active hydrogen compounds, polyols having an average number molecular weight of 100 to 6000 g/mol, and monools such as methanol, ethanol, n-propanol, isopropanol, butanol, allyl alcohol and the like alone or a mixture thereof. Further, polyols having a number-average molecular weight of 100 to 3000 g/mol obtained by addition-polymerization of an epoxide compound to a monool may also be used. The above-described polyisocyanate and modified polyisocyanate can also be mixed for use. The preferable mixing ratio is in the range from 5:95 to 95:5 in terms of ratio by weight of the polyisocyanate to the modified polyisocyanate, preferably still in the range from 10:90 to 90:10, most preferably in the range from 30:70 to 70:30.

Among the above-described polyisocyanates, preferable are 2,4-tolylene diisocyanate (hereinafter, referred to as 2,4-TDI), 2,6-tolylene diisocyanate (hereinafter, referred to as 2,6-TDI), isomer mixtures of these polyisocyanates in 80:20 ratio by weight (TDI-80/20) and 63:35 ratio by weight (TDI-65/35), hydrogenated TDI-80/20, hydrogenated TDI-65/35, 4,4'-diphenylmethane diisocyanate (hereinafter, referred to as MDI), hydrogenated MDI, p-phenylene diisocyanate, xylylene diisocyanate (hereinafter, referred to as XDI), hydrogenated XDI, hexamethylene diisocyanate (hereinafter, referred to as HDI), isophorone diisocyanate (hereinafter, referred to as IPDI), norbornene diisocyanate (hereinafter, referred to as NBDI), and dicyclohexylmethane diisocyanate (hereinafter, referred to as DCHMDI).

Further, preferable are buret modified substances, isocyanurate modified substances, and glycerin modified substances, trimethylolpropane modified substances of these polyisocyanates, and polyisocyanate modified substances modified with a polyol obtained by addition-polymerization of propylene oxide, ethylene oxide and the like to glycerine or trimethylolpropane. Particularly preferable are TDIs, MDIs, XDIs, HDIs, IPDIs and NBDIs, isocyanurate modified substances, buret modified substances and polyol modified substance of these polyisocyanates, and mixtures thereof.

An NCO index which is an equivalent ratio of an isocyanate group to an active hydrogen group in a polyol in producing an isocyanate group-ended prepolymer is in the range from 1.3 to 10. It is preferably from 1.4 to 9, preferably still from 1.5 to 8. The isocyanate group content (hereinafter, referred to as NCO %) in an isocyanate group-ended prepolymer is from 0.3 to 30% by weight. It is preferably from 0.5 to 25% by weight, preferably still from 0.8 to 15% by weight, most preferably from 1 to 10% by weight. In an isocyanate group-ended prepolymer used in a one-pack type curing composition obtained by reacting with water in air, NCO % is designed at a lower value within the above-described range. While, in an isocyanate group-ended prepolymer used in a two-pack type curing composition obtained by using as a curing agent glycols such as 1,4-butanediol, dipropylene glycol, polyoxyalkylene polyol and the like, or polyamine compounds such as 3,3'-dichloro-4,4'-diaminodiphenylmethane, diethyldiaminotoluene and the like, NCO % is designed at a higher value as compared with the one-pack composition.

The H—T bond selectivity of the main chain in an isocyanate group-ended prepolymer produced in the present invention is 95 mol % or more. This is attained by controlling the H—T bond selectivity of an oxypropylene group by propylene oxide addition-polymerization of a raw material, poloyoxyalkylene polyol to 95 mol % or more. By controlling the H—T bond selectivity of the main chain of an isocyanate group-ended prepolymer to 95 mol % or more, low viscosity can be attained even if the molecular weight is raised. The H—T bond selectivity of a prepolymer is preferably 96% or more.

As the catalyst in prepolymer reaction, known catalysts used in producing a polyurethane, such as amine compounds, organic metal compounds and the like, can be used. When the molecular weight of a polyoxyalkylene polyol is lower, namely, when OHV is high, there are cases wherein no catalyst need be used. Examples of the amine compound include triethylamine, tripropylamine, tributylamine, N,N,N',N'-tetramethylhexamethylenediamine, N-metlylmorpholine, N-ethylmorpholine, dimethylcyclohexylamine, bis[2-(dimethylamino)ethyl] ether, triethylenediamine, and salts of triethylenediamine, and the like. Examples of the organic metal compound include tin acetate, tin octylate, tin oleate, tin laurate, dibutyltin diacetate, dibutyltin dilaurate, dibutyltin dichloride, lead octanoate, lead naphthenate, nickel naphthenate, cobalt naphthenate and the like. These catalysts can be used alone, and further, can be optionally used in mixtures of two or more. Of these catalysts, organometal-based catalysts are particularly preferable. The amount used thereof is from 0.0001 to 2.0 parts by weight based on 100 parts by weight of a polyoxyalkylene polyol. It is preferably from 0.001 to 1.0 parts by weight.

The temperature when a prepolymer is produced is preferably from 50 to 120° C. It is preferably still from 60 to 110° C., particularly preferably from 70 to 100° C. When a polyol is reacted with a polyisocyanate compound, the reaction is preferably conducted in the presence of an inert gas for avoiding contact with water in air. As the inert gas, nitrogen, helium and the like are listed. Nitrogen is preferable. The reaction is conducted under a nitrogen atmosphere for 2 to 10 hours by stirring.

When an isocyanate group-ended urethane prepolymer is produced, an organic solvent which is inactive with the polyisocyanate and polyol may be used before and after the reaction or during reaction. The amount of an organic solvent in is preferably 100% by weight or less based on the total amount of the polyol and polyisocyanate. It is preferably still 60% by weight or less, most preferably 40% by weight or less. As such an organic solvent, aromatic, aliphatic, alicyclic, ketone-based, ester-based and ester ether-based solvents are listed. Examples thereof include toluene, xylenes, hexanes, acetone, cyclohexane, methyl ethyl ketone, methyl isobutyl ketone, ethyl acetate, butyl acetate, ethylcellosolve acetate, butylcellosolve acetate and the like.

Herein, a method for producing an isocyanate group-ended prepolymer having a free isocyanate compound content of 1% by weight or less will be described. An NCO % of the isocyanate group-ended prepolymer having a free isocyanate compound content of 1% by weight or less is from 0.3 to 30% by weight. It is preferably from 0.5 to 25% by weight, and preferably still from 1 to 15% by weight. The free isocyanate compound content in an isocyanate group-ended prepolymer is preferably 0.8% by weight or less. It is preferably still 0.5% by weight or less, and most preferably 0.1% by weight or less. When the free isocyanate compound content exceeds 1% by weight, hysteresis of polyurethane increases.

For controlling the free isocyanate compound content in in an isocyanate group-ended prepolymer to 1% by weight or less, pressure-reducing treatment of the above-described isocyanate group-ended prepolymer is conducted under conditions of specific temperature and specific pressure. An isocyanate group-ended prepolymer which is a raw material of the isocyanate group-ended prepolymer having a free isocyanate compound content of 1% by weight or less is produced by the above-described method. Pressure-reducing treatment is an important process for suppressing production of a dimer of an unreacted isocyanate compound in the pressure-reducing treatment process. The temperature in the pressure-reducing operation is from 70 to 180° C. It is preferably from 80 to 170° C., and preferably still from 85 to 160° C. When the temperature is lower than 70° C., the time for removing an unreacted isocyanate compound is elongated. When the temperature is over 180° C., the viscosity of a prepolymer increases in the pressure-reducing process. The pressure is 665 Pa or less. It is preferably 266 Pa or less, and preferably still 133 Pa or less. It is most preferably 13.3 Pa or less. When the pressure is over 665 Pa, the time for removing an unreacted polyisocyanate compound is elongated, and the viscosity of a prepolymer increases in the pressure-reducing treatment process.

The pressure-reducing treatment is preferably a thin in layer evaporation method. An evaporation vessel of a forced cycling stirring film type, falling film molecule evaporator or the like can be used (see, Kagaku Kogaku Handbook, Revised 5 Edition, ed. Kagaku Kogaku Institute, MARUZEN, 1998). As such an apparatus, for example, a Smith type film evaporator (manufactured by Shinko Pantech K.K.: Wipelen, Exceva) or a Contro type film evaporator [manufactured by Hitachi Ltd., trade name: Sunvey type film evaporator] is listed. A polyisocyanate compound recovered from a prepolymer by pressure-reducing treatment can be used in prepolymer reaction again. In use, a polyisocyanate compound containing impurities such as a dimer and the like is preferable.

To an isocyanate group-ended prepolymer produced as described above, a catalyst for curing, silicone-based coupling agent, a filler, a plasticizer, a pigment, a reinforcing agent, a flame retardant, a stabilizer, a defoaming agent and the like can be added according to the object. Further, for the purpose of suppressing change in viscosity by time of a prepolymer, an inorganic acid, organic acid or the like may be added to the prepolymer. As the inorganic acid, phosphoric acid, pyrophosphoric acid and the like are listed. As the organic acid, for example, adipic acid, 2-ethylhexanoic acid, oleic acid and the like are listed. These acids can be used alone, and further, can also be used in combinations of two or more. The amount used thereof is preferably from 0.0001 to 3 parts by weight based on 100 parts by weight of an isocyanate group-ended prepolymer. It is preferably still from 0.003 to 1 part by weight.

<Production Method of Isocyanate Group-ended Prepolymer (2)>

Next, a method using a polymer-dispersed polyol as the polyol will be described. An isocyanate group-ended prepolymer obtained by using a polymer-dispersed polyol is basically produced by the same method as the above-described method using a polyoxyalkylene polyol. Regarding a polyisocyanate compound, addition auxiliaries and the like, those as described above are used. Namely, instead of a polyoxyalkylene polyol, a polymer-dispersed polyol is used. As the polymer-dispersed polyol, those obtained in the method for producing a polymer-dispersed polyol of the above-described present invention are used. In view of the viscosity of an isocyanate group-ended prepolymer, among polymer-dispersed polyols of the present invention, those having a polymer concentration of 5 to 30% by weight are preferable. An NCO % of an isocyanate group-ended prepolymer is from 0.3 to 30% by weight, preferably from 1 to 15% by weight.

<Production Method of Polyurethane Resin (1)>

A method for producing a polyurethane resin using as a raw material an isocyanate group-ended prepolymer will be described. A polyurethane resin is produced by reacting a prepolymer containing an isocyanate group-ended prepolymer produced by the above-described method with a chain extender. The isocyanate group-ended prepolymer and chain extender are reacted in amounts so that the isocyanate index is from 0.6 to 1.5. It is preferably from 0.8 to 1.3, and preferably still from 0.9 to 1.2. The resulting polyurethane resin can be used mainly in the fields of a polyurethane elastomer, polyurethane urea elastomer, paint, adhesive and the like.

The prepolymer preferably contains an isocyanate group-ended prepolymer produced by the above-described production method in an amount of at least 60% by weight. Further preferable content is at least 70% by weight. Most preferable is an isocyanate group-ended prepolymer separately produced by the above-described method. As preferable embodiments of an isocyanate group-ended prepolymer obtained by another production method than that of the present invention, there is, for example, an isocyanate group-ended prepolymer containing as a polyol component polytetramethylene glycol, polyoxyethylene adipate, and polycaprolactone polyol exemplified in Japanese Patent Application Publication (JP-B) No. Hei-6-13593. When the content of an isocyanate group-ended prepolymer obtained by using as a raw material a polyoxyalkylene polyol obtained by the method of the present invention is less than 60% by weight, the viscosity of the prepolymer increases and workability decreases.

The chain extender is a compound containing in one molecule two or more active hydrogen groups which can be reacted with an isocyanate group. For example, at least one active hydrogen group-containing a compound of a polyol compound or polyamine compound is listed. Examples of the polyol compound include divalent alcohols such as ethylene glycol, propylene glycol, dipropylene glycol, diethylene glycol, triethylene glycol, 1,3-propanediol, 1,3-butanediol, 1,4-butanediol, 1,5-pentanediol, neopentyl glycol, 1,6-hexanediol and the like; trivalent alcohols such as glycerine, trimethylolpropane and the like; cyclohexylenes such as 1,4-cyclohexanediol, spirohexanediol and the like; and compounds containing a spiro ring and methylene chain and various bonds such as an ether bond, ester bond and the like for connecting the spiro ring and methylene chain.

Further, those containing various substituents as derivatives thereof can be used. Further, as the aromatic alcohols, there can be used compounds such as hydroquinone, resorcin, bishydroxyethylene terephthalate and the like, and polyols obtained by adding at least one alkylene oxide selected from ethylene oxide and propylene oxide in an amount of 1 to 4 mol per hydroxyl group of these compounds.

As the polyamine compound, there can be used tolylenediamine, 3,5-diethyl-2,4-diaminotoluene, 3,5-diethyl-2,6-diaminotoluene, diphenylmethanediamine, and mixtures of their isomers, and aromatic diamines such as ni-phenylenediamine, 3,3'-dichloro-4,4'-diaminodiphenylmethane. Further, there can be used conventionally known polyamine compounds of alicyclic diamines such as isophoronediamine, norbornenediamine and the like, linear aliphatic diamines such as ethylenediamine and the like, alkyldihydrazides such as carbodihydrazide, dihydrazide adipate and the like, or derivatives thereof, and the like. Further, amino group-containing polyols obtained by adding an alkylene oxide to these active hydrogen compounds by a conventionally known method can be used as the chain extender. These polyols and polygamies can be mixed in any ratio to be used as the chain extender.

Of the above-described compounds, preferable are ethylene glycol, propylene glycol, diethylene glycol, triethylene glycol, 1,4-butanediol, 1,4-cyclohexanediol, glycerine, trimethylolpropane, 3,5-diethyl-2,4-diaminotoluene, 3,5-diethyl-2,6-diaminotoluene, 3,3'-dichloro-4,4'-diaminodiphenylmethane, isophoronediamine, norbornenediamine, and polyols obtained by addition-polymerization of an alkylene oxide to these compounds.

The isocyanate group-ended prepolymer and chain extender as described above are previously controlled to a given temperature, for example, from 30 to 150° C., and pressure-reduced defoaming treatment is conducted. Then, both components are mixed by quick stirring, and injected in a mold heated to a given temperature, for example, from 40 to 140° C., to produce a molded product (polyurethane resin). In this procedure, a catalyst for curing, inorganic acid, organic acid, silicone-based coupling agent, filler, plasticizer, pigment, reinforcing agent, flame retardant, stabilizer, defoaming agent and the like can be added according to the use object of a polyurethane resin.

For the purpose of suppressing change in viscosity by time of a prepolymer, an inorganic acid or organic acid may be added to the prepolymer. As the inorganic acid, phosphoric acid is preferable. As the organic acid, for example, adipic acid, 2-ethylhexanoic acid, oleic acid and the like can be used. These acids can be used alone, and further, can also be used in combinations of two or more. The amount used thereof is preferably from 0.001 to 10.0 parts by weight based on 100 parts by weight of the above-described isocyanate group-ended prepolymer. It is preferably from 0.003 to 5.0 parts by weight.

By reacting a prepolymer containing as the main component an isocyanate group-ended prepolymer of the present invention with a chain extender containing an active hydrogen group as described above, a polyurethane resin is produced. In addition to this method, a one shot method can also be applied in which a polyol containing at least 60% by weight of a polyoxyalkylene polyol of the present invention, a polyisocyanate, and a chain extender are simultaneously mixed and molded.

<Production Method of Polyurethane Resin (2)>

Next, a method for producing a polyurethane resin using as a curing agent a polyoxyalkylene polyol obtained by the above-described production method will be described. This polyurethane resin is produced by reacting a polyoxyalkylene polyol obtained by the above-described production method with an isocyanate group-ended prepolymer. Usually, a polyurethane resin obtained by such a method is used for waterproofing and sealing uses. A polyoxyalkylene polyol used as a curing agent satisfies the conditions (1) through (4) explained in the column of the production method of a polyoxyalkylene polyol. Of these, OHV is preferable from 8 to 100 mg KOH/g. Preferable still, is a polyoxyalkylene polyol having an OHV from 10 to 50 mg KOH/g.

Auxiliaries such as an urethane-forming catalyst, plasticizer, ultraviolet absorber, antioxidant, filler, reinforcing agent, flame retardant, defoaming agent, pigment, silicone-based coupling agent and the like may be previously added to a polyoxyalkylene polyol. As auxiliaries, conventionally known compounds can be used. The total amount added of the auxiliaries is from 10 to 800 parts by weight based on 100 parts by weight of a polyoxyalkylene polyol. It is preferably from 20 to 700 parts by weight. In the case of the by polyoxyalkylene polyol obtained by the above-described method, polyoxyalkylene polyols having different molecular weights (OHV), numbers of functional groups, and oxypropylene group contents may be mixed in any ratio.

As the silicone-based coupling agent, there are listed, for example, λ-aminopropyltrimetthoxysilane, λ-mercaptopropyltrimethoxysilane, λ-glycidoxypropyltrimethoxysilane and the like. The amount used thereof is preferably from 0.01 to 8 parts by weight based on 100 parts by weight of a polyoxyalkylene polyol. It is preferably from 0.03 to 5 parts by weight. The polyamine compound as described above may be added to a polyoxyallylene polyol.

For improving the dispersion stability of a polyoxyalkylene polyol and the above-described auxiliaries, mixing by stirring is conducted sufficiently. The mixing by stirring is preferably conducted according to a kneading mode using an apparatus equipped with a single or twin screw. An isocyanate group-ended prepolymer used as the main agent is preferably an isocyanate group-ended prepolymer produced by the above-described method. An isocyanate group-ended prepolymer produced by the other method may be used. In this case, that containing an isocyanate group-ended prepolymer produced by the above-described method in an amount of at least 60% by weight is preferable. Further preferable content is 70% by weight.

An isocyanate group-ended prepolymer which is the main agent and a polyoxyalkylene polyol which is the curing agent are sufficiently mixed by stirring, and the resulting mixed solution is cured at a temperature in the range from 10 to 50° C. The curing time is usually from 1 to 7 days though this depends on the amount of catalyst added to a curing agent. The polyoxyalkylene polyol and isocyanate group-ended prepolymer are reacted in amounts so that the isocyanate index is from 0.8 to 1.3. It is preferably from 0.85 to 1.2, further preferably from 0.9 to 1.1.

<Production Method of Flexible Polyurethane Foam>

Finally, a method for producing a flexible polyurethane foam will be described. The whole density of a flexible polyurethane foam produced by the present invention is preferably from 20 kg/m$^3$ to 60 kg/m$^3$. It is preferably still from 25 kg/m$^3$ to 55 kg/m$^3$, most preferably from 27 kg/m$^3$ to 50 kg/m$^3$. The elongation of a foam which is an index of mechanical strength is preferably from 90 to 200%. It is preferably still from 100 to 180%. The wet thermal compression set is preferably 18% or less. It is preferably still 15% or less, most preferably 13% or less.

The lower limit of wet thermal compression set of a flexible urethane foam obtained by the method of the present invention is about 2% though it depends on the density of the foam. Further, the hardness loss in repeated compression testing of a foam is preferably 20% or less. It is preferably still 15% or less, most preferably 12% or less. The lower limit of the hardness loss in repeated compression testing of a foam obtained by the method of the present invention is about 1% though it depends on the density of the foam.

A flexible urethane foam of the present invention is produced by mixing by stirring any one of the following polyols (a) and (b) with a polyisocyanate compound in the presence of water, catalyst and surfactant. In the production of a polyol foam, a cross-linking agent and other additives may be added alone or in combinations of two or more according to the intended physical properties. In this procedure, a cross-linking agent and other additives may be added to the following polyol (a) or (b), or either one of polyisocyanate compounds or to both of them. Alternatively, they may be added to a mixer for mixing a polyisocyanate compound, water, catalyst, surfactant and the following polyol (a) or (b), or to a reaction apparatus.

(a) A polyol containing at least 30% by weight of a polyoxyalkylene polyol obtained in the above-described production method of the present invention.

(b) A polyol containing at least 10% by weight of a polymer-dispersed polyol obtained in the above-described production method of the present invention.

First, a method for producing the polymer (a) will be described. A polyol containing at least 30% by weight of a polyoxyalkylene polyol obtained in the production method of the present invention is used. The preferable content of this polyol is at least 50% by weight. It is preferably still 60% by weight. When the content of a polyoxyalkylene polyol of the present invention is less than 30% by weight, durability of the resulting urethane foam, molding property of the foam, and the like lower.

As polyols which may be used together other than the polyol obtained in the production method of the present invention, there are listed a polyoxyalkylene polyol having low monool content (corresponding to C=C in the present invention) obtained by using cesium hydroxide as a catalyst described in U.S. Pat. No. 5,916,994, a polymer-dispersed polyol, a polyester polyol and the like produced by conventionally known methods. Further, polyoxyalkylene polyols having different OHV, C=C, contents of an oxypropylene group, contents of an oxyethylene group, or average numbers of functional groups may be used in combinations of two or more.

The preferable molecular structure of a polyoxyalkylene polyol of the present invention is a polyol obtained by using as a polymerization initiator a compound having 3 to 4 active hydrogen groups, and the polymerization initiator, there are exemplified glycerine, trimethylolpropane, pentaerythritol and the like among the active hydrogen compounds as described above. OHV is preferably from 10 to 70 mg KOH/g. It is preferably still from 12 to 60 mg KOH/g, most preferably from 15 to 55 mg KOH/g. The content of an oxyethylene group by addition-polymerization of ethylene oxide is preferably from 5 to 30% by weight. It is preferably still from 6 to 25% by weight, most preferably from 8 to 20% by weight. When the oxyethylene group content in a polyoxyalkylene polyol is over 30% by weight, wet thermal compression set of a flexible foam tends to deteriorate. It is preferable that an oxyethylene group is introduced at the molecular end of a polyoxyalkylene polyol. It is because of this, by introduction of an oxyethylene group to the molecular end, the primary hydroxyl group ratio at the molecular end of a polyoxyalkylene polyol increases. Among polyoxyalkylene polyols of the present invention, those having a primary hydroxyl group-forming ratio of 50 mol % or more is preferable. It is preferably still 60 mol % or more, most preferably 70 mol % or more.

Next, a method for use of the polymer (b) will be described. There is used a polyol containing at least 10% by weight of a polymer-dispersed polyol obtained by the production method of the present invention. It is preferably at least 15% by weight, and preferably still at least 20% by weight. When the concentration of a polymer particle in a polymer-dispersed polyol is from about 30 to 60% by weight, the upper limit of the amount used of the polymer-dispersed polyol is preferably about 60% by weight. A further preferable upper limit is 50% by weight.

As the polyols which may be used together other than the polyol obtained in the production method of the present invention, there are listed the above-described polyoxyalkylene polyol of the present invention, a polyoxyalkylene polyol having low monool content obtained by using cesium hydroxide as a catalyst described in U.S. Pat. No. 5,916,994, a polymer-dispersed polyol obtained by using this polyol as a dispersion medium, a polymer-dispersed polyol produced by a conventionally known method, a polyester polyol and the like. Further, polyoxyalkylene polyols having different OHV, C=C, contents of an oxypropylene group, contents of an oxyethylene group, or average numbers of functional groups may be used in combinations of two or more. Further, polymer-dispersed polyols having different OHVs, polymer particle concentrations, and ethylenically unsaturated monomer units forming a polymer particle may be used in combinations of two or more.

In producing a flexible urethane foam, water acting as a foaming agent, a catalyst and a surfactant are used in addition to the above-described polyol. Water functions as a foaming agent since it reacts with a polyisocyanate compound to generate a carbon dioxide gas. The amount of water used is preferably from 1 to 8 parts by weight based on 100 parts by weight of a polyol containing the above-described polyoxyalkylene polyol and polymer-dispersed polyol. It is preferably still from 2 to 7 parts by weight, most preferably from 2.5 to 6 parts by weight. Hydrofluorocarbons, hydrochlorofluorocarbons (HCFC-134a and the like), hydrocarbons (cyclopentane and the like) and the like which have been developed for the purpose of protecting the earth's environment may be used as a foaming aid together with water. The amount of foaming aid used together with water is preferably from 1 to 30 parts by weight based on 100 parts by weight of a polyol though it depends on the density of the intended flexible foam. It is preferably still from 2 to 25 parts by weight.

As a catalyst, conventionally known compounds can be used. The amount used thereof is usually from 0.005 to 10 parts by weight based on 100 parts by weight of a polyol. It is preferably from 0.01 to 5 parts by weight. As specific examples, for example, aliphatic amines such as triethylenediamine, bis(N,N-dimethylaminoethyl ether), morpholine and the like, organotin compounds such as tin octanoate, dibutyltin dilaurate and the like are listed. These catalysts may be used alone or in combinations of two or more.

As a surfactant, conventionally known organosilicon-based surfactants can be used. The amount used thereof is from 0.1 to 4 parts by weight based on 100 parts by weight of a polyol. It is preferably from 0.2 to 3 parts by weight. As the surfactant, there can be used, for example, SRX-274C, SP-2969, SF-2961, SF-2962(tradename) manufactured by Toray•Dowcorning•Silicone or L-5309, L-3601, L-5307, L-3600 (trade name) manufactured by Nippon Unicar, and the like.

As other aids, there are a cross-linking agent, flame retardant, pigment and the like, and they may be added according to demands. When a cross-linking agent is used, a polyol having an OHV of 200 to 1800 mg KOH/g can be used as the cross-linking agent. For example, there can be used active hydrogen compounds like aliphatic polyhydric alcohols such as glycerine and the like, alkanolamines such as diethanolamine, triethanolamine and the like; polyoxyalkylene polyols having an OHV of 200 to 1800 mg KOH/g, and the like can be used. In addition, conventionally known cross-linking agents can be used. The amount used of a cross-linking agent is preferably from 0.5 to 10 parts by weight based on 100 parts by weight of a polyol.

It is also possible that a resin premix is previously prepared by mixing a polyoxyalkylene polyol or a polymer-dispersed polyol, water, catalyst, surfactant, and further, a cross-linking agent, flame retardant and the like according to the objects, and a foam is produced from the resulting resin premix. To this resin mix, a pigment, ultraviolet absorber, antioxidant and the like can also be added as other aids.

As the polyisocyanate, 2,4-tolylene diisocyanate (2,4-TDI), 2,6-tolylene diisocyanate (2,6-TDI), and mixtures thereof are listed. Usually, tolylene diisocyanate (TDI) is in the form of a mixture of 2,4-TDI and 2,6-TDI. The ratio by weight of isomers in tolylene diisocyanate is preferably 80:20 in terms of 2,4-TDI/2,6-TDI (called TDI-80/20). Further, a mixed polyisocyanate of TDI with polymethylenepolyphenyl isocyanate represented by the general formula (3) in Japanese Laid-Open Patent Publication (JP-A) No. Hei-11-140154 is preferable. As such a polyisocyanate compound, Cosmonate M-200 and M-300 (trade name: manufactured by Mitsui Chemical Co., Ltd.) are exemplified.

The mixing ratio of TDI to polymethylenepolyphenylpolyisocyanate in the mixed polyisocyanate compound is preferably from 50:50 to 98:2 by weight. It is preferably still from 65:35 to 95:5, most preferably from 70:30 to 90:10. There can also be used urethane modified substances obtained by reacting these polyisocyanates with a polyol having an OHV of 100 to 2000 mg KOH/g, an active hydrogen compound and the like, biuret modified substances, isocyanurate modified substances and allophanate modified substances of the polyisocyanates. The NCO index in flexible urethane form is 0.6 to 1.5, preferably 0.7 to 1.4, and more preferably 0.7 to 1.3.

As the molding method of a flexible polyurethane foam of the present invention, usually, a method in which a resin premix and a polyisocyanate are mixed and molded using a high pressure foaming apparatus, low pressure foaming apparatus and the like is preferable. When a low pressure foaming apparatus is used, two or more components can be mixed. Therefore, components can be divided into polyol-based, water-based, catalyst-based, flame retardant-based, polyisocyanate-based and the like and then mixed. It is possible that such a mixed solution is discharged from a mixing head of a foaming apparatus, formed and cured as it is, to form a flexible polyurethane foam, and processed into the intended form. Usually, the curing time is from 30 seconds to 30 minutes. A flexible polyurethane foam is produced under conditions of a mold temperature of from room temperature to 80° C., and a curing temperature of from room temperature to 180° C.

When used in the form of a resin premix, mixing with a polyisocyanate is conducted in a high pressure foaming apparatus or a low pressure foaming apparatus. When a compound exhibiting hydrolyzing property such as an organotin catalyst is used as a catalyst, a method is preferable in which a water component and an organotin catalyst component are separated and mixed in a mixing head of a foaming apparatus for avoiding contact with water.

EXAMPLES

The following examples further illustrate the present invention in detail. Physical values in shown examples are measured according to the following methods.

(1) Hydroxyl value of polyoxyalkylene polyol (OHV, unit: mg KOH/g), total unsaturation degree (C=C, unit: meq./g) and viscosity (hereinafter, represented by η unit: mPa·s/25° C.)

They are measured by methods according to JIS K-1557.

(2) H—T bond selectivity of polyoxyalkylene polyol (unit: mol %)

$^{13}$C—NMR spectrum of a polyoxyalkylene polyol is measured using a 400 MHz $^{13}$C nuclear magnetic resonance (NMR) apparatus manufactured by JEOL Ltd. using deuterium chloroform as a solvent, a signal of a methyl group in oxypropylene unit in the H—T bond [16.9 to 17.4 ppm, hereinafter, represented by A] and a signal of a methyl group in oxypropylene unit in the Head-to-Head bond [17.7 to 18.5 ppm, hereinafter, represented by B] are read, and calculation is conducted using the numerical formula {[A/(A+B)]× 100}. Assignment of each signal is made referring to values in Macromolecules, Vol. 19, pp. 1337 to 1343 (1986), F. C. Schilling, A. E. Tonelli.

(3) Remaining amount of catalyst composed of compounds having P=N bond in polyoxyalkylene polyol (hereinafter, referred to as catalyst-remaining amount, unit: ppm)

By measuring a nitrogen-remaining amount in a polyol, the remaining amount of a compound having a P=N bond is calculated conversely. A polyol is weighed into a measuring flask, diluted with toluene (guaranteed reagent), then, the concentration of nitrogen is measured using a trace total nitrogen analysis apparatus (manufactured by Mitsubishi Chemical Corp., type: TN-100).

(4) Concentration of catalyst in crude polyoxyalkylene polyol (hereinafter, referred to as crude polyol) (unit: ppm)

15 g of a crude polyol is weighed into a 100 ml of beaker, then, dissolved in 60 ml of solution of isopropyl alcohol/water (ratio by volume: 10/6), and measured by a potentiometric titration apparatus (manufactured by Hiranuma Sangyo K.K., type: TS-980) using 1/100 mol/L of hydrochloric acid.

(5) Concentration of sodium in polyoxyalkylene polyol (unit: ppm)

The concentration of sodium (hereinafter, represented by Na) eluted from a solid acid used in removing a catalyst from a crude polyol is measured. An atomic absorption analyzer (manufacture by Perkin Elmer, type: 5100 PC) is used for measurement. Measurement limit is 0.1 ppm.

(6) Water content in catalyst composed of compounds having P=N bond, and active hydrogen compound (unit: ppm)

Measurement is conducted using a water content measuring apparatus (manufactured by Hiranuma Sangyo K.K., type: AQV-7).

(7) Oxypropylene group content of polyoxyalkylene polyol (hereinafter, referred to as PO content, unit: wt %) and oxyethylene group content on the molecular end of polyoxyalkylene polyol (hereinafter, referred to as end EO amount, unit: wt %)

A polyoxyalkylene polyol is dissolved in deuterided acetone, and PO content and end EO content are measured by the above-described $^{13}$C-NMR measurement.

(8) Solid acid and specific value thereof

Solid acids used in examples and comparative examples and specific values thereof are shown in [Table 1]. Compositions, specific surface areas and average pore diameters of solid acids were measured by methods described in the following (9) through (10) items. Compositions of solid acids are expressed in terms of % by weight of magnesium oxide (MgO), aluminum oxide (Al$_2$O$_3$) and silicon dioxide (SiO$_2$). Solid acids A, B, C and F are products of Kyowa Chemical Industry K.K. Solid acids D and E are products of Tomita Seiyaku K.K.

TABLE 1

| Solid acid | Example | | | Comparative Example | | |
|---|---|---|---|---|---|---|
| | A | B | C | D | E | F |
| Component (wt %) | | | | | | |
| MgO | — | — | 14.8 | 14.1 | — | — |
| Al$_2$O$_3$ | 11.5 | 10.7 | — | — | 10.7 | 10.2 |
| SiO$_2$ | 63.7 | 63.3 | 66.3 | 63.2 | 69.6 | 61.5 |
| Specific surface area (m$^2$/g) | 761 | 657 | 521 | 338 | 267 | 148 |
| Average pore diameter (Å) | 86.7 | 78.5 | 43.6 | 90.5 | 270 | 202 |

(9) Composition of solid acid 5 parts by weight of nitric acid is added to 1 part of a solid acid, and heated at 80° C. for 24 hours. It is cooled to room temperature and the resulting uniform solution is used as a sample. The sample solution is analyzed using a high frequency inducing bond plasma measuring apparatus [manufactured by Shimadzu Corp., type: ICPS-8000C], and silicon, aluminum and magnesium are measured.

(10) Specific surface area (unit: m$^2$/g) and average pore diameter (unit: Å) of solid acid A measuring apparatus (manufactured by Cantachrome Corp., type autosorb 3) is used. Before measurement, a solid acid is subjected to heat pressure-reducing treatment at a temperature of 150° C. and a pressure of 1.33 kPa or less for 1 hour. Nitrogen is used as the absorption and releasing gas.

Production Example 1

Phosphazenium Compound (Hereinafter, Represented by PZN)

60.20 g of Phosphorus pentachloride (manufactured by Junsei Kagaku K.K.) was weighed into a 3000 ml three-necked flask equipped with a thermometer and a dropping funnel, and to this was added 525 ml of o-dichlorobenzene (hereinafter, referred to as ODCB, manufactured by Mitsui Chemical Co., Ltd.) to prepare a suspension. This suspension was heated to 30° C., and to this was added drop-wise a solution prepared by dissolving 439.27 g of tris (dimethylamino)phosphazene{(Me$_2$N)$_3$P=NH} synthesized by a in method described in Reinhard Schwesinger, et al. Angew. Chem. Int. Ed. Engl., 1993, 32, 1361 to 1363, into 900 ml of ODCB over a period of 1 hour. This mixture was stirred for 30 minutes at the same temperature, then, heated up to 160° C. over about 30 minutes, and further stirred for 20 hours. Insoluble materials produced were filtrated. Ion exchange water was added to the filtrate, and washed with water three times.

To 1091.2 g of a water-insoluble layer after the water washing was added 619.26 g of ion exchange water and 289.5 ml of 1 mol/L hydrochloric acid, and the aqueous layer was separated, to obtain tetrakis[tris(dimethylamino) phosphoranylideneamino]phosphonium chloride $\{[(Me_2N)_3P=N]_4P\ Cl^-\}$. Further, ion exchange water was added to prepare a 2.5 wt % aqueous solution. Then, a 2.5 wt % aqueous solution of tetrakis[tris(dimethylamino) phosphoranylideneamino]phosphonium chloride was passed at a temperature of 23° C. and a SV (space velocity) of 0.5 (1/hr) through a polycarbonate cylindrical column filled with an ion exchange resin, Revatit MP-500 (manufactured by Bayer) in which an exchange group had been converted to hydroxyl group type by a 1 mol/L sodium hydroxide aqueous solution, upward from the bottom part of the column, to carry out ion exchange on tetrakis[tris(dimethylamino) phosphoranylideneamino]phosphonium hydroxide.

Further, ion exchange water was passed through this column filled with an ion exchange resin to recover a phosphazenium compound remaining in the column. Then, the aqueous solution of tetrakis[tris(dimethylamino) phosphoranylideneamino]phosphonium hydroxide was subjected to pressure-reduced dehydration treatment under conditions of a temperature of 80° C. and a pressure of 7.98 kPa for 2 hours and further, under conditions of a temperature of 80° C. and a pressure of 133 kPa for 7 hours, to obtain powdery tetrakis[tris(dimethylamino) phosphoranylideneamino]phospho nium hydroxide $\{[(Me_2N)_3P=N]_4P^+OH^-\}$ (PZN).

The yield calculated based weight measurement of this compound after drying was 98% by weight. Chemical shift of $^1$H-NMR (manufactured by JEOL Corp., 400 MHz NMR) measured by using as an internal standard tetramethylsilane by a deuterided dimethylformamide solution was 2.6 ppm (d, J=9.9 Hz, 72 H). Element analysis: C: 38.28, H: 9.82, N: 29.43, P: 19.94 (calc. C: 38.09, H: 9.72, N: 29.61, P: 20.46). This phosphazenium compound is a compound represented by the chemical formula (1) wherein, a, b, c and d are (1,1,1,1) in this order, R represents a methyl group, and Q$^-$ represents a hydroxy anion OH$^-$.

Production Example 2

Phosphine Oxide Compound (Hereinafter, Represented by PZO)

Synthesis of tris[tris(dimethylamino) phosphoranylideneamino]phosphine oxide $\{[(Me_2N)_3P=N]_3P=O.0.29H_2O\}$ (M represents a methyl group, hereinafter, the same) was conducted by a method described in the Journal of General Chemistry of the USSR (USSR), Vol. 55, p. 1453 (1985), using phosphorus oxytrichloride and tris(dimethylamino)pohsphazene produced in Example 1 as raw materials and toluene as a solvent. Then, this compound was placed in a desiccator containing phosphorus pentachloride as a drying agent, and dried under conditions of 23° C. and 655 Pa for 1 week, to obtain tris[tris(dimethylamino)phosphoranylideneamino] phosphine oxide $\{[(Me_2N)_3P=N]_3P=O\}$ containing no water. The resulting compound is a phosphine oxide compound represented by the chemical formula (2) wherein R represents a methyl (Me) group and x is 0. Identification of the chemical formula was conducted by $^{31}$P—NMR, $^1$H—NMR and element analysis method.

Production Example 3

Phosphazene Compound (Hereinafter, Represented by PZB)

A n-hexane solution controlled to 1.0 mol/L of phosphazene base P<t/4>-t-Oct (trade name: manufactured by Fulka) was used. This compound is a phosphazene compound represented by the chemical formula (3) wherein Q represents a tert-octyl group, D represents a dimethylamino group, 1, m and n are (1,1,1) in this order.

<Production of Polyoxyalkylene Polyol>

Example 1

Polyoxyalkylene Polyol A

5×10$^{-3}$ mol of PZN (in the form of 30 wt % toluene solution, hereinafter the same) were added to 1 mol of dipropylene glycol having a water content of 345 ppm under nitrogen atmosphere, and nitrogen substitution was conducted, then, the mixture was heated to 105° C., and heat pressure-reduced treatment was conducted for 3 hours under pressure conditions of 1.33 kPa or less at the same temperature while introducing nitrogen into the liquid phase. Then, addition-polymerization reaction of propylene oxide was conducted under conditions of an initial pressure of 8.65 kPa, a polymerization temperature of 80° C. and a maximum reaction pressure of 330 kPa until OHV reached 28 mg KOH/g. When change in pressure in the autoclave was not recognized, pressure-reducing treatment was conducted for 0.5 hours under conditions of 80° C. and 1.33 kPa or less, to obtain a crude polyoxyalkylene polyol.

Then, 3% by weight of ion exchange water and 0.8% by weight of solid acid A were added under nitrogen atmosphere to the crude polyoxyalkylene polyol controlled to 80° C., and adsorption reaction was conducted for 2 hours at the same temperature. Then, 750 ppm of an antioxidant [manufactured by Chiba Specialties Chemicals, trade name: IRGANOX 1010, hereinafter the same] was added to this polyol, and heat pressure-reduced dehydration treatment was conducted for 3 hours under conditions of 110° C. and 880 Pa. It was pressurized until atmospheric pressure with nitrogen was reached, then, filtration under reduced pressure was conducted through filter paper (manufactured by Advantec Toyo, 5C type, hereinafter the same) having a remaining particle size of 1 μm to purify the polyoxyalkylene polyol. In the crude polyoxyalkylene polyol A, OHV was 28.3 mg KOH/g, C=C was 0.013 meq./g, H—T bond selectivity was 96.5 mol %, η was 900 mPa·s/25° C., and the catalyst-remaining amount was 2.5 ppm. PO content was 100% by weight, and the sodium-remaining amount (hereinafter, referred to as Na-remaining amount) was less than 0.1 ppm (less than detection limit concentration).

Example 2

Polyoxyalkylene Polyol B

6×10$^{-3}$ mol of PZO were added to 1 mol of glycerine which had been previously subjected to heat pressure-reduced dehydration treatment under conditions of 110° C. and 655 Pa for 1.5 hours while ventilating nitrogen to control the water content to 95 ppm, and nitrogen substitution was conducted, then, the mixture was heated to 85° C. Then, addition-polymerization reaction of propylene oxide was conducted under conditions of atmospheric pressure, a polymerization temperature of 85° C. and a maximum reaction pressure of 455 kPa until OHV reached 28 mg KOH/g. When change in pressure in the autoclave was not recognized, pressure-reducing treatment was conducted for 0.5 hours under conditions of 85° C. and 1.33 kPa or less, to obtain a crude polyoxyalkylene polyol.

Then, the mixture was heated to 120° C., and pressure-reducing treatment was conducted for 1 hour under conditions of the same temperature and 1.33 kPa, then, it was pressurized to 230 kPa with nitrogen. Ethylene oxide was charged sequentially until OHV reached 24 mg KOH/g. After the charging of ethylene oxide, the reaction was continued until no change in pressure in the autoclave was recognized. Then, pressure-reducing treatment was conducted for 0.5 hours under conditions of the same temperature and 1.33 kPa or less. Then, 2% by weight of ion exchange water and 0.8% by weight of solid acid A were added under nitrogen atmosphere to the crude polyoxyalkylene polyol controlled to 80° C., and adsorption reaction was conducted for 1 hour at a temperature of 80° C. Then, 750 ppm of an antioxidant was added to this crude polyol, and heat pressure-reduced dehydration treatment was conducted for 3 hours under conditions of 110° C. and 880 Pa. It was pressurized until atmospheric pressure with nitrogen was reached, then, filtration under reduced pressure was conducted through filter paper to purify the crude polyoxyalkylene polyol In the purified polyoxyalkylene polyol B, OHV was 24.2 mg KOH/g, C=C was 0.018 meq./g, H—T bond selectivity was 97.1 mol %, η was 1420 mPa·s/25° C., and the catalyst-remaining amount was 23 ppm. Na-remaining amount was less than 0.1 ppm (less than detection limit concentration) and PO content was 85.1% by weight, and end EO content was 14.8% by weight.

Example 3

Polyoxyalkylene Polyol C $4 \times 10^{-3}$ mol of PZN were added to 1 mol of dipropylene glycol used in Example 1 under nitrogen atmosphere, and nitrogen substitution was conducted, then, the mixture was heated to 105° C., and heat pressure-reduced treatment was conducted by the same method as in Example 1. Then, addition-polymerization reaction of a mixed epoxide of propylene oxide with butylene oxide was conducted under conditions of an initial pressure of 8.65 kPa, a polymerization temperature of 85° C. and a maximum reaction pressure of 420 kPa until OHV reached 37 mg KOH/g. When change in pressure in the autoclave was not recognized, pressure-reducing treatment was conducted for 0.5 hours under conditions of 85° C. and 1.33 kPa or less, to obtain a crude polyoxyalkylene polyol. This mixed epoxide showed a ratio by weight of propylene oxide to butylene oxide of 85:15.

Then, 5% by weight of ion exchange water and 1% by weight of solid acid A were added under nitrogen atmosphere to the crude polyoxyalkylene polyol controlled to 80° C., and adsorption reaction was conducted for 1 hour at the same temperature. Then, 800 ppm of an antioxidant was added to this polyol, and heat pressure-reduced dehydration treatment was conducted for 3 hours under conditions of 110° C. and 850 Pa. It was pressurized until atmospheric pressure with nitrogen was reached, then, filtration under reduced pressure was conducted through filter paper to purify the polyoxyalkylene polyol. In the purified polyoxyalkylene polyol C, OHV was 37.3 mg KOH/g, C=C was 0.009 meq./g, H—T bond selectivity was 97.4 mol %, η was 550 mPa·s/25° C., and the catalyst-remaining amount was 3.1 ppm. PO content was 84.8% by weight, and Na-remaining amount was less than 0.1 ppm (less than detection limit concentration).

Example 4

Polyoxyalkylene Polyol D $1 \times 10^{-2}$ mol of PZO were added to 1 mol of pentaerythritol having a water content of 442 ppm under nitrogen atmosphere, and nitrogen substitution was conducted, then, 20 parts by weight of propylene oxide was charged per 100 parts by weight of pentaerythritol under a pressure condition of 6.65 kPa, and the mixture was heated to 85° C. After reaction at the same temperature for 1 hour while stirring, addition-polymerization reaction of a mixed epoxide of propylene oxide with butylene oxide was conducted under conditions of a polymerization temperature of 85° C. and a maximum reaction pressure of 460 kPa until OHV reached 28 mg KOH/g. When change in pressure in the autoclave was not recognized, pressure-reducing treatment was conducted for 0.5 hours under conditions of 85° C. and 1.33 kPa or less, to obtain a crude polyoxyalkylene polyol. This mixed epoxide showed a ratio by weight of propylene oxide to butylene oxide of 90:10. Then, it was pressurized up to 180 kPa with nitrogen, and addition-polymerization of ethylene oxide was conducted under conditions of a polymerization temperature of 125° C. and a maximum reaction pressure of 480 kPa until OHV reached 24 mg KOH/g. When change in pressure in the autoclave was not recognized, pressure-reducing treatment was conducted for 0.5 hours under conditions of 125° C. and 1.33 kPa or less, to obtain a crude polyoxyalkylene polyol.

Then, 3% by weight of ion exchange water and 0.8% by weight of solid acid A were added under nitrogen atmosphere to the crude polyoxyalkylene polyol controlled to 80° C., and adsorption reaction was conducted for 1 hour at the same temperature. Then, 600 ppm of an antioxidant was added to the crude polyoxyalkylene polyol, and dehydration was conducted under reduced pressure. Finally, the same treatment was conducted for 3 hours under conditions of 110° C. and 880 Pa. It was pressurized until atmospheric pressure with nitrogen was reached, then, filtration under reduced pressure was conducted through filter paper to purify the polyoxyalkylene polyol. In the purified polyoxyalkylene polyol D, OHV was 24.3 mg KOH/g, C=C was 0.016 meq./g, H—T bond selectivity was 97.6 mol %, η was 1540 mPa·s/25° C., and the catalyst-remaining amount was 26 ppm. PO content was 76.3% by weight, end EO content was 15.1% by weight, and Na-remaining amount was less than 0.1 ppm (less than detection limit concentration).

Example 5

Polyoxyalkylene Polyol E $1.2 \times 10^{-2}$ mol of PZN were added to 1 mol of glycerine used in Example 2 under nitrogen atmosphere, and nitrogen substitution was conducted, then, heat pressure-reduced treatment was conducted by the same method as in Example 1. Then, addition-polymerization reaction of propylene oxide was conducted under conditions of atmospheric pressure, a polymerization temperature of 80° C. and a maximum reaction pressure of 410 kPa until OHV reached 32.5 mg KOH/g. When change in pressure in the autoclave was not recognized, pressure-reducing treatment was conducted for 0.5 hours under conditions of 85° C. and 1.33 kPa or less, then, it was pressurized with nitrogen up to 182 kPa, and addition-polymerization reaction of ethylene oxide was conducted under conditions of a polymerization temperature of 120° C. and a maximum reaction pressure of 410 kPa until OHV reached 28 mg KOH/g.

Then, 5% by weight of ion exchange water and 0.7% by weight of solid acid B were added under nitrogen atmosphere to the crude polyoxyalkylene polyol controlled to 80° C., and adsorption reaction was conducted for 1 hour at a temperature of 80° C. Then, 600 ppm of an antioxidant was added to the crude polyoxyalkylene polyol, and dehydration was conducted under reduced pressure. Further, the dehydration under reduced pressure was continued, and finally, the same operation was conducted for 3 hours under conditions of 110° C. and 880 Pa. It was pressurized until atmospheric pressure with nitrogen was reached, then, filtration under reduced pressure was conducted through filter paper to purify the polyoxyalkylene polyol. In the purified polyoxyalkylene polyol E, OHV was 28.1 mg KOH/g, C=C was 0.014 meq./g, H—T bond selectivity was 96.8 mol %, $\eta$ was 1150 mPa·s/25° C., and the catalyst-remaining amount was 25 ppm. PO content was 85.4% by weight, end EO was 14.5% by weight, and Na-remaining amount was less than 0.1 ppm (less than detection limit concentration).

Example 6

Polyoxyalkylene Plyol F $7.5 \times 10^{-3}$ mol of PZN were added to 1 mol of glycerine used in Example 2 under nitrogen atmosphere, and nitrogen substitution was conducted, then, heat pressure-reduced treatment was conducted by the same method as in Example 1. Then, addition-polymerization reaction of propylene oxide was conducted under conditions of atmospheric pressure, a polymerization temperature of 80° C. and a maximum reaction pressure of 410 kPa until OHV reached 40 mg KOH/g. When change in pressure in the autoclave was not recognized, pressure-reducing treatment was conducted for 0.5 hours under conditions of 80° C. and 1.33 kPa or less, then, it was pressurized with nitrogen up to 182 kPa, and addition-polymerization reaction of ethylene oxide was conducted under conditions of a polymerization temperature of 125° C. and a maximum reaction pressure of 480 kPa until OHV reached 33 mg KOH/g.

Then, 5% by weight of ion exchange water and 1% by weight of solid acid A were added under nitrogen atmosphere to the crude polyoxyalkylene polyol controlled to 80° C., and adsorption reaction was conducted for 3 hours at a temperature of 80° C. Then, 600 ppm of an antioxidant was added to the crude polyoxyalkylene polyol, and dehydration was conducted under reduced pressure. Further, the dehydration under reduced pressure was continued, and finally, the same operation was conducted for 3 hours under conditions of 110° C. and 880 Pa. It was pressurized until atmospheric pressure with nitrogen was reached, then, filtration under reduced pressure was conducted through filter paper to purify the polyoxyalkylene polyol. In the crude polyoxyalkylene polyol F, OHV was 33.5 mg KOH/g, C=C was 0.012 meq./g, H—T bond selectivity was 97.2 mol %, $\eta$ was 900 mPa·s/25° C., and the catalyst-remaining amount was 1.3 ppm. PO content was 84.6% by weight, end EO was 15.3% by weight, and Na-remaining amount was less than 0.1 ppm (less than detection limit concentration).

Example 7

Polyoxyalkylene Polyol G $5.5 \times 10^{-3}$ mol of PZN were added to 1 mol of glycerine used in Example 2 under nitrogen atmosphere, and nitrogen substitution was conducted, then, heat pressure-reduced treatment was conducted by the same method as in Example 1. Then, addition-polymerization reaction of a mixed epoxide of propylene oxide with butylene oxide was conducted under conditions of a pressure of 6.65 kPa, a polymerization temperature of 95° C. and a maximum reaction pressure of 410 kPa until OHV reached 53 mg KOH/g. The ratio by weight of the mixed epoxide of propylene oxide to butylene oxide was 90:10. When change in pressure in the autoclave was not recognized, pressure-reducing treatment was conducted for 0.5 hours under conditions of 95° C. and 1.33 kPa or less, then, it was pressurized with nitrogen up to 182 kPa, and addition-polymerization reaction of ethylene oxide was conducted under conditions of a polymerization temperature of 125° C. and a maximum reaction pressure of 480 kPa until OHV reached 45 mg KOH/g.

Then, 5% by weight of ion exchange water and 0.75% by weight of solid acid A were added under nitrogen atmosphere to the crude polyoxyalkylene polyol controlled to 80° C., and adsorption reaction was conducted for 2 hours at a temperature of 80° C. Then, 600 ppm of an antioxidant was added to the crude polyoxyalkylene polyol, and dehydration was conducted under reduced pressure. Further, the dehydration under reduced pressure was continued, and finally, the same operation was conducted for 3 hours under conditions of 110° C. and 880 Pa. It was pressurized until atmospheric pressure with nitrogen was reached, then, filtration under reduced pressure was conducted through filter paper to purify the polyoxyalkylene polyol. In the purified polyoxyalkylene polyol G, OHV was 44.9 mg KOH/g, C=C was 0.010 meq./g, H—T bond selectivity was 97.7 mol %, $\eta$ was 620 mPa·s/25° C., and the catalyst-remaining amount was 2.5 ppm. PO content was 76.8% by weight, end EO was 14.2% by weight, and Na-remaining amount was less than 0.1 ppm (less than detection limit concentration).

Example 8

Polyoxyalkylene Polyol H $8 \times 10^{-3}$ mol of PZO were added to 1 mol of dipropylene glycol used in Example 1 under nitrogen atmosphere, and nitrogen substitution was conducted, then, the mixture was heated to 75° C. Then, addition-polymerization reaction of propylene oxide was conducted under conditions of a pressure of 2.66 kPa, a polymerization temperature of 75° C. and a maximum reaction pressure of 350 kPa until OHV reached 18.5 mg KOH/g. When change in pressure in the autoclave was not recognized, pressure-reducing treatment was conducted for 0.5 hours under conditions of 90° C. and 1.33 kPa or less, to obtain a crude polyoxyalkylene polyol.

Then, 5% by weight of ion exchange water and 0.9% by weight of solid acid A were added under nitrogen atmosphere to the crude polyoxyalkylene polyol controlled to 80° C., and adsorption reaction was conducted for 2 hours at a temperature of 80° C. Then, 600 ppm of an antioxidant was added to the crude polyoxyalkylene polyol, and dehydration was conducted under reduced pressure. Further, the dehydration under reduced pressure was continued, and finally, the same operation was conducted for 3 hours under conditions of 110° C. and 880 Pa. It was pressurized until atmospheric pressure with nitrogen was reached, then, filtration under reduced pressure was conducted through filter paper to purify the polyoxyalkylene polyol. In the purified polyoxyalkylene polyol H, OHV was 18.6 mg KOH/g, C=C was 0.025 meq./g, H—T bond selectivity was 98.1 mol %, $\eta$ was 1500 mPa·s/25° C., and the catalyst-remaining amount was 4.2 ppm. PO content was 100% by weight, and

Example 9

Polyoxyalkylene Polyol I $3 \times 10^{-3}$ mol of PZN and $3 \times 10^{-3}$ mol of PZO were added to 1 mol of glycerine used in Example 2 under nitrogen atmosphere, and nitrogen substitution was conducted, then, heat pressure-reducing operation was conducted by the same manner as in Example 1. Then, addition-polymerization reaction of propylene oxide was conducted under conditions of a pressure of 2.66 kPa, a polymerization temperature of 75° C. and a maximum reaction pressure of 350 kPa until OHV reached 33.2 mg KOH/g. When change in pressure in the autoclave was not recognized, pressure-reducing treatment was conducted for 0.5 hours under conditions of 90° C. and 1.33 kPa or less, to obtain a crude polyoxyalkylene polyol.

Then, 5% by weight of ion exchange water and 0.8% by weight of solid acid A were added under nitrogen atmosphere to the crude polyoxyalkylene polyol controlled to 80° C., and adsorption reaction was conducted for 2 hours at a temperature of 80° C. Then, 600 ppm of an antioxidant was added to the crude polyoxyalkylene polyol, and dehydration was conducted under reduced pressure. Further, the dehydration under reduced pressure was continued, and finally, the same operation was conducted for 3 hours under conditions of 110° C. and 880 Pa. It was pressurized until atmospheric pressure with nitrogen was reached, then, filtration under reduced pressure was conducted through filter paper to purify the polyoxyalkylene polyol. In the purified polyoxyalkylene polyol I, OHV was 33.5 mg KOH/g, C=C was 0.014 meq./g, H—T bond selectivity was 97.9 mol %, η was 920 mPa·s/25° C., and the catalyst-remaining amount was 6.6 ppm. PO content was 99.6% by weight, and Na-remaining amount was less than 0.1 ppm (less than detection limit concentration).

Example 10

Polyoxyalkylene Polyol J $1.2 \times 10^{-2}$ mol of PZO were added to 1 mol of glycerine used in Example 2 under nitrogen atmosphere, and nitrogen substitution was conducted, then, the mixture was heated to 80° C. Then, addition-polymerization reaction of propylene oxide was conducted under pressure conditions of 6.65 kPa, a polymerization temperature of 80° C. and a maximum reaction pressure of 450 kPa until OHV reached 11 mg KOH/g. When change in pressure in the autoclave was not recognized, pressure-reducing treatment was conducted for 1 hour under conditions of 80° C. and 1.33 kPa or less, to obtain a crude polyoxyalkylene polyol.

Then, 5% by weight of ion exchange water and 0.7% by weight of solid acid A were added under nitrogen atmosphere to the crude polyoxyalkylene polyol controlled to 80° C., and adsorption reaction was conducted for 3 hours at a temperature of 80° C. Then, 600 ppm of an antioxidant was added to the crude polyoxyalkylene polyol, and dehydration was conducted under reduced pressure. Further, the dehydration under reduced pressure was continued, and finally, the same operation was conducted for 3 hours under conditions of 110° C. and 880 Pa. It was pressurized until atmospheric pressure with nitrogen was reached, then, filtration under reduced pressure was conducted through filter paper to purify the polyoxyalkylene polyol. In the purified polyoxyalkylene polyol J, OHV was 11.3 mg KOH/g, C=C was 0.037 meq./g, H—T bond selectivity was 97.5 mol %, η was 3950 mPa·s/25° C., and the catalyst-remaining amount was 5.1 ppm. PO content was 100% by weight, and Na-remaining amount was less than 0.1 ppm (less than detection limit concentration).

Example 11

Polyoxyalkylene Polyol K $6 \times 10^{-3}$ mol of PZN were added to 1 mol of glycerine used Example 2 under nitrogen atmosphere, and nitrogen substitution was conducted, then, heat pressure-reducing in operation was conducted by the same method as in Example 1. Then, addition-polymerization reaction of propylene oxide was conducted under conditions of a pressure of 86.5 kPa, a polymerization temperature of 78° C. and a maximum reaction pressure of 475 kPa until OHV reached 56 mg KOH/g. When change in pressure in the autoclave was not recognized, pressure-reducing treatment was conducted for 1 hour under conditions of 80° C. and 1.33 kPa or less, to obtain a crude polyoxyalkylene polyol.

Then, 5% by weight of ion exchange water and 0.8% by weight of solid acid A were added under nitrogen atmosphere to the crude polyoxyalkylene polyol controlled to 80° C., and adsorption reaction was conducted for 1 hour at a temperature of 80° C. Then, 600 ppm of an antioxidant was added to the crude polyoxyalkylene polyol, and dehydration was conducted under reduced pressure. Further, the dehydration under reduced pressure was continued, and finally, the same operation was conducted for 3 hours under conditions of 110° C. and 880 Pa. It was pressurized until atmospheric pressure with nitrogen was reached, then, filtration under reduced pressure was conducted through filter paper to purify the polyoxyalkylene polyol. In the purified polyoxyalkylene polyol K, OHV was 56.3 mg KOH/g, C=C was 0.009 meq./g, H—T bond selectivity was 97.6 mol %, η was 480 mPa·s/25° C., and the catalyst-remaining amount was 2.1 ppm. PO content was 100% by weight, and Na-remaining amount was less than 0.1 ppm (less than detection limit concentration).

Example 12

Polyoxyalkylene Polyol L $5 \times 10^{-3}$ mol of PZO were added to 1 mol of glycerine used in Example 2 under nitrogen atmosphere, and nitrogen substitution was conducted, then, the mixture was heated to 88° C. Then, addition-polymerization reaction of propylene oxide was conducted under conditions of a pressure of 86.5 kPa, a polymerization temperature of 88° C. and a maximum reaction pressure of 475 kPa until OHV reached 98 mg KOH/g, and when change in pressure in the autoclave was not recognized at the same temperature, addition-polymerization reaction of ethylene oxide was conducted until OHV reached 76 mg KOH/g. Further, when change in pressure in the autoclave was not recognized at the same temperature, addition-polymerization reaction of propylene oxide was conducted until OHV reached 56 mg KOH/g. When change in pressure in the autoclave was not recognized, pressure-reducing treatment was conducted for 1 hour under conditions of 90° C. and 1.33 kPa or less, to obtain a crude polyoxyalkylene polyol.

Then, 5% by weight of ion exchange water and 0.7% by weight of solid acid A were added under nitrogen atmosphere to the crude polyoxyalkylene polyol controlled to 80°

C., and adsorption reaction was conducted for 1 hour at a temperature of 80° C. Then, 600 ppm of an antioxidant was added to the crude polyoxyalkylene polyol, and dehydration was conducted under reduced pressure. Further, the dehydration under reduced pressure was continued, and finally, the same operation was conducted for 3 hours under conditions of 110° C. and 880 Pa. It was pressurized until atmospheric pressure with nitrogen was reached, then, filtration under reduced pressure was conducted through filter paper to purify the polyoxyalkylene polyol. In the purified polyoxyalkylene polyol L, OHV was 56.1 mg KOH/g, C=C was 0.010 meq./g, H—T bond selectivity was 97.8 mol %, η was 540 mPa·s/25° C., and the catalyst-remaining amount was 34 ppm. PO content was 75.8% by weight, and end EO content was 7.8% by weight. The Na-remaining amount was less than 0.1 ppm (less than detection limit concentration).

Example 13

Polyoxyalkylene Polyol M $7.2 \times 10^{-3}$ mol of PZO were added to 1 mol of dipropylene glycol used in Example 1 under nitrogen atmosphere, and nitrogen substitution was conducted, then, the mixture was heated to 80° C. Then, addition-polymerization reaction of propylene oxide was conducted under conditions of a pressure of 86.5 kPa, a polymerization temperature of 80° C. and a maximum reaction pressure of 475 kPa until OHV reached 18.7 mg KOH/g. When change in pressure in the autoclave was not recognized, pressure-reducing treatment was conducted for 1 hour under conditions of 80° C. and 1.33 kPa or less, to obtain a crude polyoxyalkylene polyol (hereinafter, referred to as crude polyol m). The concentration of a catalyst in the crude polyol at this point was 682 ppm.

Then, 3% by weight of ion exchange water and 0.8% by weight of solid acid A were charged under nitrogen atmosphere to the crude polyol m controlled to 85° C., and adsorption reaction was conducted for 3 hours at a temperature of 85° C. Further, dehydration under reduced pressure was continued, and finally, the same operation was conducted for 3 hours under conditions of 105° C. and 1.33 kPa or less. It was pressurized until atmospheric pressure with nitrogen was reached, then, filtration under reduced pressure was conducted through filter paper to purify the polyoxyalkylene polyol. In the purified polyoxyalkylene polyol M, OHV was 18.6 mg KOH/g, C=C was 0.025 meq./g, H—T bond selectivity was 98.1 mol %, η was 1500 mPa·s/25° C., and the catalyst-remaining amount was 3.8 ppm. PO content was 100% by weight, and Na-remaining amount was less than 0.1 ppm (less than detection limit concentration).

Example 14

Polyoxyalkylene Polyol N

The crude polyol m prepared in Example 13 was used. The same purification was conducted as in Example 13 except that the amount added of solid acid A was 0.5% by weight based on the crude polyol m, to recover the polyoxyalkylene polyol. In the purified polyoxyalkylene polyol N, OHV was 18.7 mg KOH/g, C=C was 0.025 meq./g, H—T bond selectivity was 98.1 mol %, η was 1500 mPa·s/25° C., and the catalyst-remaining amount was 42.4 ppm. PO content was 100% by weight, and Na-remaining amount was less than 0.1 ppm (less than detection limit concentration).

Example 15

Polyoxyalkylene Polyol O $9.2 \times 10^{-3}$ mol of PZO were added to 1 mol of glycerine used in Example 2 under nitrogen atmosphere, and nitrogen substitution was conducted, then, the mixture was heated to 80° C. Then, addition-polymerization reaction of propylene oxide was conducted under pressure conditions of 86.5 kPa, a polymerization temperature of 80° C. and a maximum reaction pressure of 475 kPa until OHV reached 18.5 mg KOH/g. When change in pressure in the autoclave was not recognized, pressure-reducing treatment was conducted for 1 hour under conditions of 80° C. and 1.33 kPa or less, to obtain a crude polyoxyalkylene polyol (hereinafter, referred to as crude polyol o1). The concentration of a catalyst in the crude polyol at this point was 872 ppm.

Then, solid acid A was used, and was purified by the same manner as in Example 13 except that the amount added thereof was 1.0% by weight based on the crude polyol o1, to recover the polyoxyalkylene polyol. In the purified polyoxyalkylene polyol O, OHV was 18.7 mg KOH/g, C=C was 0.026 meq./g, H—T bond selectivity was 97.6 mol %, η was 1880 mPa·s/25° C., and the catalyst-remaining amount was 3.5 ppm. PO content was 100% by weight, and Na-remaining amount was less than 0.1 ppm (less than detection limit concentration).

Example 16

Polyoxyalkylene Polyol P $5.6 \times 10^{-3}$ mol of PZN were added to 1 mol of glycerine used in Example 2 under nitrogen atmosphere, and nitrogen substitution was conducted, then, heat pressure-reducing operation was conducted by the same manner as in Example 1. Then, addition-polymerization reaction of propylene oxide was conducted under pressure conditions of 86.5 kPa, a polymerization temperature of 80° C. and a maximum reaction pressure of 405 kPa until OHV reached 33 mg KOH/g. When change in pressure in the autoclave was not recognized, pressure-reducing treatment was conducted for 1 hour under conditions of 80° C. and 1.33 kPa or less, to obtain a crude polyoxyalkylene polyol (hereinafter, referred to as crude polyol p1). The concentration of a catalyst in the crude polyol at this point was 852 ppm.

Then, 5% by weight of ion exchange water and 0.35% by weight of solid acid A were charged under nitrogen atmosphere to the crude polyol p1 previously heated to 80° C., and they were mixed by stirring at 80° C. for 3 hours. Then, dehydration under reduced pressure was initiated while raising the temperature. Finally, heat pressure-reducing operation was conducted for 3 hours under conditions of 105° C. and 1.33 kPa or less, then, filtration under reduced pressure was conducted through filter paper to purify the polyoxyalkylene polyol. In the purified polyoxyalkylene polyol P, OHV was 33.7 mg KOH/g, C=C was 0.014 meq./g, H—T bond selectivity was 98.1mol %, η was 830mPa·s/25° C., and the catalyst-remaining amount was 8.0 ppm. PO content was 100% by weight, and Na-remaining amount was less than 0.1 ppm (less than detection limit concentration).

Example 17

Polyoxyalkylene Polyol Q

The crude polyol p1 prepared in Example 16 was used. The polyoxyalkylene polyol was purified by the same manner as in Example 16 except that the amount added of solid acid A was 0.5% by weight based on the crude polyol p1. In the purified polyoxyalkylene polyol Q, OHV was 33.7 mg KOH/g, C=C was 0.014 meq./g, H—T bond selectivity was 98.1 mol %, η was 830 mPa·s/25° C., and the catalyst-remaining amount was 1.2 ppm. PO content was 100% by weight, and Na-remaining amount was less than 0.1 ppm (less than detection limit concentration).

Example 18

Polyoxyalkylene Polyol R $1.2 \times 10^{-2}$ mol of PZB were added to 1 mol of glycerine used in Example 2 under nitrogen atmosphere, and nitrogen substitution was conducted, then, heat pressure-reducing operation was conducted by the same manner as in Example 1. Then, addition-polymerization reaction of propylene oxide was conducted under pressure conditions of 86.5 kPa, a polymerization temperature of 80° C. and a maximum reaction pressure of 405 kPa until OHV reached 18.4 mg KOH/g. When change in pressure in the autoclave was not recognized, pressure-reducing treatment was conducted for 1 hour under conditions of 80° C. and 1.33 kPa or less, to obtain a crude polyoxyalkylene polyol (hereinafter, referred to as crude polyol rl). The concentration of a catalyst in the crude polyol at this point was 930 ppm.

Then, the polyoxyalkylene polyol was purified by the same manner as in Example 16 except that 0.7% by weight of solid acid B was charged to the crude polyol rl previously heated to 80° C. under nitrogen atmosphere. In the purified polyoxyalkylene polyol R, OHV was 18.5 mg KOH/g, C=C was 0.027 meq./g, H—T bond selectivity was 97.9 mol %, η was 1550 mPa·s/25° C., and the catalyst-remaining amount was 27.9 ppm. PO content was 100% by weight, and Na-remaining amount was less than 0.1 ppm (less than detection limit concentration).

Example 19

Polyoxyalkylene Polyol S $5.0 \times 10^{-3}$ mol of PZN were added to 1 mol of dipropylene glycol used in Example 1 under nitrogen atmosphere, and nitrogen substitution was conducted, then, heat pressure-reducing operation was conducted by the same manner as in Example 1. Then, addition-polymerization reaction of propylene oxide was conducted under conditions of a pressure of 86.5 kPa, a polymerization temperature of 80° C. and a maximum reaction pressure of 385 kPa until OHV reached 37 mg KOH/g. When change in pressure in the autoclave was not recognized, pressure-reducing treatment was conducted for 1 hour under conditions of 80° C. and 1.33 kPa or less, to obtain a crude polyoxyalkylene polyol (hereinafter, referred to as crude polyol sl). The concentration of a catalyst in the crude polyol at this point was 1253 ppm.

Then, the polyoxyalkylene polyol was purified by the same manner as in Example 16 except that 0.7% by weight of solid acid C was charged to the crude polyol sl previously heated to 80° C. under nitrogen atmosphere. In the purified polyoxyalkylene polyol S, OHV was 37.1 mg KOH/g, C=C was 0.010 meq./g, H—T bond selectivity was 97.4 mol %, η was 550 mPa·s/25° C., and the catalyst-remaining amount was 85.3 ppm. PO content was 100% by weight, and Na-remaining amount was less than 0.1 ppm (less than detection limit concentration).

Comparative Example 1

Polyoxyalkylene Polyol T

The crude polyol m prepared in Example 13 was used. Purification was conducted by the same manner as in Example 13 except that the amount added of solid acid D was 0.8% by weight based on the crude polyol m, to recover the polyoxyalkylene polyol. In the purified polyoxyalkylene polyol T, the catalyst-remaining amount was 296.5 ppm, OHV was 18.9 mg KOH/g, and Na was 0.2 ppm. H—T bond selectivity was 98.1 mol %, η was 1500 mPa·s/25° C., C=C was 0.025 meq./g, and PO content was 100% by weight.

Comparative Example 2

Polyoxyalkylene Polyol U

The crude polyol o1 prepared in Example 15 was used. The crude polyol o1 was purified by the same manner as in Example 15 except that the amount added of solid acid D was 1.0% by weight based on the crude polyol o1, to recover the polyoxyalkylene polyol. In the purified polyoxyalkylene polyol U, the catalyst-remaining amount was 182.0 ppm, OHV was 18.8 mg KOH/g, and Na was 0.3 ppm. H—T bond selectivity was 97.6 mol %, η was 1880 mPa·s/25° C., C=C was 0.026 meq./g, and PO content was 100% by weight.

Comparative Example 3

Polyoxyalkylene Polyol V

The crude polyol o1 prepared in Example 15 was used. The crude polyol o1 was purified by the same manner as in Example 15 except that the amount added of solid acid E was 1.0% by weight based on the crude polyol o1, to recover the polyoxyalkylene polyol. In the purified polyoxyalkylene polyol V, the catalyst-remaining amount was 248.7 ppm, OHV was 18.7 mg KOH/g, and Na was 0.4 ppm. H—T bond selectivity was 97.6 mol %, η was 1880 mPa·s/25° C., C=C was 0.026 meq./g, and PO content was 100% by weight.

Comparative Example 4

Polyoxyalkylene Polyol W

The crude polyol m prepared in Example 13 was used. The crude polyol m was purified by the same manner as in Example 13 except that the amount added of solid acid D was 1.3% by weight based on the crude polyol m, to recover the polyoxyalkylene polyol. In the purified polyoxyalkylene polyol W, the catalyst-remaining amount was 135.2 ppm, OHV was 18.8 mg KOH/g, and Na was 0.5 ppm. H—T bond selectivity was 98.1 mol %, η was 1500 mPa·s/25° C., C=C was 0.025 meq./g, and PO content was 100% by weight.

Comparative Example 5

Polyoxyalkylene Polyol X $8 \times 10^{-3}$ mol of PZO were added to 1 mol of dipropylene glycol used in Example 1 under nitrogen atmosphere, and nitrogen substitution was conducted, then, the mixture was heated to 135° C. Then, addition-polymerization reaction of propylene oxide was conducted under pressure conditions of 86.5 kPa, a polymerization temperature of 135° C. and a maximum reaction pressure of 582 kPa until OHV reached 8.5 mg KOH/g. When change in pressure in the autoclave was not recognized, pressure-reducing treatment was conducted for 1 hour under conditions of 120° C. and 1.33 kPa or less, to obtain a crude polyoxyalkylene polyol.

Then, 3% by weight of ion exchange water was added based on the crude polyol controlled to 85° C. and 1.2 mol of phosphoric acid (in the form of 75.1% by weight aqueous solution) was added based on one mol of PZO in the crude polyol, and neutralization reaction was conducted at 85° C.

for 2 hours. Then, 600 ppm of an antioxidant was added to the crude polyol, then, finally, the same operation was conducted for 3 hours under conditions of 105° C. and 1.33 kPa or less while heating and reducing pressure. It was pressurized until atmospheric pressure with nitrogen was reached, then, filtration under reduced pressure was conducted through filter paper to purify the polyoxyalkylene polyol. In the purified polyoxyalkylene polyol X, OHV was 8.7 mg KOH/g, C=C was 0.077 meq./g, H—T bond selectivity was 97.5 mol %, η was 7450 mPa·s/25° C., and the catalyst-remaining amount was 353.4 ppm. PO content was 100% by weight.

Comparative Example 6

Polyoxyalkylene Polyol Y

The crude polyol r1 prepared in Example 18 was used. The crude polyol r1 was purified by the same manner as in Example 18 except that solid acid E was used, to recover the polyoxyalkylene polyol. In the purified polyoxyalkylene polyol Y, OHV was 18.7 mg KOH/g, and C=C could not be measured. H—T bond selectivity was 97.9 mol %, η was 1550 mPa·s/25° C., and the catalyst-remaining amount was 793 ppm. PO content was 100% by weight, and Na-remaining amount was 5.6 ppm.

Comparative Example 7

Polyoxyalkylene Polyol Z

The crude polyol p1 prepared in Example 16 was used. The crude polyol p1 was purified by the same manner as in Example 16 except that solid acid D was used, to recover the polyoxyalkylene polyol. In the purified polyoxyalkylene polyol Z, OHV was 34.1 mg KOH/g, C=C was 0.015 meq./g, H—T bond selectivity was 98.1 mol %, η was 830 mPa·s/25° C., and the catalyst-remaining amount was 262 ppm. PO content was 100% by weight, and Na-remaining amount was 0.8 ppm.

Comparative Example 8

Polyoxyalkylene Polyol Z1

The crude polyol s1 prepared in Example 19 was used. The crude polyol s1 was purified by the same manner as in Example 19 except that solid acid F was used, to recover the polyoxyalkylene polyol. In the purified polyoxyalkylene polyol Z1, OHV was 37.4 mg KOH/g, and C=C could not be measured. H—T bond selectivity was 97.4 mol %, η was 550 mPa·s/25° C., and the catalyst-remaining amount was 915 ppm. PO content was 100% by weight, and Na-remaining amount was 0.7 ppm.

Catalysts used for producing polyoxyalkylene polyols obtained in Examples 1 through 19 and Comparative Examples 1 through 8 (hereinafter, referred to as polyol), epoxide compounds, solid acids used for catalyst removal and amounts used thereof, kinds of acids and amounts used thereof, OHV, C=C, H—T bond selectivity, η, remaining amount of a catalyst composed of a compound having a P=N bond (simply, catalyst-remaining amount), Na-remaining amount (simply, Na), PO content and end EO content are summarized in [Table 2] to [Table 5].

Marks in tables show the following substances, respectively.

DPG: dipropylene glycol, Gly: glycerine, PE: pentaerythritol, PZN: phosphazenium compound, PZO: phosphine oxide compound, PZB: phosphazene compound, PO: propylene oxide, EO: ethylene oxide, BO: butylene oxide

TABLE 2

| Example | 1 | 2 | 3 | 4 | 5 | 6 | 7 |
|---|---|---|---|---|---|---|---|
| Polyol | A | B | C | D | E | F | G |
| Active hydrogen compound (mol) | | | | | | | |
| DPG | 1 | — | 1 | — | — | — | — |
| Gly | — | 1 | — | — | 1 | 1 | 1 |
| PE | — | — | — | 1 | — | — | — |
| Catalyst for polyol production (mol) | | | | | | | |
| PZN | $5 \times 10^{-3}$ | — | $4 \times 10^{-3}$ | — | $1.2 \times 10^{-2}$ | $7.5 \times 10^{-3}$ | $5.5 \times 10^{-3}$ |
| PZO | — | $6 \times 10^{-3}$ | — | $1 \times 10^{-2}$ | — | — | — |
| PZB | — | — | — | — | — | — | — |
| Epoxide compound | PO | PO/EO | PO/BO | PO/BO/EO | PO/EO | PO/EO | PO/EO |
| Kind/amount used of solid acid (wt %) | A/0.8 | A/0.8 | A/1 | A/0.8 | B/0.7 | A/1 | A/0.75 |
| Adsorption treatment condition temperature (° C.) × adsorption time (h) | 80° C. × 2 h | 80° C. × 1 h | 80° C. × 1 h | 80° C. × 1 h | 80° C. × 1 h | 80° C. × 3 h | 80° C. × 2 h |
| OHV (mgKOH/g) | 28.3 | 24.2 | 37.3 | 24.3 | 28.1 | 33.5 | 44.9 |
| C=C (meq./g) | 0.013 | 0.018 | 0.009 | 0.016 | 0.014 | 0.012 | 0.010 |
| H-T bond selectivity (mol %) | 96.5 | 97.1 | 97.4 | 97.6 | 96.8 | 97.2 | 97.7 |
| η (mPa.s/25° C.) | 900 | 1420 | 550 | 1540 | 1150 | 900 | 620 |
| Catalyst residual amount (ppm) | 2.5 | 23 | 3.1 | 26 | 2.5 | 1.3 | 2.5 |
| Na (ppm) [1] | <0.1 | <0.1 | <0.1 | <0.1 | <0.1 | <0.1 | <0.1 |
| PO content (wt %) | 100 | 85.1 | 84.8 | 76.3 | 85.4 | 84.6 | 76.8 |
| Terminal EO amount (wt %) | — | 14.8 | — | 15.1 | 14.5 | 15.3 | 14.2 |

[1] Na <0.1 ppm indicates less than detection limit concentration

TABLE 3

| Example | 8 | 9 | 10 | 11 | 12 | 13 |
|---|---|---|---|---|---|---|
| Polyol | H | I | J | K | L | M |
| Active hydrogen compound (mol) | | | | | | |
| DPG | 1 | — | — | — | — | 1 |
| Gly | — | 1 | 1 | 1 | 1 | — |
| PE | — | — | — | — | — | — |
| Catalyst for polyol production (mol) | | | | | | |
| PZN | — | $3 \times 10^{-3}$ | — | $6 \times 10^{-3}$ | — | — |
| PZO | $8 \times 10^{-3}$ | $3 \times 10^{-3}$ | $1.2 \times 10^{-2}$ | — | $5 \times 10^{-3}$ | $7.2 \times 10^{-3}$ |
| PZB | — | — | — | — | — | — |
| Epoxide compound | PO | PO | PO | PO | PO/EO/PO | PO |
| Kind/amount used of solid acid (wt %) | A/0.9 | A/0.8 | A/0.7 | A/0.8 | A/0.7 | A/0.8 |
| Adsorption treatment condition temperature (° C.) × adsorption time (h) | 80° C. × 2 h | 80° C. × 2 h | 80° C. × 3 h | 80° C. × 1 h | 80° C. × 1 h | 80° C. × 3 h |
| OHV (mgKOH/g) | 18.6 | 33.5 | 11.3 | 56.3 | 56.1 | 18.6 |
| C═C (meq./g) | 0.025 | 0.014 | 0.037 | 0.009 | 0.010 | 0.025 |
| H-T bond selectivity (mol %) | 98.1 | 97.9 | 97.5 | 97.6 | 97.8 | 98.1 |
| η (mPa.s/25° C.) | 1500 | 920 | 3950 | 480 | 540 | 1500 |
| Catalyst residual amount (ppm) | 4.2 | 6.6 | 5.1 | 2.1 | 34 | 3.8 |
| Na (ppm) [*1)] | <0.1 | <0.1 | <0.1 | <0.1 | <0.1 | <0.1 |
| PO content (wt %) | 100 | 99.6 | 100 | 100 | 75.8 | 100 |
| Terminal EO amount (wt %) | — | — | — | — | 7.8 | — |

[*1)] Na <0.1 ppm indicates less than detection limit concentration

TABLE 4

| Example | 14 | 15 | 16 | 17 | 18 | 19 |
|---|---|---|---|---|---|---|
| Polyol | N | O | P | Q | R | S |
| Active hydrogen compound (mol) | Crude polyol m | | | Crude polyol p1 | | |
| DPG | produced in Example 13 was used | — | — | produced in Example 16 was used | — | 1 |
| Gly | | 1 | 1 | | 1 | — |
| PE | | — | — | | — | — |
| Catalyst for polyol production (mol) | | | | | | |
| PZN | | — | $5.6 \times 10^{-3}$ | | — | $5.0 \times 10^{-3}$ |
| PZO | | $9.2 \times 10^{-3}$ | — | | — | — |
| PZB | | — | — | | $1.2 \times 10^{-2}$ | — |
| Epoxide compound | | PO | PO | | PO | PO |
| Kind/amount used of solid acid (wt %) | A/0.5 | A/1.0 | A/0.35 | A/0.5 | B/0.7 | C/0.7 |
| Adsorption treatment condition temperature (° C.) × adsorption time (h) | 85° C. × 3 h | 85° C. × 3 h | 80° C. × 3 h | 80° C. × 3 h | 80° C. × 3 h | 80° C. × 3 h |
| OHV (mgKOH/g) | 18.7 | 18.7 | 33.7 | 33.7 | 18.5 | 37.1 |
| C═C (meq./g) | 0.025 | 0.026 | 0.014 | 0.014 | 0.027 | 0.010 |
| H-T bond selectivity (mol %) | 98.1 | 97.6 | 98.1 | 98.1 | 97.9 | 97.4 |
| η (mPa.s/25° C.) | 1500 | 1880 | 830 | 830 | 1550 | 550 |
| Catalyst residual amount (ppm) | 42.4 | 3.5 | 8.0 | 1.2 | 27.9 | 85.3 |
| Na (ppm) [*1)] | <0.1 | <0.1 | <0.1 | <0.1 | <0.1 | <0.1 |
| PO content (wt %) | 100 | 100 | 100 | 100 | 100 | 100 |
| Terminal EO amount (wt %) | — | — | — | — | — | — |

[*1)] Na <0.1 ppm indicates less than detection limit concentration

TABLE 5

| Example | 1 | 2 | 3 | 4 | 5 | 6 | 7 | 8 |
|---|---|---|---|---|---|---|---|---|
| Polyol | T | U | V | W | X | Y | Z | Z1 |
| Active hydrogen compound (mol) | Crude polyol m | Crude polyol o1 | Crude polyol o1 | Crude polyol m | | Crude polyol r1 | Crude polyol p1 | Crude polyol s1 |
| DPG | produced in Example 13 was used | produced in Example 15 was used | produced in Example 15 was used | produced in Example 13 was used | 1 | produced in Example 18 was used | produced in Example 16 was used | produced in Example 19 was used |
| Gly | | | | | — | | | |
| PE | | | | | — | | | |
| Catalyst for polyol production (mol) | | | | | | | | |
| PZN | | | | | — | | | |
| PZO | | | | | $8.0 \times 10^{-3}$ | | | |
| PZB | | | | | — | | | |
| Epoxide compound | | | | | PO | | | |
| Kind/amount used of acid (mol of acid per 1 mol of catalyst in crude polyol) | — | — | — | — | Phosphoric acid/1.2 | — | — | — |
| Kind/amount used of solid acid (wt %) | D/0.8 | D/1.0 | E/1.0 | D/1.3 | — | E/0.7 | D/0.35 | F/0.7 |
| Adsorption treatment condition temperature (° C.) × adsorption time (h) | 85° C. × 3 h | 85° C. × 3 h | 85° C. × 3 h | 85° C. × 3 h | — | 80° C. × 3 h | 80° C. × 3 h | 80° C. × 3 h |
| OHV (mqKOH/q) | 18.9 | 18.8 | 18.7 | 18.8 | 8.7 | 18.7 | 34.1 | 37.4 |
| C=C (meq./q) | 0.025 | 0.026 | 0.026 | 0.025 | 0.077 | unmeasurable | 0.015 | unmeasurable |
| H-T bond selectivity (mol %) | 98.1 | 97.6 | 97.6 | 98.1 | 97.5 | 97.9 | 98.1 | 97.4 |
| η (mPa.s/25° C.) | 1500 | 1880 | 1880 | 1500 | 7450 | 1550 | 830 | 550 |
| Catalyst residual amount (ppm) | 296.5 | 182.0 | 248.7 | 135.2 | 353.4 | 793 | 262 | 915 |
| Na (ppm) [*1)] | 0.2 | 0.3 | 0.4 | 0.5 | — | 5.6 | 0.8 | 0.7 |
| PO content (wt %) | 100 | 100 | 100 | 100 | 100 | 100 | 100 | 100 |
| Terminal EO amount (wt %) | — | — | — | — | — | — | — | — |

[*1)] Na <0.1 ppm indicates less than detection limit concentration

<Consideration of Examples>

From the results of Examples 1 through 19 and Comparative Examples 1 through 8, the following knowledge is obtained. By using solid acids (A, B, C) having specific forms and compositions, the catalyst-remaining amount in a polyol can be efficiently reduced under 150 ppm. In Example 13 and Comparative Example 1, the same crude polyols m using a phosphine oxide compound (PZO) were purified by using the same amount of solid acid under the same adsorption condition. The catalyst-remaining amount (3.8 ppm) in a polyol in Example 13 is quite lower as compared with that (296.5 ppm) in Comparative Example 1. This result is ascribed to the fact that solid acid A having form prescribed in the present invention is used in Example 13 and solid acid C having a lower specific surface area than the range prescribed in the present invention is used in Comparative Example 1. By difference in forms of solid acids, the catalyst-remaining amounts in polyols differ significantly.

Likewise, when Comparative Example 2 (solid acid D) and Comparative Example 3 (solid acid E) are compared with Comparative Example 15 (solid acid A), it is known that a PZO catalyst can be efficiently removed by using a solid acid having form prescribed in the present invention.

It is known that the catalyst-remaining amount in a purified polyol can be controlled under 150 ppm by using a solid acid having form prescribed in the present invention, from comparison of Example 16 (solid acid A) with Comparative Example 7 (solid acid D) regarding a PZN catalyst polyol and from comparison of Example 18 (solid acid B) with Comparative Example 6 (solid acid E) regarding a PZB catalyst polyol.

On the other hand, the polyoxyalkylene polyol X (Comparative Example 5) obtained via neutralization of a PZO catalyst in a crude polyol with phosphoric acid and purification treatment did not have a PZO catalyst-remaining amount of 150 ppm or less. In comparison between Example 18 and Comparative Example 6, and Example 19 and Comparative Example 8, catalyst concentrations in the polyols Y and Z1 purified in Comparative Example 6 and Comparative Example 8 were 793 ppm and 915 ppm. They were not purified sufficiently. When the catalyst-remaining amount is over 150 ppm, coloring was recognized on appearance of a polyol. Further, it was known that OHV and C=C cannot be measured by methods prescribed in JIS K-1557 precisely. By purifying a crude polyol by using a solid acid having form prescribed in the present invention, Na elution amount from the solid acid is low, and a polyoxyalkylene polyol having high quality can be obtained.

For removing alkaline metal catalysts such as potassium hydroxide commonly used and, cesium hydroxide, catalyst which can reduce the monool content, and removing a catalyst from a crude polyol using a composite metal cyanide complex, catalyst neutralization with an acid is most general. However, a process is required to use a conventionally known adsorbent simultaneously, for removing an acid used excessively, or adsorbing alkaline metal and the like remaining without being neutralized. However, according to the method for producing a polyoxyalkylene polyol of the present invention, the production efficiency of a polyol in industrial scale increases significantly since the catalyst-remaining amount can be reduced efficiently in a short period of time.

<Production of Polyol-dispersed Polyol>

The properties of a polymer-dispersed polyol were measured by the following methods (11) through (14).

(11) Hydroxyl value of polymer-dispersed polyol (OHV, unit: mg KOH/g) and viscosity (hereinafter, represented by η(POP), unit: mnPa·s/25° C.)

It is determined by the above-described method (1).

(12) Polymer concentration of polymer-dispersed polyol (hereinafter, referred to as polymer concentration, unit: wt %)

Methanol is added to a polymer-dispersed polyol, dispersed well before centrifugal separation at 5000 rpm for 1 hour, and weight of methanol-insoluble components is measured. Herein, regarding a polymer-dispersed polyol using acrylonitrile (AN) alone as a vinyl monomer, the polymer concentration is calculated from nitrogen concentration by an element analysis method.

(13) Average particle size of polymer particle in polymer-dispersed polyol (hereinafter, referred to as average particle size, unit: $\mu$m)

A polymer-dispersed polyol is dispersed in isopropanol, and measurement is conducted using a particle analyzer (manufactured by Colter, type: LS 230). The average particle size of a particle shows a volume-average particle size.

(14) Dispersion stability of polymer particle in polymer-dispersed polyol (hereinafter, referred to as dispersion stability, unit: none)

A polymer-dispersed polyol is subjected to centrifugal separation at 5000 rpm for 1 hour, then, the centrifugal separation tube was inverted for natural flow down for 24 hours, and presence or absence of non-flowable cake at the bottom of a centrifugal separation tube is judged visually. When a non-flowable cake is present, dispersion stability is judged as poor, and when a non-flowable cake is not present, dispersion stability is judged as good.

Raw materials and abbreviations thereof are shown below.

(Polyol) B, F, K, L; polyoxyalkylene polyols obtained by Example 2 (B), Example 6 (F), Example 11 (K) and Example 12 (L), respectively.

(Ethylenically unsaturated monomer 1); acrylonitrile (hereinafter, represented by AN)

(Ethylenically unsaturated monomer 2); styrene (hereinafter, represented by St)

(Chain transfer agent): triethylamine (hereinafter, represented by TEA), isopropanol (hereinafter, represented by IPA)

(Radical initiator): 2,2'-azobis(2-methylbutyronitrile) (hereinafter, represented by V-59)

(Polyol A1): dispersion stability; A polyether ester polyol having OHV of 29 mg KOH/g obtained by reacting succinic anhydride or ethylene oxide with a polyol having a OHV of 34 mg KOH/g and an end EO content of 14% by weight obtained by addition-polymerization of propylene oxide and subsequently ethylene oxide to glycerine using KOH as a catalyst.

Examples 20 Through 23

In a one liter pressure proof autoclave equipped with a thermometer, stirring apparatus, pressure gage, and solution transferring apparatus, a polyol was charged until a filled condition, and heated to 120° C. while stirring. A mixture of a polyol, V-59, AN, St, chain transfer agent (TEA, IPA) and polyol A1 was charged into the autoclave continuously, and a polymer-dispersed polyol was obtained continuously from a discharging port. The reaction conditions include a reaction temperature of 120° C. and a pressure of 440 kPa, and residence time of 50 minutes. The resulted reaction solution was subjected to heat pressure-reducing treatment under conditions of a temperature of 120° C. and a pressure of 655 Pa for 3 hours, and an unreacted ethylenically unsaturated monomer, decomposed substances of a polymerization initiator and chain transfer agents were removed. The charging amount and properties and conditions of a polymer-dispersed polyol are shown in [Table 6].

TABLE 6

| | Example | | | |
|---|---|---|---|---|
| Polymer polyol dispersed | 20<br>AA | 21<br>BB | 22<br>CC | 23<br>DD |
| Amount charged of raw material (part by weight) | | | | |
| Polyol B | 77.5 | — | — | — |
| Polyol F | — | 77.5 | — | — |
| Polyol K | — | — | 77.0 | — |
| Polyol L | — | — | — | 54.0 |
| Polyol Al | — | — | — | 4.5 |
| AN | 21.9 | 21.9 | 11.5 | 12.5 |
| St | 0.6 | 0.6 | 11.5 | 29.0 |
| V-59 | 0.35 | 0.35 | 0.35 | 0.47 |
| IPA | — | — | — | 2.8 |
| TEA | — | — | — | 0.28 |
| Property and condition of polymer dispersed polyol | | | | |
| OHV (mgKOH/g) | 19.2 | 26.5 | 43.5 | 33.7 |
| η (POP) (mPa.s/25° C.) | 4900 | 2730 | 1700 | 3650 |
| Polymer concentration (wt %) | 20.8 | 20.8 | 20.8 | 40.6 |
| Average particle size ($\mu$m) | 0.6 | 0.6 | 1.1 | 1.2 |
| Dispersion stability | good | good | good | good |

<Consideration of Example 2>

A polymer-dispersed polyol obtained by using polyoxyalkylene polyol produced by using as a catalyst a compound (PZO, PZN) having a P=N bond has low viscosity, has small average particle size of the polymer particle, and further, has excellent dispersion stability of a polymer particle.

<Production of Isocyanate Group-ended Prepolymer>

Isocyanate group-ended prepolymers were produced using polyols having different remaining amounts of catalysts composed of compounds having a P=N bond (PZN, PZO, PZB). Stability by time of a prepolymer was evaluated according to the following method (15).

(15) Storage stability of isocyanate group-ended prepolymer (unit: %)

The viscosity (n) of a prepolymer directly after preparation, and the viscosity (m) of a prepolymer after storage for 14 days at 60° C. were measured and the viscosity change ratio is calculated by formula [(m−2)×100/n]. The viscosity of a prepolymer (η(PRE)) (unit: mPa·s/25° C.) is measured by a method described in JIS K-1557. When this viscosity change ratio is lower, stability by time of a prepolymer is judged to be more excellent.

Polyol M (Example 13), polyol N (Example 14), polyol O (Example 15), polyol P (Example 16), polyol Q (Example 17), polyol S (Example 19), polyol T (Comparative Example 1), polyol U (Comparative Example 2), polyol V (Comparative Example 3), polyol W (Comparative Example 4), polyol Z (Comparative Example 7) and polyol Z1 (Comparative Example 8) were used and reacted with a polyisocyanate to prepare isocyanate group-ended prepolymers, and stability by time thereof was measured and evaluated by methods described in the above-described method (15). The charging amounts of polyols, polyisocyanates, auxiliaries, xylene (manufactured by Wako Pure Chemical K.K.) and dioctylphthalate (manufactured by Wako Pure Chemical K.K., hereinafter, represented by DOP) when prepolymers are synthesized are shown in [Table 7]. As the polyisocyanate, Cosmonate PH (manufactured by Mitsui Chemical Co., Ltd.: 4,4'- diphenylmethane diisocyanate) and Cosmonate T-65 (manufactured by Mitsui Chemical Co., Ltd.: a mixed TDI of 2,4-TDI and 2,6-TDI in ratio by weight of 65:35) were used.

Example 24

Into a separable flask equipped with a thermometer was charged 488.3 parts by weight of polyol M obtained in Example 13 and 429.4 parts by weight of polyol O obtained in Example 15 under nitrogen atmosphere, and they were mixed by stirring. The concentration of the catalyst in this mixed polyol was 3.6 ppm. Then, 82.3 parts by weight of Cosmonate PH was charged into this mixed polyol, and the mixture was heated to 80° C., and reacted for 3 hours at the same temperature, then, heated to 90° C. and reacted for 6 hours at the same temperature, then, cooled to 60° C., and to this was added 90 parts by weight of xylene, and stirred for 1 hour at the same temperature. Then, the temperature was lowered to 50° C., the prepolymer was sealed in a metal vessel under nitrogen atmosphere and the above-described test of stability by time was conducted. The stability by time of the prepolymer was 10%.

Example 25

Into a separable flask was charged 488.3 parts by weight of polyol N obtained in Example 14 under nitrogen atmosphere, and 8.9 ppm phosphoric acid (in the form of 6.5 wt % phosphoric acid aqueous solution) was added based on the polyol. After mixing by stirring, heat pressure-reducing treatment was conducted for 2 hours under conditions of 105° C. and 1.33 kPa for removing water. Further, 429.4 parts by weight of polyol Obtained in Example 15 was added and mixed by stirring for 0.5 hours. The concentration of the catalyst in the mixed polyol was 24.2 ppm. Then the mixture was cooled to 55° C., and 82.3 parts by weight of Cosmonate PH was charged, and the same reaction operation was conducted as in Example 24 to obtain a prepolymer. The prepolymer was sealed in a metal vessel under nitrogen atmosphere and the above-described test of stability by time was conducted. The stability by time of the prepolymer was 16%.

Example 26

Into a separable flask equipped with a thermometer was charged 528 parts by weight of polyol Q obtained in Example 17 and 330 parts by weight of polyol S obtained in Example 19 under nitrogen atmosphere, respectively, and they were mixed by stirring. The concentration of the catalyst in this mixed in polyol was 28.3 ppm. Then, the mixture was heated to 80° C., and 48 parts by weight of DOP was added to this mixed polyol, then, 95 parts by weight of Cosmonate T-65 was added, and prepolymer-forming reaction was conducted at the same temperature for 6 hours. The mixture was cooled to 50° C., sealed in a metal vessel under nitrogen atmosphere and the above-described test of stability by time was conducted. The stability by time of the prepolymer was 11%.

Example 27

Into a separable flask equipped with a thermometer was charged 711 parts by weight of polyol S obtained in Example 19 under nitrogen atmosphere, and 6.8 ppm phosphoric acid (in the form of 6.5 wt % phosphoric acid aqueous solution) was added based on the polyol. After mixing by stirring, heat pressure-reducing treatment was conducted for 2 hours under conditions of 105° C. and 1.33 kPa for removing water. The concentration of the catalyst in the mixed polyol was 85.3 ppm. Then the mixture was cooled to 80° C., and 231 parts by weight of Cosmonate PH was charged, and prepolymer-forming reaction was conducted at the same temperature for 5 hours. The prepolymer was cooled to 50° C., and sealed in a metal vessel under nitrogen atmosphere and the above-described test of stability by time was conducted. The stability by time of the prepolymer was 24%.

Comparative Example 9

Into a separable flask equipped with a thermometer was charged 488.3 parts by weight of polyol W obtained in Comparative Example 4 and 429.4 parts by weight of polyol V obtained in Comparative Example 3, respectively, under nitrogen atmosphere, and mixed by stirring. The concentration of the catalyst in the mixed polyol was 188.3 ppm. Then, 82.3 parts by weight of Cosmonate PH was charged into this mixed polyol, heater to 80° C., reacted for 3 hours at the same temperature, then, heated to 90° C. and reacted for 6 hours at the same temperature, then, cooled to 60° C., and to this was added 90 parts by weight of xylene, and stirred for 1 hour at the same temperature. Then, the temperature was lowered to 50° C., the prepolymer was sealed in a metal vessel under nitrogen atmosphere and the above-described test of stability by time was conducted. After the test of stability by time, the prepolymer was gelled in the metal vessel.

Comparative Example 10

Into a separable flask equipped with a thermometer was charged 488.3 parts by weight of polyol T obtained in Comparative Example 1 and 429.4 parts by weight of polyol U obtained in Comparative Example 2, respectively, under 3 nitrogen atmosphere, and they were mixed by stirring. The concentration of the catalyst in this mixed polyol was 242.9 ppm. Then, 82.3 parts by weight of Cosmonate PH was charged into the mixed polyol, and the same reaction operation as in Comparative Example 9 was conducted to obtain a prepolymer. Then, the mixture was cooled to 50° C., sealed in a metal vessel under nitrogen atmosphere and the above-described test of stability by time was conducted. After the test of stability by time, the prepolymer was gelled in the metal vessel.

Comparative Example 11

Into a separable flask equipped with a thermometer was charged 330 parts by weight of polyol S obtained in Example 19 and 528 parts by weight of polyol Z obtained in Comparative Example 7, respectively, under nitrogen atmosphere, and they were mixed by stirring. The concentration of the catalyst in this mixed polyol was 162 ppm. Then, the mixture was heated to 80° C., and 48 parts by weight of DOP was charged into the polyol, then, 95 parts by weight of Cosmonate T-65 was charged, and prepolymer-forming reaction was conducted for 6 hours at the same temperature. Then, the mixture was cooled to 50° C., sealed in a metal vessel under nitrogen atmosphere and the above-described test of stability by time was conducted. The stability by time of the prepolymer was 122%.

Comparative Example 12

Into a separable flask equipped with a thermometer was charged 528 parts by weight of polyol P obtained in Example 16 and 330 parts by weight of polyol Z1 obtained in Comparative Example 8, respectively, under nitrogen atmosphere, and they were mixed by stirring. The concentration of the catalyst in this mixed polyol was 303 ppm. Then, the mixture was heated to 80° C., and 48 parts by weight of DOP was charged into the polyol, then, 95 parts by weight of Cosmonate T-65 was charged, and prepolymer-forming reaction was conducted for 6 hours at the same temperature. Then, the mixture was cooled to 50° C., sealed in a metal vessel under nitrogen atmosphere and the above-described test of stability by time was conducted. After the test of stability by time, the prepolymer was gelled in the metal vessel.

The results of Examples 24 through 27 and Comparative Examples 9 through 12 are shown in [Table 7].

stability by time thereof is shown. The test of stability by time of aprepolymer was evaluated by the above-described method (15).

Example 28

To 707.2 parts by weight of the polymer-dispersed polyol AA obtained in Example 20 was charged 112.8 parts by weight of Cosmonate T-80 (manufactured by Mitsui Chemical Co., Ltd., mixed TDI of 2,4-TDI and 2,6-TDI in ratio by weight of 80:20, hereinafter the same) as a polyisocyanate under nitrogen atmosphere, and the mixture was stirred for 4 hours at 90° C. to obtain an isocyanate group-ended prepolymer. The NCO index was 5.0. NCO % of the resulted prepolymer was 5.30% by weight, and η(PRE) was 15300

TABLE 7

|  | Example | | | | Comparative Example | | | |
| --- | --- | --- | --- | --- | --- | --- | --- | --- |
|  | 24 | 25 | 26 | 27 | 9 | 10 | 11 | 12 |
| Polyol M (part by weight) | 488.3 | — | — | — | — | — | — | — |
| Polyol N (part by weight) | — | 488.3 | — | — | — | — | — | — |
| Polyol O (part by weight) | 429.4 | 429.4 | — | — | — | — | — | — |
| Polyol P (part by weight) | — | — | — | — | — | — | — | 528 |
| Polyol Q (part by weight) | — | — | 528 | — | — | — | — | — |
| Polyol S (part by weight) | — | — | 330 | 711 | — | — | 330 | — |
| Polyol T (part by weight) | — | — | — | — | — | 488.3 | — | — |
| Polyol U (part by weight) | — | — | — | — | — | 429.4 | — | — |
| Polyol V (part by weight) | — | — | — | — | 429.4 | — | — | — |
| Polyol W (part by weight) | — | — | — | — | 488.3 | — | — | — |
| Polyol Z (part by weight) | — | — | — | — | — | — | 528 | — |
| Polyol Z1 (part by weight) | — | — | — | — | — | — | — | 330 |
| Xylene (part by weight) | 90 | 90 | — | — | 90 | 90 | — | — |
| DOP (part by weight) | — | — | 48 | — | — | — | 48 | 48 |
| Cosmonate PH (part by weight) | 82.3 | 82.3 | — | 231 | 82.3 | 82.3 | — | — |
| Cosmonate T-65 (part by weight) | — | — | 95 | — | — | — | 95 | 95 |
| Amount added of phosphoric acid to polyol (ppm) | 0 | 8.9 | 0 | 6.8 | 0 | 0 | 0 | 0 |
| Catalyst remaining amount in polyol (ppm) | 3.6 | 24.2 | 28.3 | 85.3 | 188.3 | 242.9 | 162 | 303 |
| Storage Stability of prepolymer (%) | 10 | 16 | 11 | 24 | gelation | gelation | 122 | gelation |

<Consideration of Example 3>

From the results obtained in Examples 24 through 27, it is known that, by using a polyoxyalkylene polyol in which the catalyst-remaining amount has been controlled under 150 ppm, an isocyanate group-ended prepolymer excellent in stability by time can be obtained. Further, when the catalyst-remaining amount is 188.3 ppm or more, the prepolymer formed gel.

<Production of Isocyanate Group-ended Prepolymer Using Polymer-dispersed Polyol>

Then, the polymer-dispersed polyol and polyisocyanate produced by the method of the present invention are reacted to produce an isocyanate group-ended prepolymer, and the mPa·s/25° C. 550 parts by weight of the prepolymer was sealed in a metal vessel under nitrogen atmosphere and the test of stability by time of the prepolymer was conducted by the above-described method (15). The stability by time was 29%, and an isocyanate group-ended prepolymer excellent in stability by time was obtained.

<Production of Isocyanate Group-ended Prepolymer and Polyurethane Resin>

An isocyanate group-ended prepolymer is hereinafter abbreviated as a prepolymer.

(16) H—T bond selectivity of prepolymer (unit: mol %)
It is measured by the above-described method (2).

(17) NCO % (unit: wt %) and viscosity (hereinafter, represented by η(PRE), unit: mPa·s/25° C.) of prepolymer NCO % is calculated according to JIS K-7301 and η(PRE) is calculated according to JIS K-1557.

(18) Remaining amount of catalyst composed of compound having P=N bond in prepolymer (hereinafter, referred to as catalyst-remaining amount in prepolymer, unit: ppm)

The catalyst-remaining amount in a prepolymer was measured by a capillary electrophoresis apparatus (manufactured by Waters, fully automatic CIA system). An aqueous hydrochloric acid solution was added to a sample previously treated, and extraction of a catalyst into the aqueous hydrochloric acid solution is conducted by a shaker (manufactured by Tokyo Rikakiki K.K., EYELA SHAKER). Then, the solution was allowed to stand still to separate an aqueous layer, and the catalyst-remaining amount is quantified using a capillary electrophoresis analyzing apparatus. As pre-treatment of the prepolymer, an isocyanate group in the prepolymer was reacted with methanol (guaranteed reagent), then, heated to 80° C., and pressure is reduced to 1.33 kPa or less to remove the remaining methanol.

(19) Releasing possible time of polyurethane elastomer (unit: h)

The time during which no crack and deformation occur in an elastomer and releasing from a mold is possible is called releasing possible time. The time during which, after a cured sheet is bent by hand, and no crack occurs is called releasing possible time, and this time is measured.

(20) Mechanical property of polyurethane elastomer

It is measured according to JIS K-7312. Measuring items will be described below.

Hardness (hereinafter, represented by Hs), 100% modulus (hereinafter, represented by M100, unit: MPa), 300% modulus (hereinafter, represented by M300, unit: MPa), tensile strength (hereinafter, represented by TS, unit: MPa), elongation (hereinafter, represented by EL, unit: %), compression set (hereinafter, represented by Cs, unit: %), and impact resilience (hereinafter, represented by R, unit: %) are measured. Herein, measurement of compression set is conducted under compression conditions of 70° C. for 24 hours.

Example 29

Prepolymer AA1 and Polyurethane Elastomer

To 210.3 parts by weight of Cosmonate T-80 was charged 1789.7 parts by weight of polyol C under nitrogen atmosphere, then, the mixture was stirred for 6 hours at 80° C., to conduct prepolymer-forming reaction. In this procedure, NCO index is 2. A prepolymer AA1 was obtained in which NCO % is 2.41% by weight, η(PRE) is 7,150 mPa·s/25° C., H—T bond selectivity is 97.3 mol % and the catalyst-remaining amount is 31 ppm. Then, 6.9 parts by weight of 4,40-diamino-3,3'-dichlorodiphenylmethane (hereinafter, represented by MBOCA) previously melted at 130° C. was added to 100 parts by weight of prepolymer AA1 which had been de-gassed at 100, and they were quickly mixed uniformly. This mixed solution was injected in a metal mold which had been pre-heated to 110° C., and cured for 24 hours at 110° C. to obtain a urethane elastomer. The releasing possible time of the polyurethane elastomer was 3.5 hours. Further, a sheet of the polyurethane elastomer was allowed to stand still for 7 days under atmosphere of a relative humidity of 60% at 23° C., then, mechanical property of the polyurethane elastomer was measured. These results are shown in [Table 8].

Example 30

Prepolymer AA2 and Polyurethane Elastomer

To 113.1 parts by weight of Cosmonate T-80 was charged 1886.9 parts by weight of polyol H under nitrogen atmosphere, then, the mixture was stirred for 6 hours at 80° C., to conduct prepolymer-forming reaction. A prepolymer AA2 was obtained in which NCO % is 1.14% by weight, η(PRE) is 13,400 mPa·s/25° C., H—T bond selectivity is 98.2 mol % and the catalyst-remaining amount is 7.2 ppm. NCO index in this procedure was 2. A polyurethane elastomer was obtained in the same manner as in Example 29 except that 3.3 parts by weight of MBOCA was added to 100 parts by weight of prepolymer AA2. The releasing possible time of the polyurethane elastomer was 5 hours. Further, the mechanical property of the polyurethane elastomer was measured in the same manner as in Example 29. These results are shown in [Table 8].

Example 31

Prepolymer AA3 and Polyurethane Elastomer

To 891.3 parts by weight of Cosmonate PH was charged 712.6 parts by weight of polyol C and 396.1 parts by weight of polyol I under nitrogen atmosphere, then, the mixture was stirred for 5 hours at 80° C., to conduct a prepolymer-forming reaction. A prepolymer AA3 was obtained in which NCO % is 13.3% by weight, η(PRE) is 2,520 mPa·s/25° C., H—T bond selectivity is 97.4 mol % and the catalyst-remaining amount is 14 ppm. NCO index in this procedure was 10. Then, 12.8 parts by weight of 1,4-butanediol (hereinafter, referred to as 1,4-BG, hereinafter the same) de-gassed under reduced pressure by the above-described method and 0.005 parts by weight of dibutyltin dilaurate (manufactured by Sankyo Yuki Gosei K.K., trade name: Stann BL, hereinafter the same) were added to 100 parts by weight of prepolymer AA3 previously de-gassed under reduced pressure at 25° C., and according to the same manner as in Example 29, a polyurethane elastomer was obtained. The releasing possible time of the polyurethane elastomer at this point was 5 hours. Further, the mechanical property of the polyurethane elastomer was measured in the same manner as in Example 29. These results are shown in [Table 8].

TABLE 8

| Prepolymer | Example 29 AA1 | Example 30 AA2 | Example 31 AA3 |
|---|---|---|---|
| Polyol C (part by weight) | 1789.7 | — | 712.6 |
| Polyol H (part by weight) | — | 1886.9 | — |
| Polyol I (part by weight) | — | — | 396.1 |
| Polyol U (part by weight) | — | — | — |
| Polyol V (part by weight) | — | — | — |
| Polyol W (part by weight) | — | — | — |
| Cosmonate T-80 (part by weight) | 210.3 | 113.1 | — |
| Cosmonate PH (part by weight) | — | — | 891.3 |
| Property and condition of prepolymer | | | |
| H-T bond selectivity of prepolymer (mol %) | 97.3 | 98.2 | 97.4 |
| NCO % (wt %) | 2.41 | 1.14 | 13.3 |
| η (POP) (mPa.s/25° C.) | 7,150 | 13,400 | 2,520 |
| Catalyst remaining amount in prepolymer (ppm) | 31 | 7.2 | 14 |
| Curing agent for prepolymer | MBOCA | MBOCA | 1,4-BG |
| Releasable time of polyurethane elastomer (h) | 3.5 | 5 | 5 |

TABLE 8-continued

| Prepolymer | Example 29 AA1 | Example 30 AA2 | Example 31 AA3 |
|---|---|---|---|
| Mechanical property of polyurethane elastomer | | | |
| Hs (Shore A) | 68 | 45 | 70 |
| M100 (MPa) | 2.1 | 0.8 | 2.5 |
| M300 (MPa) | 3.2 | 1.3 | 3.8 |
| TS (MPa) | 13.6 | 9.8 | 7.6 |
| EL (%) | 1100 | 1950 | 800 |
| R (%) | 60 | 57 | 55 |
| Cs (%) | 37 | 32 | 42 |

<Consideration of Example 4>

In a polyurethane elastomer obtained from an isocyanate group-ended prepolymer obtained by using a polyoxyalkylene polyol which has been produced by using a catalyst composed of a compound (PZN or PZO) having a P=N bond and which is purified by the method of the present invention, releasing possible time of the polyurethane elastomer is short and manifestation of mechanical property of the resin is quick. Further, by using the above-described isocyanate group-ended prepolymer, a polyurethane elastomer excellent in mechanical property such as Hs, M10, M300, TS, R, Cs and the like can be achieved.

<Production of Prepolymer and Polyurethane Resin Having Free Isocyanate Compound Concentration>

(21) Concentration of free isocyanate compound in prepolymer (hereinafter, referred to as free isocyanate compound concentration)

A free isocyanate compound in a prepolymer is quantified by a gas chromatography apparatus [manufactured by Shimadzu, type: GC-14A].

NCO %, η(PRE), H—T bond selectivity and the catalyst-remaining amount of the prepolymer are measured by the above-described methods.

Example 32

Prepolymer AA4 and Polyurethane Elastomer

To 642.0 parts by weight of Cosmonate T-80 was charged 1243.6 parts by weight of polyol C and 114.4 parts by weight of 1,3-butanediol (hereinafter, referred to as 1,3-BG) under nitrogen atmosphere, then, the mixture was stirred for 5 hours at 80° C., to obtain an isocyanate group-ended prepolymer having a NCO % of 13.5% by weight. In this procedure, NCO index is 8. This isocyanate group-ended prepolymer was subjected to heat pressure-reducing treatment for 5 hours by using a molecule distillation apparatus (manufactured by Shibata Kagaku K.K., type: MS-800) under conditions of a wiper rotation of 4000 r.p.m. and a temperature of 150° C. to remove a free polyisocyanate compound. A prepolymer AA4 was obtained in which the concentration of the free polyisocyanate compound is 0.3% by weight, NCO % is 2.50% by weight, η(PRE) is 5,400 mPa·s/25° C., H—T bond selectivity is 97.6 mol % and the catalyst-remaining amount is 21 ppm. Then, a polyurethane elastomer was obtained in the same manner as in Example 29 except that 7.2 parts by weight of MBOCA was added to 100 parts by weight of prepolymer AA4. The releasing possible time of the polyurethane elastomer in this point was 4.5 hours. Further, the mechanical property of the polyurethane elastomer was measured by the same manner as in Example 29.

As a result, a polyurethane elastomer was obtained in which Hs (Shore A) is 70, M100 is 2.9 Mpa, M300 os 5.2 Mpa, TS is 14.7 Mpa, EL is 870%, R is 98% and Cs is 30%. The concentration of a free isocyanate compound in isocyanate group-ended prepolymer AA1 in Example 29 was measured to find it was 1.9% by weight. By conducting removal operation of a free isocyanate compound, even if NCO % is at the same level, the viscosity of the isocyanate group-ended prepolymer lowers (the concentration of a free isocyanate compound in prepolymer AA1 in Example 29 is 1.9% by weight, while the concentration of a free isocyanate compound in prepolymer AA4 in Example 32 is 0.3% by weight), and workability is excellent.

<Production of Polyurethane Resin Obtained by Using Polyoxyalkylene Polyol as Curing Agent>

(22) Mechanical property of polyurethane resin

According to methods described in JIS A-6021, the tensile strength (TS, unit: MPa), elongation (EL, unit: %) and tearing strength (hereinafter, represented by TR, unit: kN/m) are measured.

(23) Surface stain proofing property of polyurethane resin

As the surface stain proofing property of a polyurethane resin, tack on the surface of the resin is measured by touch. In the following conditions, if the surface of a polyurethane resin after curing for 7 days has not tacked, it is evaluated as good, and if tackiness is found, it is evaluated as bad.

Example 33

5.6 parts by weight of polyol H obtained in Example 8, 7.1 parts by weight of polyol I obtained in Example 9, 10.7 parts of 3,3'-dichloro-4,4'-diaminodiphenylmethane (MBOCA), 26.4 parts by weight of dioctyl phthalate (DOP), 61.2 parts by weight of calcium carbonate, 1.8 parts by weight of lead octylate (manufactured by Katsuzai Chemical K.K., trade name: Miniko P-24) which is a catalyst for curing, and 1.2 parts by weight of weather-proof stabilizing agent (manufactured by Ouchi Shinko Kagaku K.K., tradename: Nocrack 300) were mixed, and kneaded by using a kneading apparatus (Dissolver manufactured by Inoue Seisakusho K.K., type: DHC-2) at a stirring speed of 1000 r.p.m. and a temperature of 50° C. for 1 hour, to obtain a curing agent. Then, to 143 parts by weight of Cosmonate T-80 was added 517 parts by weight of polyol H obtained in Example 8 and 960 parts by weight of polyol I obtained in Example 9, respectively, under nitrogen atmosphere, and prepolymer-forming reaction was conducted while stirring the mixture at 90° C. for 4 hours. Then, the prepolymer was cooled to room temperature, and 100 parts by weight of the above-described curing agent and 100 parts by weight of the prepolymer were mixed uniformly for 3 minutes so that no bubbles were mixed in, and the mixture was injected into a mold having a thickness of 1 mm coated with Teflon, and cured under conditions of a temperature of 23° C. and a relative humidity of 55%, to obtain a polyurethane resin. To evaluate progressing ability of curing of the polyurethane resin, mechanical property and surface stain proof property of polyurethane resins after a day and 7 days under the above-described curing conditions were measured. As a result, after curing for 1 day, TS was 4.3 Mpa, EL was 990%, TR was 20 kN/m, and after curing for 7 day, TS was 5.7 Mpa, EL was 810%, TR was 23 kN/m. Regarding surface stain proof property of the polyurethane resin after curing for 7 days, no tack was found, and it was evaluated as good.

A polyurethane resin of the present invention in which a polyoxyalkylene polyol produced by using as a catalyst a compound having a P=N bond of the present invention is used in a curing agent and the main agent, isocyanate group-ended prepolymer, has ability for quickly manifesting physical properties such as TS, TR and the like and has excellent mechanical property. The ability for manifesting physical properties is based on multiplying ratios obtained by dividing TS and TR at 7 days after curing by TS and TR at 1 day after curing. When this multiplying ratio is lower, the ability for manifesting physical properties is judged as lower. Further, due to no tacking on the surface, a polyurethane having little surface staining property is obtained.

<Production of Flexible Polyurethane Foam>

Hereinafter, a flexible polyurethane foam is called a flexible foam.

(24) Density of flexible foam (unit: kg/m$^3$)

It means apparent density obtained by a method described in JIS K-6400. The overall density is measured using a cubic sample having surface skin, and the core density is measured using a cubic sample having no surface skin.

(25) Hardness of flexible foam (unit: N/314 cm$^2$)

It is obtained by Method A in JIS K-6400. The thickness of a flexible foam is regulated to 94 mm and 100 mm.

(26) Elongation of flexible foam (unit: %)

It is obtained by a method described in JIS K-6400.

(27) Compression set of flexible foam (unit: 8)

It is obtained by a method described in JIS K-6400. In measuring, core part of a molded flexible foam is cut out to in give 50×50×25 mm dimensions for use. The test specimen is compressed to half thickness of the original foam using parallel flat plates, then, left for 22 hours at 70° C. The test specimen is taken out from the parallel flat plates, and 30 minutes after, the thickness is measured to calculate compression set.

(28) Wet thermal compression set of flexible foam (unit: %)

It is obtained by a method described in JIS K-6400. In measuring, core part of a molded flexible foam is cut out to give 50×50×25 mm dimensions for use. The test specimen is compressed to half thickness of the original foam using parallel flat plates, then, left for 22 hours under conditions of a temperature of 50° C. and a relative humidity of 95%. The test specimen is taken out from the parallel flat plates, and 30 minutes after, the thickness is measured to calculate wet thermal compression set.

(29) Hardness loss (unit: %) and height loss (unit: %) of flexible foam in repeated compression testing It is obtained by a method described in JIS K-6400. In measuring, a core part of a molded flexible foam is cut out to give 100×100×50 mm dimensions for use. The test specimen is sandwiched between parallel flat plates, then, compression setting to 50% thickness based on the original thickness of the foam is repeated continuously for 80 thousands times at a speed of 60 times per minute at room temperature. The test specimen was taken out, and 30 minutes after, the hardness of the foam is measured to calculate hardness loss. Further, the heights of the foam before and after the test are measured to calculate height loss.

In production of a flexible foam, compounds described below were used in addition to polyoxyalkylene polyol, polymer-dispersed polyol and the like.

(Polyisocyanate-1)

Cosmonate TM-20: a mixture of 80 parts by weight of mixed TDI of 2,4-TDI and 2,6-TDI in weight ratio of 80:20, and 20 parts by weight of polymethylene polyphenyl polyisocyanate. This polymethylene polyphenyl polyisocyanate is a polyisocyanate composed of 43% by weight of double-nuclear components based on benzene ring, 24% by weight of tri-nuclear components, and 9% by weigh of four-nuclear components.

(Polyisocyanate 2)

Cosmonate T-80: mixed TDI of 2,4-TDI and 2,6-TDI in weight ratio of 80:20

(Catalyst-1)

Minico L-1020; amine catalyst manufactured by Katsuzai Chemical K.K. (33% diethylene glycol solution of triethylenediamine)

(Catalyst-2)

Minico TMDA; amine catalyst manufactured by Katsuzai Chemical K.K.

(Cross-linking agent-1)

KL-210; Cross-linking agent having a hydroxyl value of 830 mg KOH/g manufactured by Mitsui Chemical Co, Ltd.

(Surfactant-1)

L-3601; Silicone-based manufactured by Nippon Unicar K.K.

Example 34

A resin premix was prepared by mixing seven components described below. Polyoxyalkylene polyol: 50 parts by weight, Polymer-dispersed polyol: 50 parts by weight, Cross-linking agent-1: 3.0 parts by weight, Water: 3.4 parts by weight, Catalyst-1: 0.4 parts by weight, Catalyst-2: 0.1 part by weight, Foam regulator-1: 1.0 part by weight Polyoxyalkylene polyol B was used as the polyoxyalkylene polyol, and polymer-dispersed polyol AA was used as the polymer-dispersed polyol. To 107.9 parts by weight of the above-described resin mix was added 43.3 parts by weight of polyisocyanate-1 and mixed, and immediately, the mixture was injected into a 400×400×100 mm mold which is preadjusted to 65° C., the lid was closed and the mixture was allowed to foam. Then it was cured with heating in a hot air oven at 100° C. for 7 minutes, then, a flexible polyurethane foam was taken out from the mold. The foam was aged for one day and night in and over of a temperature of 23° C. and a relative humidity of 50%, then, physical properties of the flexible foam were measured. The resulting physical properties of the flexible foam are shown in [Table 9]. NCO index in this example is 1.00.

Examples 35 Through 39

A flexible foam was produced in the same manner as in Example 34 except that polyoxyalkylene polyols and polymer-dispersed polyols shown in [Table 9] were used and the apparent density of the flexible foam was controlled according to [Table 9]. Physical properties of the resulted flexible foam are shown in [Table 9].

TABLE 9

| | Example | | | | | |
|---|---|---|---|---|---|---|
| | 34 | 35 | 36 | 37 | 38 | 39 |
| Polyoxyalkylene polyol | B | D | F | G | B | F |
| Polymer dispersed polymer | AA | AA | AA | AA | BB | BB |
| Polyol ratio *2) | 100 | 100 | 100 | 100 | 100 | 100 |
| Physical property of flexible polyurethane foam | | | | | | |
| Overall density (kg/m$^3$) | 50.2 | 50.4 | 50.3 | 50.4 | 50.3 | 50.3 |
| Core density (kg/m$^3$) | 46.2 | 45.7 | 45.6 | 45.8 | 46 | 46.2 |
| Hardness/25% ILD (N/314 cm$^2$) | 18.9 | 19.1 | 19.1 | 19.2 | 19.4 | 19.3 |
| Elongation (%) | 112 | 113 | 110 | 106 | 108 | 108 |
| Compression set (%) | 3.9 | 3.8 | 4.2 | 4.5 | 4.6 | 4.6 |
| Wet thermal compression set (%) | 9.8 | 10.2 | 10.4 | 11.8 | 10.7 | 10.6 |
| Repeated compression test | | | | | | |

TABLE 9-continued

| | Example | | | | | |
|---|---|---|---|---|---|---|
| | 34 | 35 | 36 | 37 | 38 | 39 |
| Height loss (%) | 1.8 | 1.8 | 1.9 | 2.3 | 2.2 | 2.2 |
| Hardness loss (%) | 13.4 | 13.6 | 13.8 | 15.5 | 15.9 | 16.6 |

*²⁾ Polyol ratio: ratio of polyoxyalkylene polyol produced using compound catalyst having P═N bond among whole polyols (wt %)

Examples 40 Through 43

A flexible foam was produced in the same manner as in Example 34 except that combinations of polyoxyalkylene polyols with polymer-dispersed polyols shown in [Table 10] were used, polyisocyanate-1 was changed to polyisocyanate-2, and the apparent density of the flexible foam was controlled according to [Table 10]. NCO index was 1.00. Physical properties of the resulted flexible foam are shown in [Table 10].

TABLE 10

| Example | 40 | 41 | 42 | 43 |
|---|---|---|---|---|
| Polyoxyalkylene polyol | B | D | F | G |
| Polymer dispersed polymer | AA | AA | AA | AA |
| Polyol ratio*²⁾ | 100 | 100 | 100 | 100 |
| Physical property of flexible polyurethane foam | | | | |
| Total density (kg/m³) | 50.6 | 50.7 | 50.6 | 50.5 |
| Core density (kg/m³) | 46.8 | 46.7 | 46.5 | 46.3 |
| Hardness/25% ILD (N/314 cm²) | 18.4 | 18.8 | 18.7 | 18.9 |
| Elongation (%) | 121 | 118 | 119 | 116 |
| Compression set (%) | 4.1 | 4.2 | 4.2 | 4.7 |
| Wet thermal compression set (%) | 11.2 | 11.4 | 11.8 | 12.8 |
| Repeated compression test | | | | |
| Height loss (%) | 2.1 | 2.2 | 2.4 | 2.6 |
| Hardness loss (%) | 14.8 | 14.2 | 14.9 | 16.3 |

*²⁾Polyol ratio: ratio of polyoxyalkylene polyol produced using compound catalyst having P═N bond among whole polyols (wt %)

<Consideration of Example 5>

It is known from [Table 9] and [Table 10] that a flexible polyurethane foam obtained by using a polyoxyalkylene polyol produced by using a compound having a P═N bond (PZN, PZO) as a catalyst has excellent hardness, elongation, compression set, wet thermal compression setting and durabilities (indicating hardness loss and height loss in repeated compression test)

What is claimed is:

1. A method for producing a polyoxyalkylene polyol wherein a crude polyoxyalkylene polyol is produced by addition polymerization of an epoxide compound to an active hydrogen compound using as a catalyst a compound having a P═N bond, thereafter, the crude polyoxyalkylene polyol is allowed to contact with a solid acid having a specific surface area of 450 to 1200 m²/g and an average pore diameter of 40 to 100 Å to control the catalyst-remaining amount in the polyoxyalkylene polyol to 150 ppm or less.

2. The method for producing a polyoxyalkylene polyol according to claim 1 wherein the solid acid is a composite metal oxide prepared from different oxides including silicon oxide, boron oxide, titanium oxide, aluminum oxide, zirconium oxide, magnesium oxide, calcium oxide and zinc oxide.

3. The method for producing a polyoxyalkylene polyol according to claim 2 wherein the composite metal oxide is at least one composite metal oxide selected from aluminum silicate and magnesium silicate.

4. The method for producing a polyoxyalkylene polyol according to claim 1 wherein the compound having a P═N bond is at least one compound selected from phosphazenium compounds, phosphine oxide compounds and phosphazene compounds.

5. The method for producing a polyoxyalkylene polyol according to claim 4 wherein the phosphazenium compound is a compound represented by the chemical formula (1)

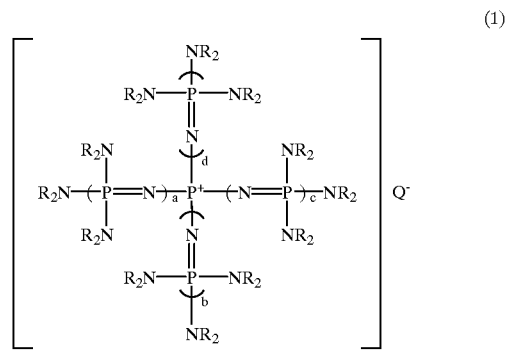

(1)

wherein, a, b, c and d each represents a positive integer from 0 to 3, however, a, b, c and d are not simultaneously 0, Rs are the same or different and represent a hydrocarbon group having 1 to 10 carbon atoms, and in some cases, two Rs on the same nitrogen atom may bond to each other to form a ring structure and Q⁻ represents a hydroxy anion, alkoxy anion, aryloxy anion or carboxy anion.

6. The method for producing a polyoxyalkylene polyol according to claim 4 wherein the phosphine oxide compound is a compound represented by the chemical formula (2)

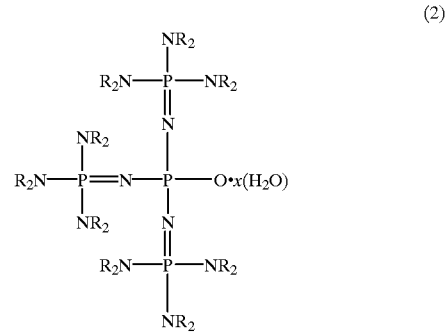

(2)

wherein, Rs are the same or different and represent a hydrocarbon group having 1 to 10 carbon atoms, and x represents the amount of water contained in terms of a molar ratio and is from 0 to 5.

7. The method for producing a polyoxyalkylene polyol according to claim 4 wherein the phosphazene compound is a compound represented by the chemical formula (3)

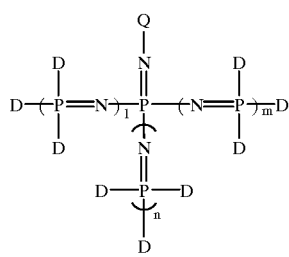

(3)

wherein, 1, m and n each represents a positive integer from 0 to 3, Ds are the same or different and represent a hydrocarbon group having 1 to 20 carbon atoms, alkoxy group, phenoxy group, thiophenol residual group, mono-substituted amino group, di-substituted amino group, or a 5 to 6-membered cyclic amino group, Q represents a hydrocarbon group having 1 to 20 carbon atoms, two Ds on the same phosphorus atom or two different phosphorus atoms may bond to each other and D and Q may bond to each other to form ring structures, respectively.

8. The method for producing a polyoxyalkylene polyol according to claim 1 wherein the crude polyoxyalkylene polyol is allowed to contact with a solid acid at a temperature from 50 to 150° C.

9. The method for producing a polyoxyalkylene polyol according to claim 1 wherein 0.1 to 10% by weight of water is allowed to coexist based on the crude polyoxyalkylene polyol when the crude polyoxyalkylene polyol is allowed to contact with a solid acid.

10. The method for producing a polyoxyalkylene polyol according to claim 1 wherein after the crude polyoxyalkylene polyol is allowed to contact with a solid acid, the solid acid is separated from the polyoxyalkylene polyol, then, at least one acid selected from inorganic acids and organic acids is added in an amount of 1 to 25 ppm based on the polyoxyalkylene polyol.

11. The method for producing a polyoxyalkylene polyol according to claim 1 wherein an epoxide compound is addition-polymerized to an active hydrogen compound in the presence of $1 \times 10^{-4}$ to $5 \times 10^{-1}$ mol of a catalyst based on 1 mol of the active hydrogen compound under conditions of a reaction temperature of 15 to 130° C. and a reaction pressure of 882 kPa or less, to produce a crude polyoxyalkylene polyol.

12. The method for producing a polyoxyalkylene polyol according to claim 1 wherein the hydroxyl value of the polyoxyalkylene polyol is from 2 to 200 mg KOH/g, the total unsaturation degree is 0.07 meq./g or less, and the head-to-tail bond selectivity of an oxypropylene group in a polyoxyalkylene polyol by propylene oxide addition polymerization is 95 mol % or more.

13. The method for producing a polyoxyalkylene polyol according to claim 1 wherein the content of an oxypropylene group in a polyoxyalkylene polyol is at least 50% by weight.

14. The method for producing a polyoxyalkylene polyol according to claim 1 wherein the hydroxyl value is from 9 to 120 mg KOH/g, the total unsaturation degree is 0.05 meq./g or less, the head-to-tail bond selectivity is 96 mol % or more, and the remaining amount of the catalyst composed of a compound having a P═N bond is 90 ppm or less.

15. A method for producing a polymer-dispersed polyol wherein polymer particles are dispersed in a polyoxyalkylene polyol, in which the polyoxyalkylene polyol is produced by the method according claim 1, then, 5 to 86 parts by weight of an ethylenically-unsaturated monomer is polymerized in 100 parts by weight of the polyoxyalkylene polyol at a temperature from 40 to 200° C. in the presence of a radical polymerization initiator to control the concentration of polymer particles to 5 to 60% by weight.

16. The method for producing a polymer-dispersed polyol according to claim 15 wherein the ethylenically-unsaturated monomer is at least one monomer selected from acrylonitrile, styrene, acrylamide and methyl metlacrylate.

17. A method for producing an isocyanate group-ended prepolymer wherein a polyoxyalkylene polyol and a polyisocyanate are reacted, in which polyoxyalkylene polyol is produced by the method according to claim 1, then, the polyisocyanate is reacted with the resulting polyoxyalkylene polyol at a temperature from 50 to 120° C. so as to obtain an isocyanate index of 1.3 to 10, and to obtain an isocyanate group-ended prepolymer having an isocyanate group content (NCO %) of 0.3 to 30% by weight and a head-to-tail bond selectivity of the main chain in the prepolymer of 95 mol % or more.

18. A method for producing an isocyanate group-ended prepolymer according to claim 17 wherein the content of a free isocyanate compound is 1% by weight or less.

19. A method for producing an isocyanate group-ended prepolymer wherein a polymer-dispersed polyol and a polyisocyanate are reacted, in which the polymer-dispersed polyol is produced by the method according to claim 16, then, the polyisocyanate is reacted with the resulting polymer-dispersed polyol at a temperature from 50 to 120° C. so as to obtain an isocyanate index of 1.3 to 10, and to obtain an isocyanate group-ended prepolymer having an isocyanate group content (NCO %) of 0.3 to 30% by weight.

20. A method for producing a polyurethane resin, in which an isocyanate group-ended prepolymer is produced by the method according to any of claim 19 then, the resulting isocyanate group-ended prepolymer and a chain extender are reacted at a temperature from 60 to 140° C. so as to obtain an isocyanate index of 0.6 to 1.5.

21. A method for producing a polyurethane resin, in which a polyoxyalkylene polyol is produced by the method according to claim 1 then, the resulting polyoxyalkylene polyol and an isocyanate group-ended prepolymer are reacted at a temperature from 10 to 50° C. so as to obtain an isocyanate index of 0.8 to 1.3.

22. A method for producing a flexible polyurethane foam wherein a polyol containing a polyoxyalkylene polyol and a polyisocyanate are reacted in the presence of water, a catalyst and surfactant, in which the polyoxyalkylene polyol is produced by the method according to claim 1, then, the polyol containing the resulting polyoxyalkylene polyol in an amount of at least 30% by weight in the polyol is used.

23. A method for producing a flexible polyurethane foam wherein a polyol containing a polymer dispersed polyol and a polyisocyanate are reacted in the presence of water, a catalyst and surfactant, in which the polymer-dispersed polyol is produced by the method according to claim 16, then, the polyol containing the resulting polymer-dispersed polyol in an amount of at least 10% by weight in the polyol is used.

24. A method for producing an isocyanate group-ended prepolymer wherein a polymer-dispersed polyol and a polyisocyanate are reacted, in which the polymer-dispersed polyol is produced by the method according to claim 15, then, the polyisocyanate is reacted with the resulting polymer-dispersed polyol at a temperature from 50 to 120° C. so as to obtain an isocyanate index of 1.3 to 10, and to obtain an isocyanate group-ended prepolymer having an isocyanate group content (NCO %) of 0.3 to 30% by weight.

25. A method for producing a polyurethane resin, in which an isocyanate group-ended prepolymer is produced by the method according to claim 18, then, the resulting isocyanate group-ended prepolymer and a chain extender are reacted at a temperature from 60 to 140° C. so as to obtain an isocyanate index of 0.6 to 1.5.

26. A method for producing a polyurethane resin, in which an isocyanate group-ended prepolymer is produced by the method according to claim 17, then, the resulting isocyanate group-ended prepolymer and a chain extender are reacted at a temperature from 60 to 140° C. so as to obtain an isocyanate index of 0.6 to 1.5.

27. A method for producing a flexible polyurethane foam wherein a polyol containing a polymer dispersed polyol and a polyisocyanate are reacted in the presence of water, a catalyst and surfactant, in which the polymer-dispersed polyol is produced by the method according to claim 15, then, the polyol containing the resulting polymer-dispersed polyol in an amount of at least 10% by weight in the polyol is used.

* * * * *

UNITED STATES PATENT AND TRADEMARK OFFICE
CERTIFICATE OF CORRECTION

PATENT NO.     : 6,410,676 B1
DATED          : June 25, 2002
INVENTOR(S)    : Satoshi Yamasaki et al.

It is certified that error appears in the above-identified patent and that said Letters Patent is hereby corrected as shown below:

<u>Title page,</u>
Item [73], Assignee, please change "chemicals" to -- Chemicals --.
Item [56], References Cited, OTHER PUBLICATIONS, please add:
-- G.N. Koidan, et al. "Methylation of the phosphoryl group by methyl iodide", Journal of General Chemistry of the USSR, 55, 1985, pg. 1453. --

<u>Column 68,</u>
Line 9, change "metlacrylate" to -- methacrylate --.

Signed and Sealed this

Twenty-ninth Day of July, 2003

JAMES E. ROGAN
*Director of the United States Patent and Trademark Office*